United States Patent [19]
Ugo

[11] 3,895,716
[45] July 22, 1975

[54] TIRE SORTING APPARATUS

[75] Inventor: John W. Ugo, Warren, Mich.

[73] Assignee: Uniroyal, Inc., New York, N.Y.

[22] Filed: Dec. 27, 1971

[21] Appl. No.: 212,143

[52] U.S. Cl......... 209/74 M; 209/111.8; 340/172.5; 340/259; 198/38
[51] Int. Cl...................................................... B07c
[58] Field of Search.......... 209/74, 74 M, 73, 111.8; 198/38, 223, 224, 221, 40; 340/172.5, 259

[56] References Cited
UNITED STATES PATENTS

| | | | |
|---|---|---|---|
| 3,150,763 | 9/1964 | Immesberger | 198/38 |
| 3,272,353 | 9/1966 | Wilder | 198/38 X |
| 3,640,384 | 2/1972 | Del Rosso | 209/74 M |
| 3,645,392 | 2/1972 | Chittenden et al. | 209/74 M |

Primary Examiner—Allen N. Knowles
Attorney, Agent, or Firm—Herbert Stern, Esq.

[57] ABSTRACT

An apparatus in which articles are moved sequentially through a series of diverter stations onto selected ones of a plurality of branch conveyors connected thereto for delivery to desired termini. A sensor unit, remote from the branch conveyors, develops code signals defining or identifying the selected branch conveyors onto which the articles are to be transferred. The code signals are stored in a memory unit until the articles arrive at the diverter stations associated with the selected branch conveyors whereupon, the code signals are released from the memory unit so as to cause the articles to be shifted onto the selected branch conveyors.

The foregoing abstract is neither intended to define the invention disclosed, nor is it intended to be limiting as to the scope thereof in any way.

28 Claims, 34 Drawing Figures

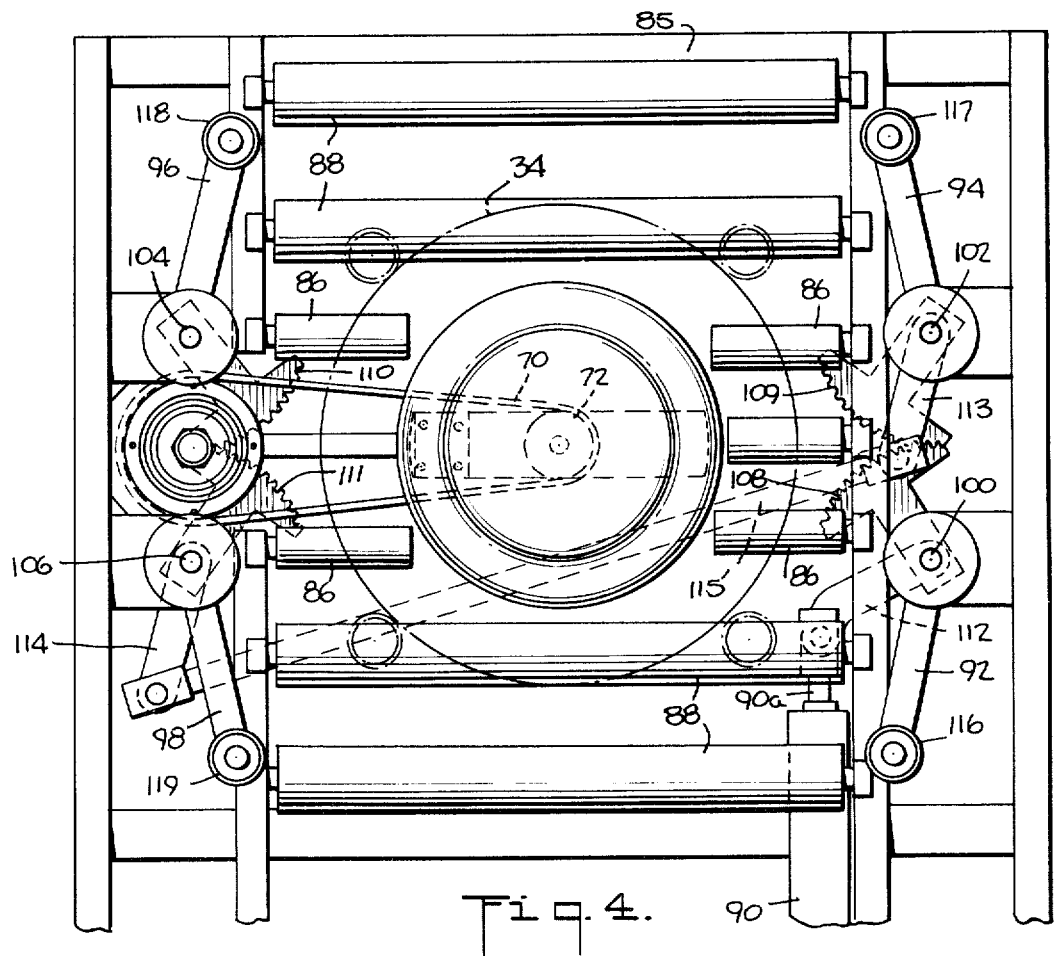
Fig. 4.
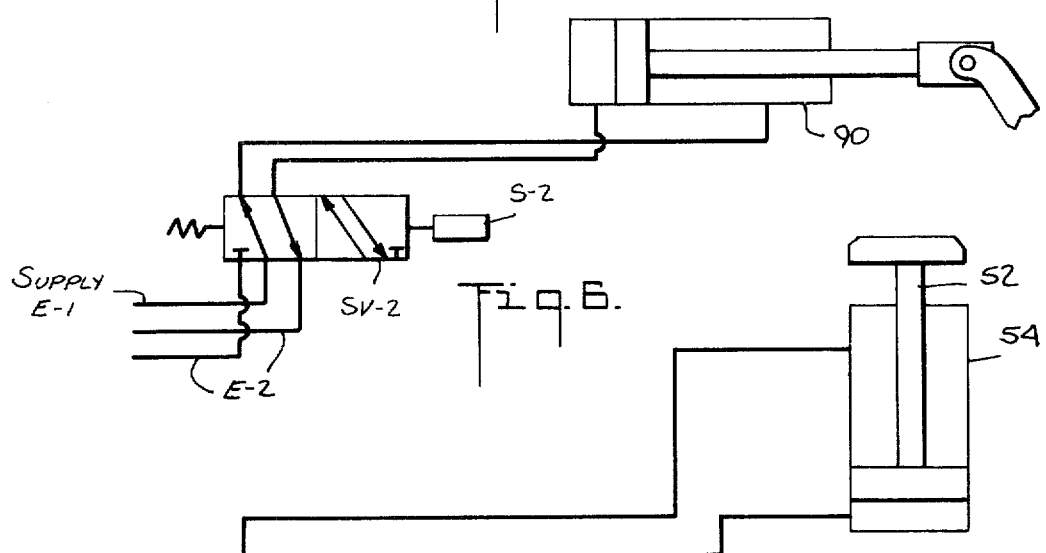
Fig. 6.
Fig. 5.
INVENTOR.
JOHN W. UGO
BY Robert S. Salzman
Jack Posin
ATTORNEYS

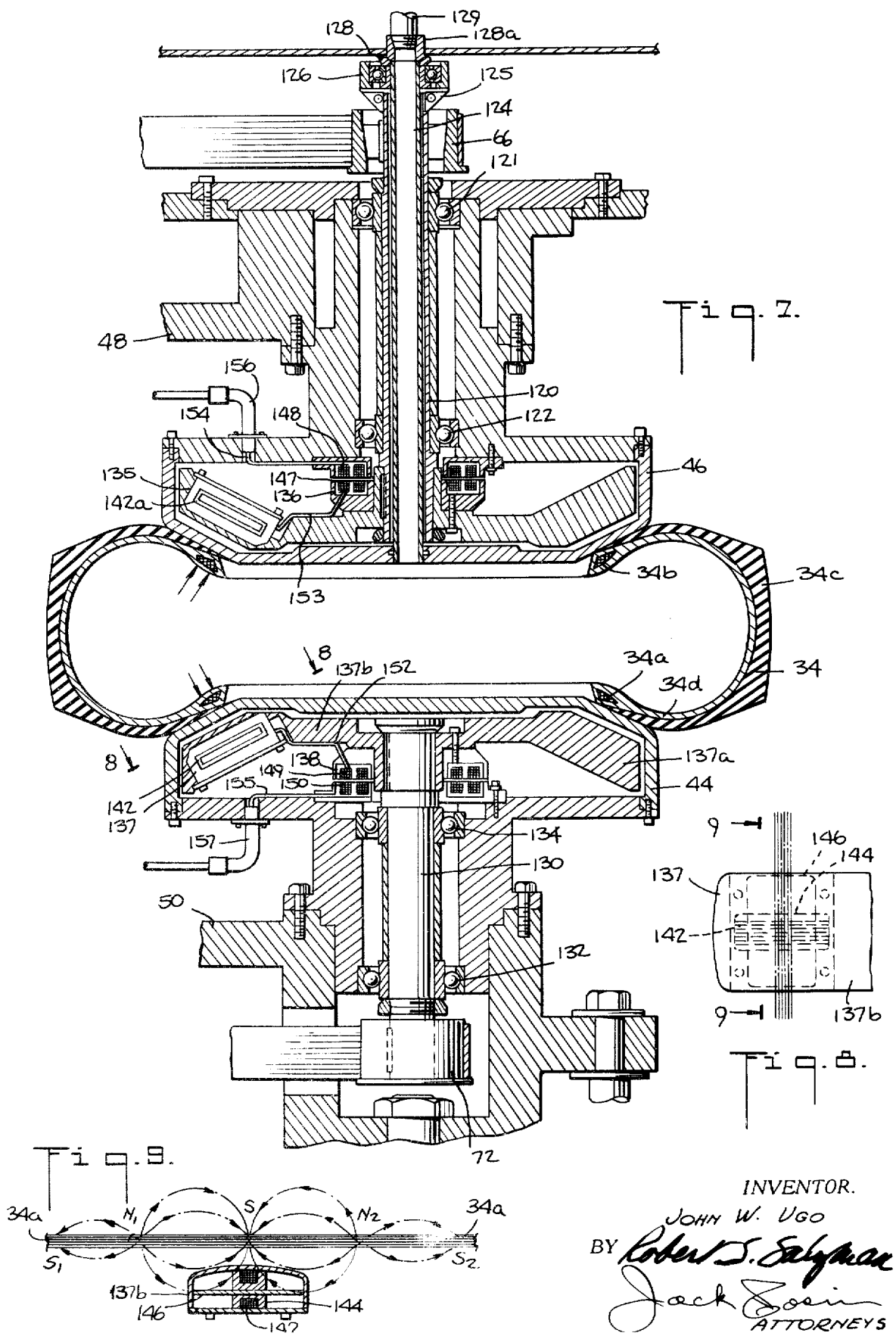

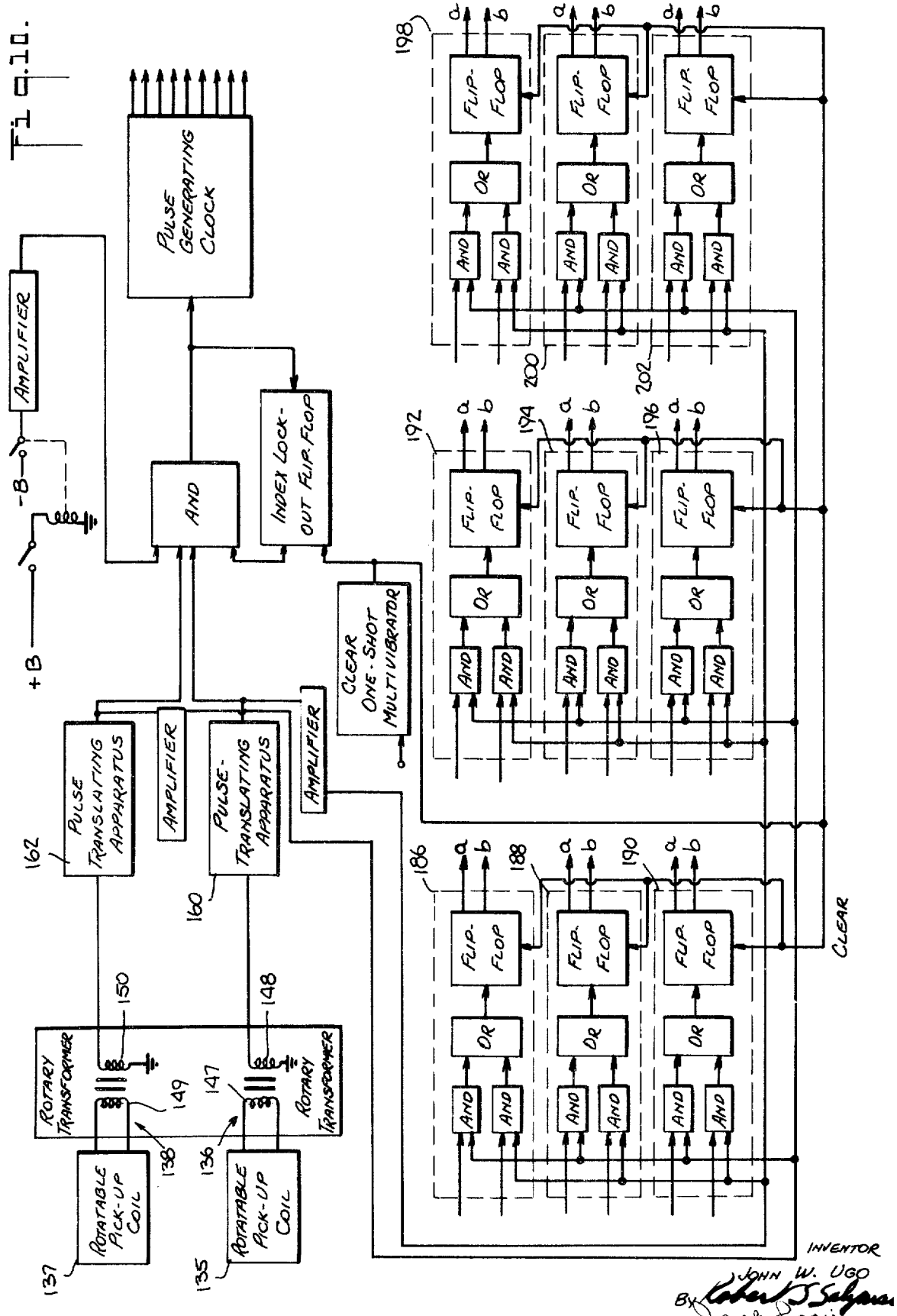

INVENTOR.
JOHN W. UGO
BY Robert S Salzman
Jack Rosin
ATTORNEYS

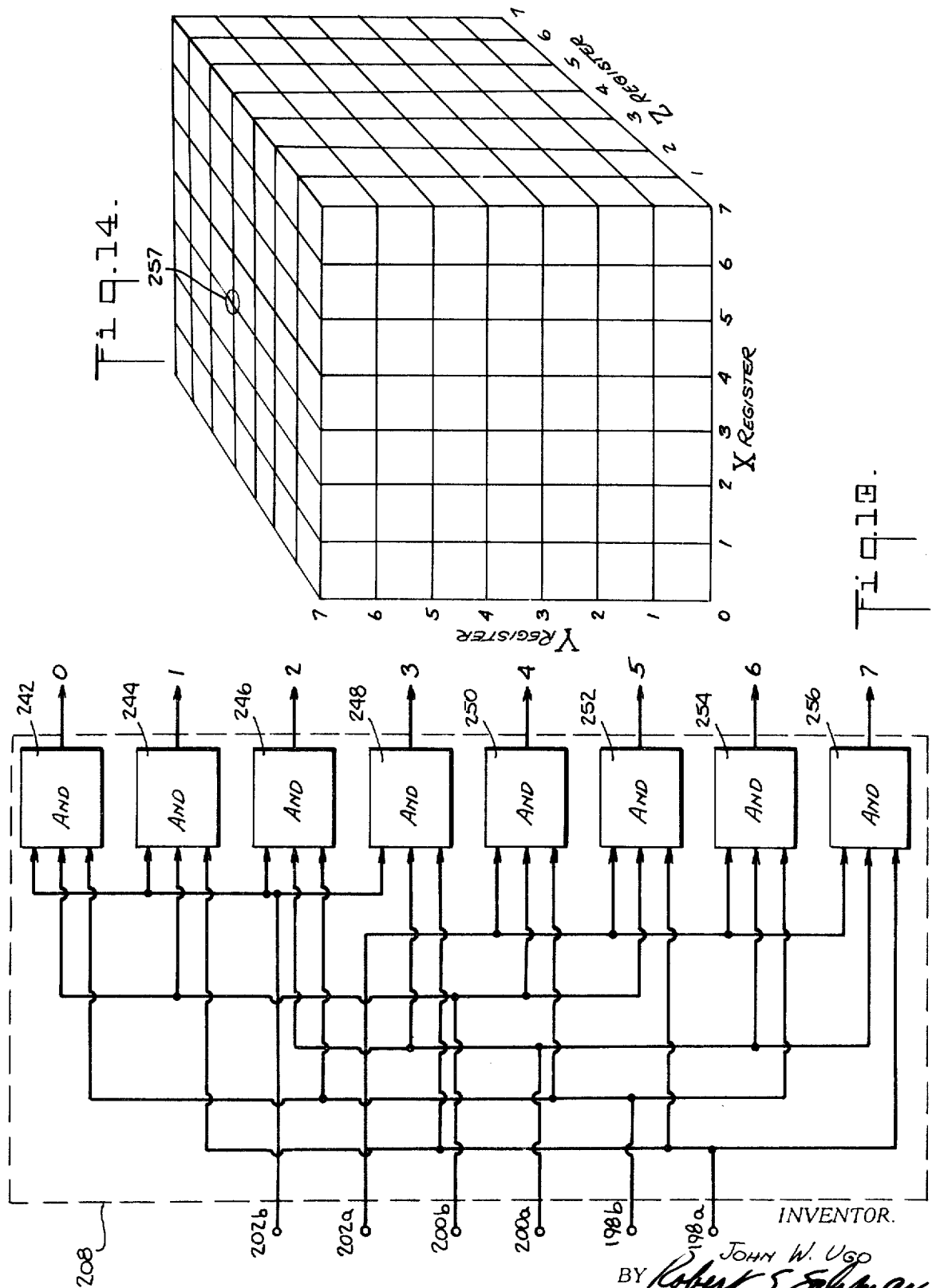

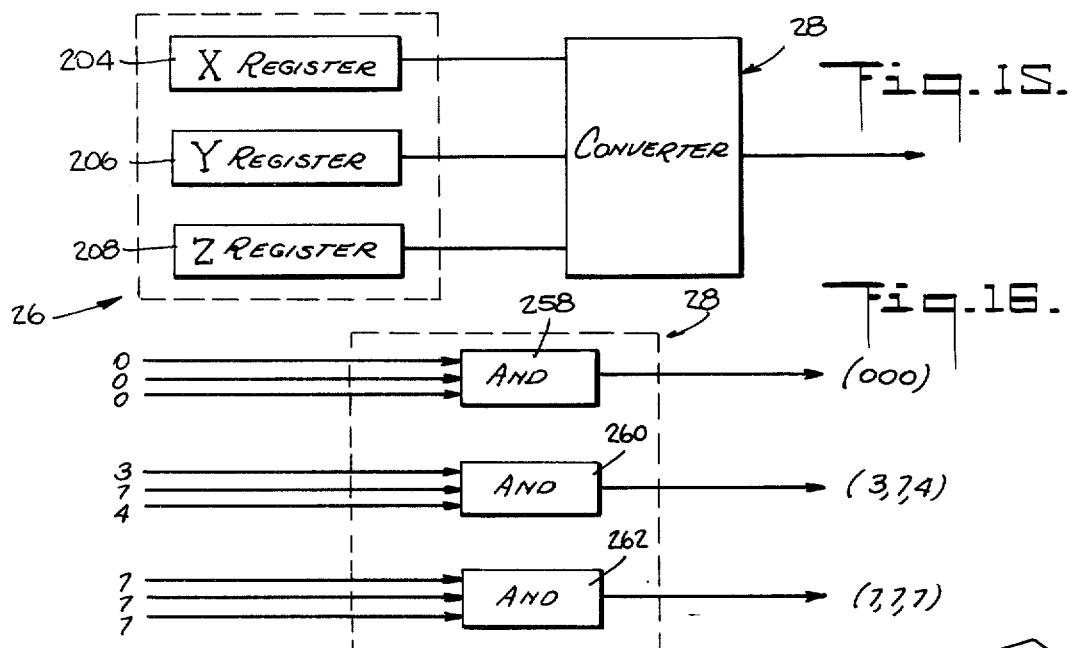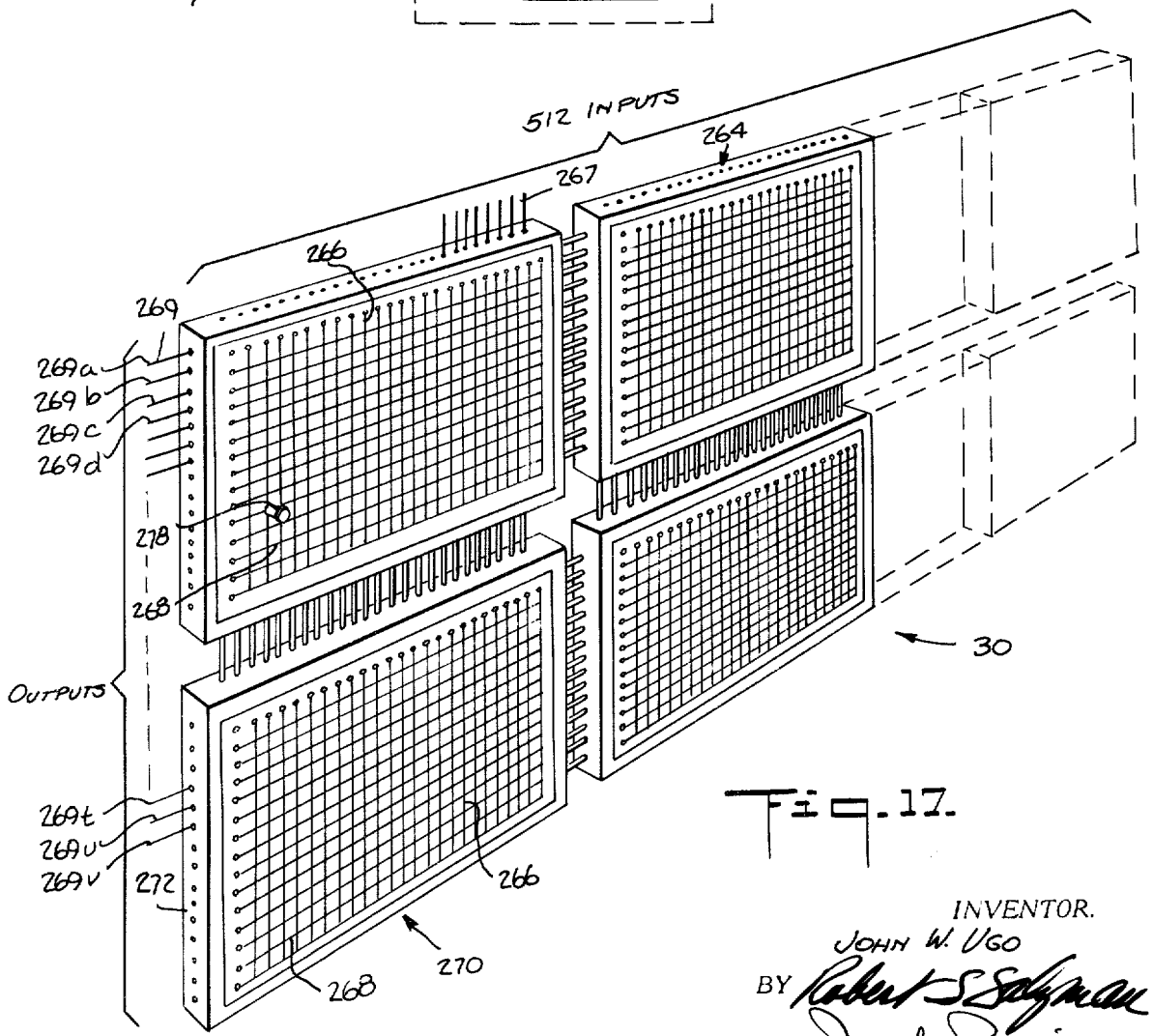

PATENTED JUL 22 1975 3,895,716

SHEET 10

INVENTOR.
JOHN W. UGO
BY
ATTORNEYS

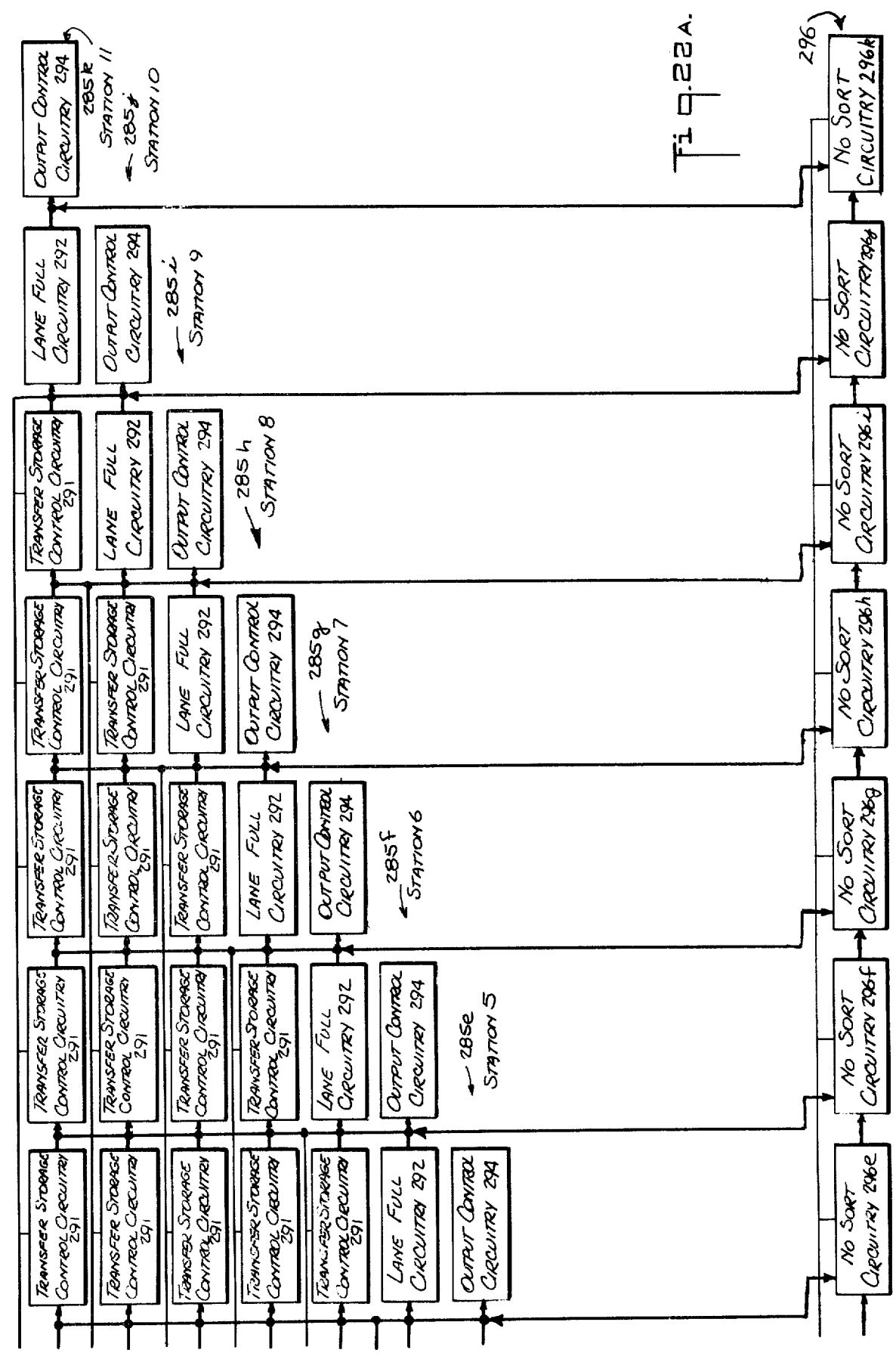

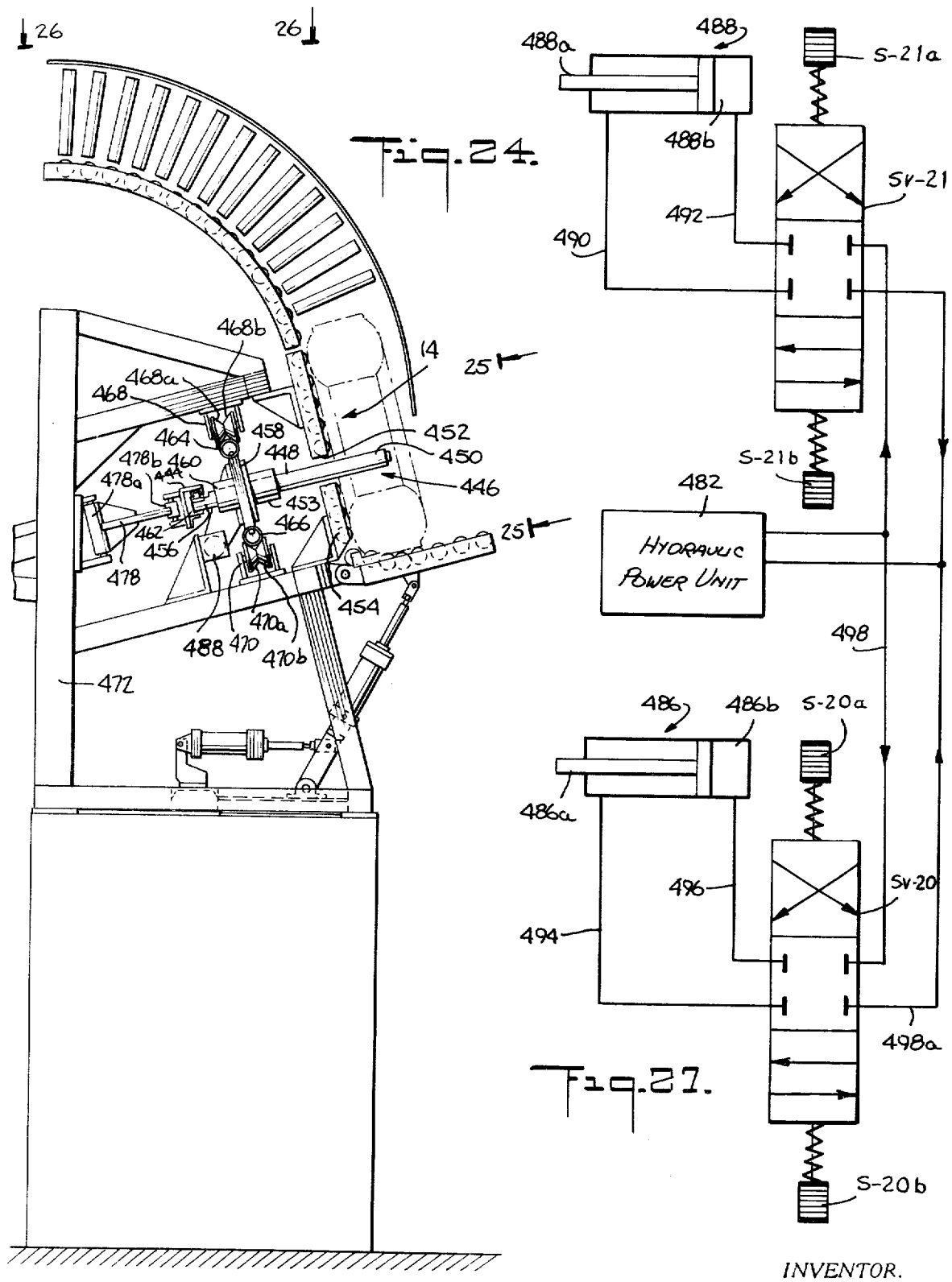

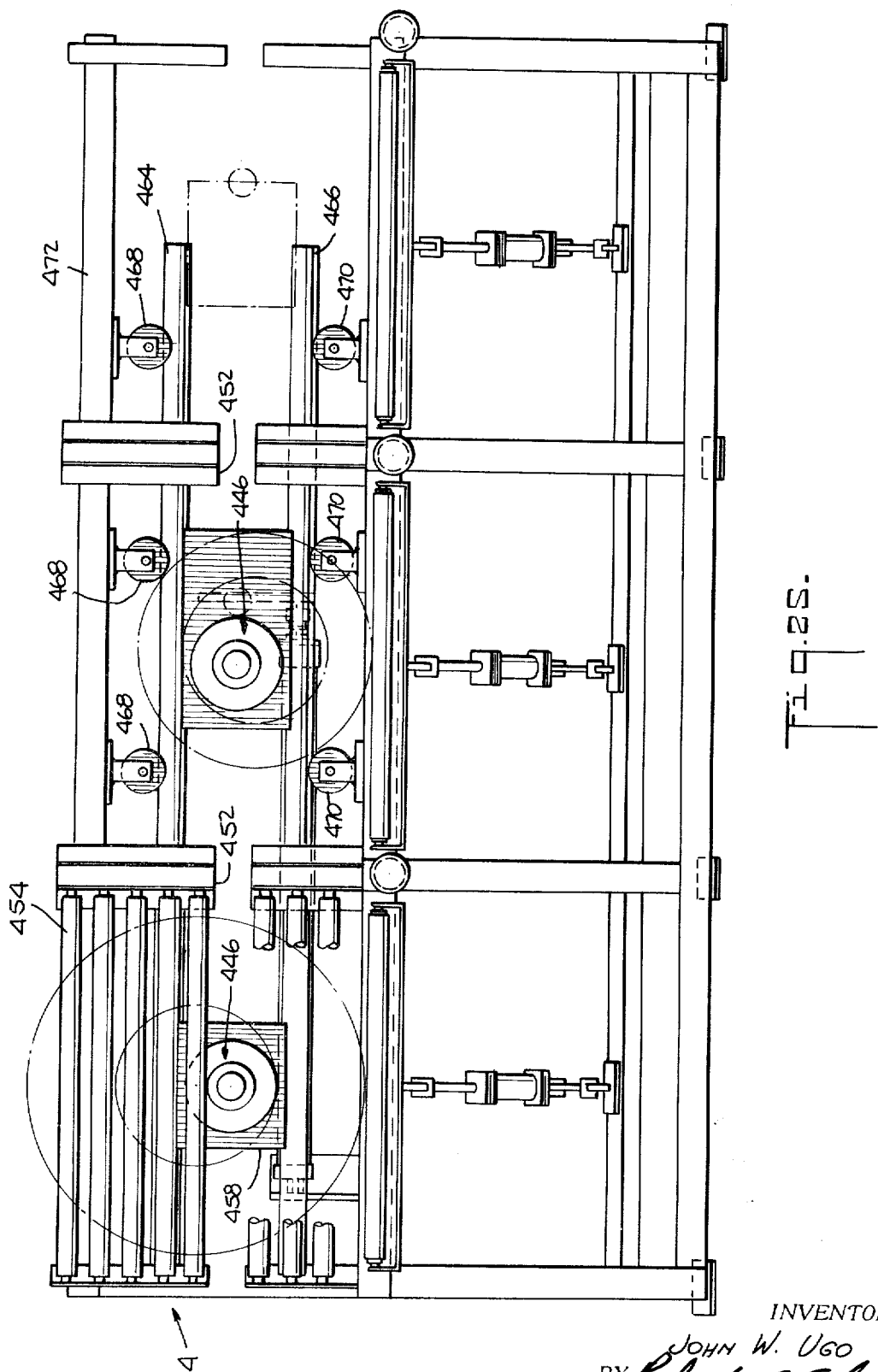

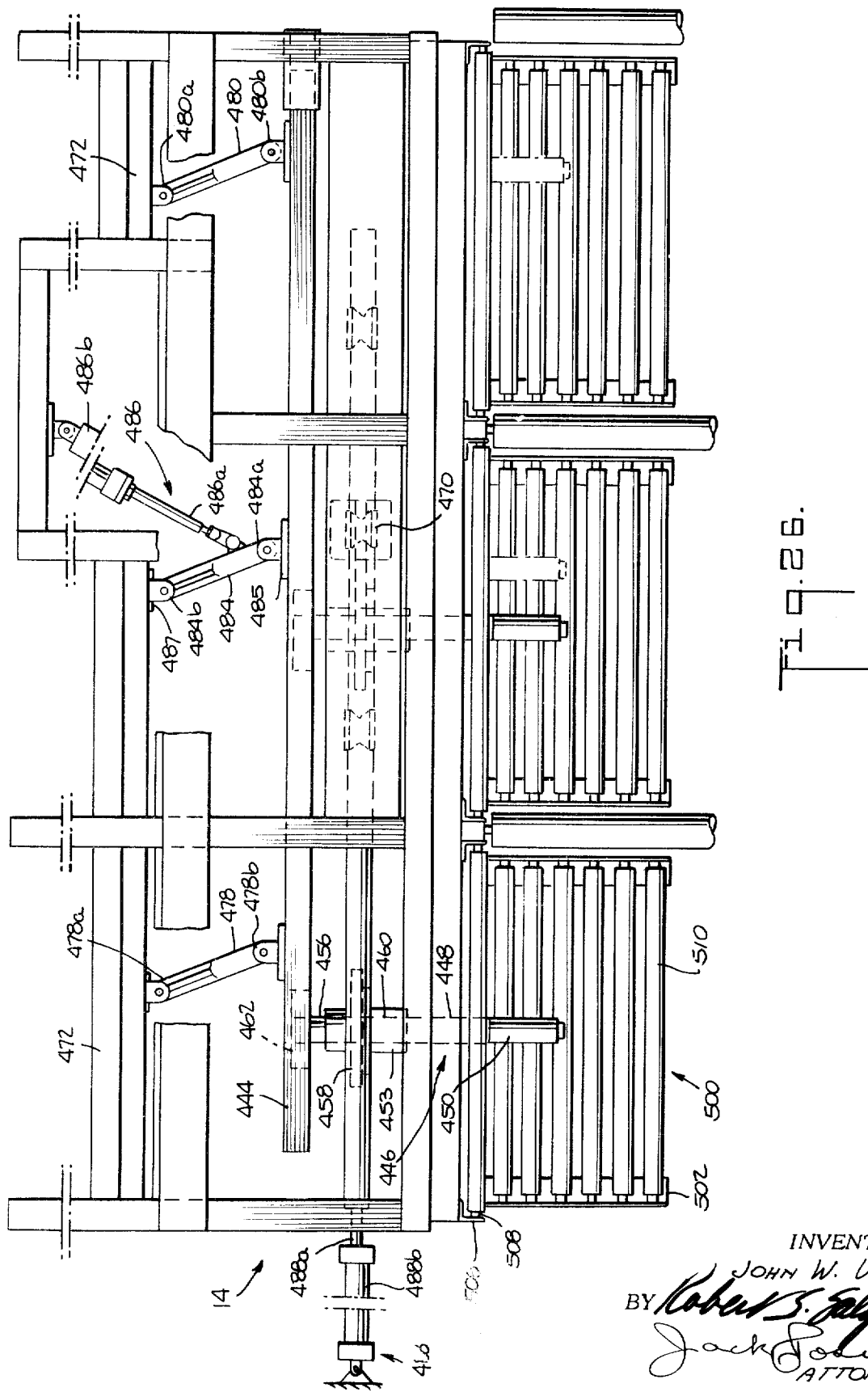

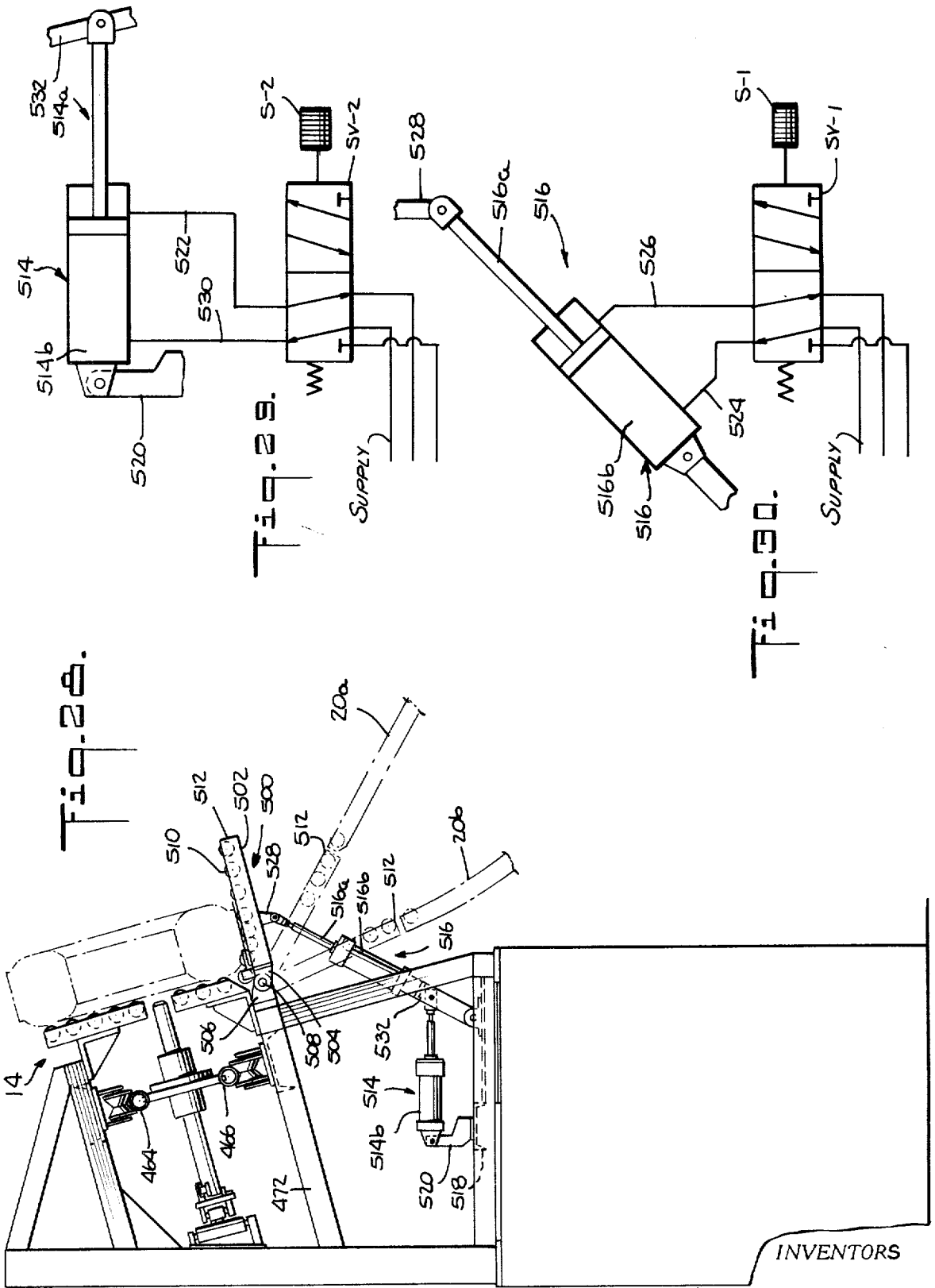

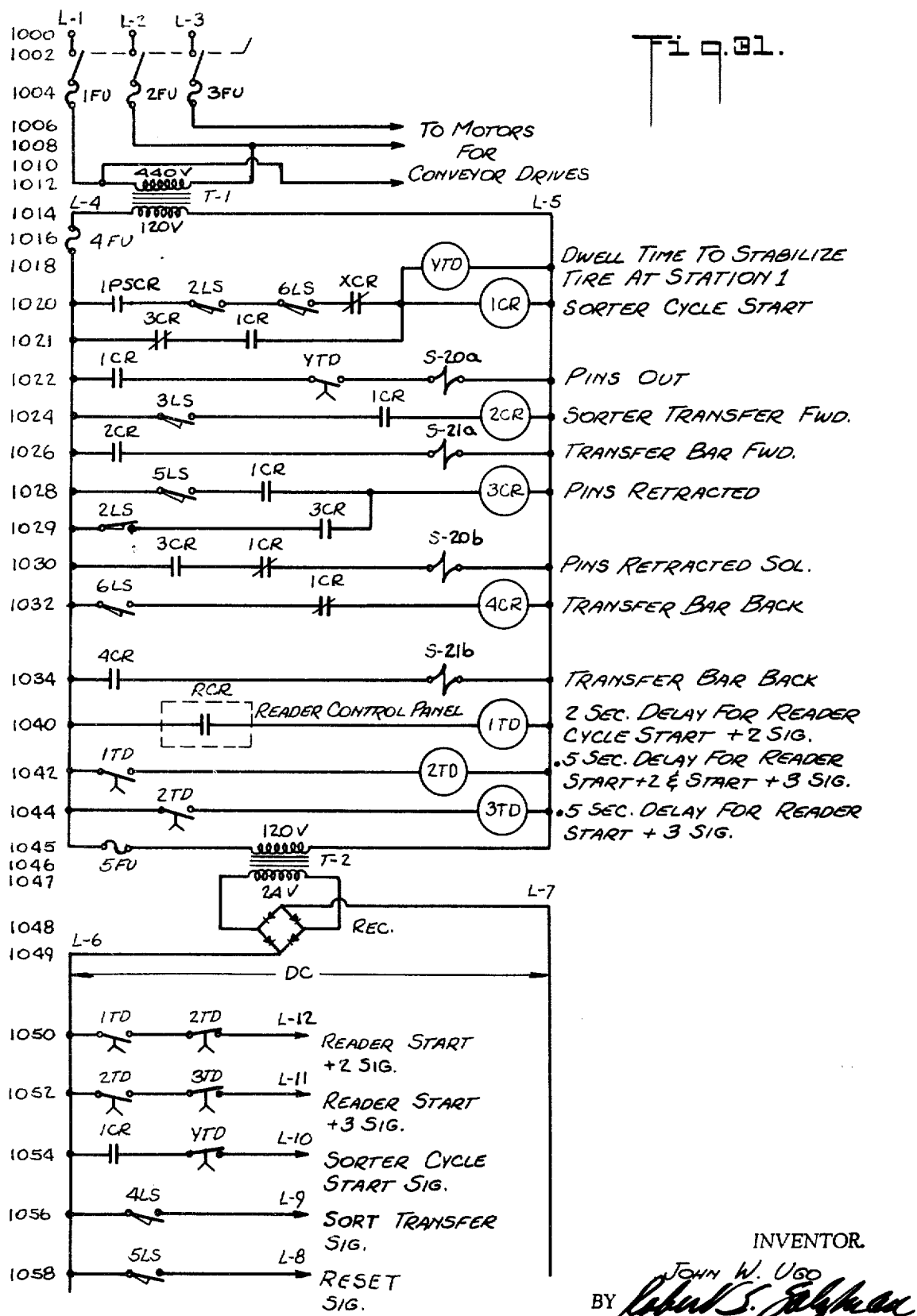

TIRE SORTING APPARATUS

BACKGROUND OF THE INVENTION

This invention relates generally to an apparatus for sorting articles being moved by a conveyor system. More particularly, it concerns an automatic apparatus that identifies the articles, delivers the articles to diverter stations connected to selected ones of a plurality of branch conveyors, and thereupon transfers the articles onto the selected branch conveyors.

Conveying systems of the type having automatic diverter stations for transferring selectively onto a branch conveyor a progression of articles being moved on a main conveyor are quite well known. A typical conveying system will have positioned along a main conveyor diverter stations connected to the branch conveyors. In providing an automatic system it is necessary that some form of control arrangement be utilized which is responsive to the progressive locations of the articles along the main conveyor and which actuates the desired diverter stations at the proper time. The foregoing requirement is met, in conventional sorting apparatus, by having code reader units in association with the diverter stations.

The usual practice in conventional sorting apparatus is to provide a separate code reader unit for each one of the diverter stations. Such code reader units actuate the diverter stations in response to being activated by specifically coded articles in the progression of the articles along the main conveyor so as to transfer the specifically coded articles onto the appropriate branch conveyors. Typically, coded information is placed on the articles being conveyed, or on the article carriers, or on the main conveyor itself so as to automatically, selectively activate the code reader units. The code reader units, in turn, excite the diverter stations so as to initiate the transfer of predetermined articles from the main conveyor onto the selected branch conveyors associated therewith.

Heretofore, it has been the practice to have a code reader unit positioned at or adjacent to each one of the diverter stations so as to initiate the transfer of articles from the main conveyor onto the branch conveyors connected to such stations. Each such code reader unit is adapted to identify the articles passing by, and to determine which of such articles are to be transferred onto the branch conveyors of the diverter station under its control. In response to being activated by the specific coding or a passing article, article carrier, or portion of a conveyor, the code reader unit initiates a signal which causes the designated article to be transferred onto a branch conveyor of the diverter station regulated by that code reader unit. If, however, the passing article is to be transferred onto a branch conveyor connected to a diverter station other than the one at which the article is located, the article remains on the main conveyor and moves to the next successive diverter station. In this way, the article is progressively moved along the main conveyor to the diverter station connected to the selected one of the plurality of branch conveyors.

It is evident that a system of the foregoing conventional type requires a plurality of code reader units, i.e. one code reader unit being assigned to each one of the diverter stations. (U.S. Pat. No. 3,144,926 to Edelman). Moreover, since such systems do not usually provide for delays in actuation of the diverter station after actuation of the code reader unit associated with such station, only one article may at any given time be in transit between the code reader unit and the branch conveyor or conveyors connected to the diverter station associated with such code reader unit.

A variation of the foregoing conventional type of system utilizes one code reader unit for each pair of diverter stations to control the sorting of articles from a main conveyor to branch conveyors (U.S. Pat. No. 3,152,681 to Byrnes et al.). This system, once again requires a plurality of code reader units, i.e. one code reader unit being assigned to each pair of diverter stations. In addition, the typical code reader unit utilized therein does not incorporate a memory system to provide for predetermined, unalterable, delayed actuation of the diverter stations after actuation of the associated code reader unit. This omission generally precludes having more than one article on the main conveyor between the code reader unit and the pair of diverter stations associated therewith, limiting the throughput of the article sorting system as well as the number of branch conveyors that can be serviced by each code reader unit.

In order to overcome various of the disadvantages applicable to sorting articles on presently used apparatus, it has been found desirable, in accordance with the present invention, to provide a sorting apparatus in which is employed a code reader unit positioned remote from the branch conveyors and a memory system which provides for predetermined, unalterable, delayed actuation of the diverter stations, thereby permitting a plurality of articles to be enroute to the selected branch conveyors after leaving the code reader unit.

Accordingly, it is a primary object of the present invention to provide an improved apparatus for sorting articles.

With more particularity, it is an object of the present invention to provide an improved sorting apparatus in which a plurality of articles may be in common transit between a code reader unit and a plurality of selected branch conveyors.

A related object of the present invention is to provide an improved sorting apparatus which includes a code reader unit remote from a plurality of branch conveyors and diverter stations associated therewith.

Another object of the present invention is to provide improved means to store code signals therein and to release the same therefrom at predetermined times in connection with the transfer of articles from a main conveyor onto selected ones of a plurality of branch conveyors.

An additional object of the present invention is to provide an improved sorting apparatus which uses modular construction so that the apparatus may be readily expanded and is easily maintained in use thereof.

In one of its aspects, it is an object of the present invention to provide an improved memory unit to store code signals therein and to release the same thereform at predetermined times.

Similarly, it is an object of the present invention to provide an improved transfer unit for moving simultaneously in step-by-step increments articles in engagement therewith.

Moreover an object of the present invention is to provide an improved diverter unit for transferring to branch conveyors articles disposed on a main conveyor.

Further objects and advantages of the invention will become apparent as the following description proceeds.

SUMMARY OF THE INVENTION

Briefly stated, and in accordance with one embodiment of the present invention, there is provided an apparatus which moves articles, for example, automobile tires, sequentially through a series of diverter stations onto selected ones of a plurality of branch conveyors connected to such diverter stations. The articles are routed from a main conveyor onto the selected branch conveyors, which, in turn, deliver the articles to desired termini. Pursuant to the provisions of this invention, the apparatus preferably includes a sensor unit, remote from the diverter stations for developing code signals defining the selected branch conveyors onto which the articles are to be transferred, and a memory unit for storing the code signals. The code signals from the sensor unit are stored in the memory unit until required for transferring the articles onto their selected branch conveyors. The release of the code signals from the memory unit is keyed to the progression of the articles along the main conveyor and the code signals are released as the articles reach the diverter stations of the selected branch conveyors to which they are to be shifted. In this way the code signals developed by the sensor unit regulate the transfer of the articles onto their designated branch conveyors.

In accordance with one further aspect of this invention there is provided a transfer unit for moving simultaneously in step-by-step increments the articles disposed on the main conveyor. The transfer unit advances the articles sequentially from the sensor unit through various intermediate diverter stations to the diverter stations at which the articles are transferred to their selected branch conveyors.

In accordance with yet another aspect of the present invention, each of the diverter stations of the sorting apparatus includes a diverter unit constructed and arranged to transfer articles located at the diverter station from the main conveyor onto one or another of a plurality of branch conveyors associated with such diverter stations.

BRIEF DESCRIPTION OF THE DRAWINGS

While the specification concludes with claims particularly pointing out and distinctly claiming the subject matter of this invention, it is believed that the invention will be better understood from the following description of the same as embodied in a system for sorting tires by way of example, taken in conjunction with the following drawings, in which:

FIG. 4 is a sectional view of the code reader unit taken along the line 4—4 of FIG. 3 in the direction of the arrows, with portions thereof broken away for clarity;

FIG. 5 is a schematic diagram of a pneumatic control system for actuating a lift cylinder in the FIG. 3 code reader unit;

FIG. 6 is a schematic diagram of a pneumatic control system for a centering device in the FIG. 3 code reader unit;

FIG. 7 is an enlarged, sectional, fragmentary view of the FIG. 3 code reader unit shown gripping a tire;

FIG. 8 is an enlarged fragmentary, plan view, taken along the line 8—8 of FIG. 7 in the direction of the arrows, showing a magnetic pick-up head on the FIG. 3 code reader unit;

FIG. 9 is a sectional view of the magnetic pick-up head, taken along the line 9—9 of FIG. 8 in the direction of the arrows;

FIG. 10 is a block diagram of electrical circuits employed in the FIG. 3 code reader unit;

FIG. 13 is a block diagram of an Z-register utilized in the translator circuit;

FIG. 14 is a spatial representation of the relationship between translator planes formed by the FIG. 11 X-register circuit diagram, the FIG. 12 Y-register circuit diagram, and the FIG. 13 Z-register circuit diagram;

FIG. 15 is a block diagram depicting the FIG. 11 X-register circuit diagram, the FIG. 12 Y-register circuit diagram, and the FIG. 13 Z-register circuit diagram electrically connected to a converter circuit utilized in the apparatus;

FIG. 16 is a block diagram of the FIG. 2 converter circuit, with portions thereof omitted for clarity;

FIG. 17 is a perspective view of a composite program board employed in the apparatus showing individual program boards detached from each other for the sake of clarity;

FIGS. 22 and 22a, together form a block diagram of electrical circuits used in the memory unit of the apparatus;

FIG. 24 is an elevational view of a transfer unit employed in the apparatus, with portions of the main conveyor being omitted and broken away at various places to provide greater clarity;

FIG. 25 is an enlarged sectional view of the transfer unit, taken along the line 25—25 of FIG. 24 in the direction of the arrows, with portions thereof broken away at various places to provide greater clarity.

FIG. 26 is an enlarged sectional view of the transfer unit taken along the line 26—26 of FIG. 24 in the direction of the arrows, with portions thereof broken away at various places to provide for greater clarity;

FIG. 27 is a schematic diagram of a hydraulic control system for actuating the FIG. 24 transfer unit;

FIG. 28 is an elevational view of a diverter unit, partly in section, with portions of the main conveyor being omitted and broken away at various places so as to provide greater clarity;

FIG. 29 is a schematic diagram of a pneumatic control system for pivoting a gate member of the FIG. 28 diverter unit between a position in alignment with the transfer unit and a position in alignment with an upper level branch conveyor of the FIG. 1 apparatus;

FIG. 30 is a schematic diagram of a pneumatic control system for pivoting the gate member of the FIG. 28 diverter unit between a position in alignment with the upper level branch conveyor and a position in alignment with a lower level branch conveyor of the FIG. 1 apparatus;

FIG. 31 is a schematic circuit diagram illustrating the relay and timing circuitry associated with a tracker unit employed in the apparatus.

DETAILED DESCRIPTION OF THE INVENTION
GENERAL DESCRIPTION

Figure 1:
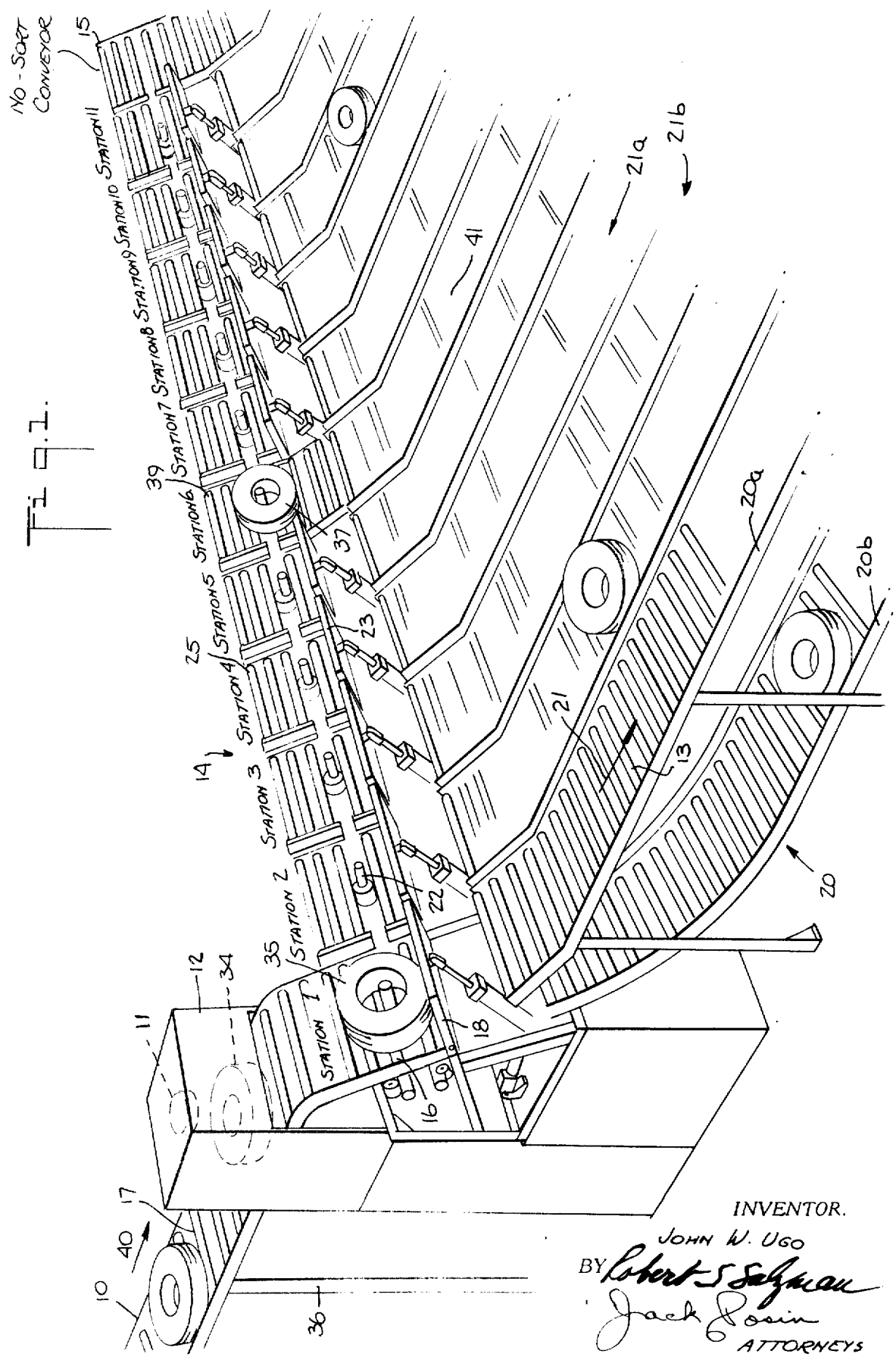
FIG. 1 is a perspective view of apparatus constructed in accordance with this invention for sorting a plurality of tires onto selected ones of a plurality of branch conveyors.
Figure 2:
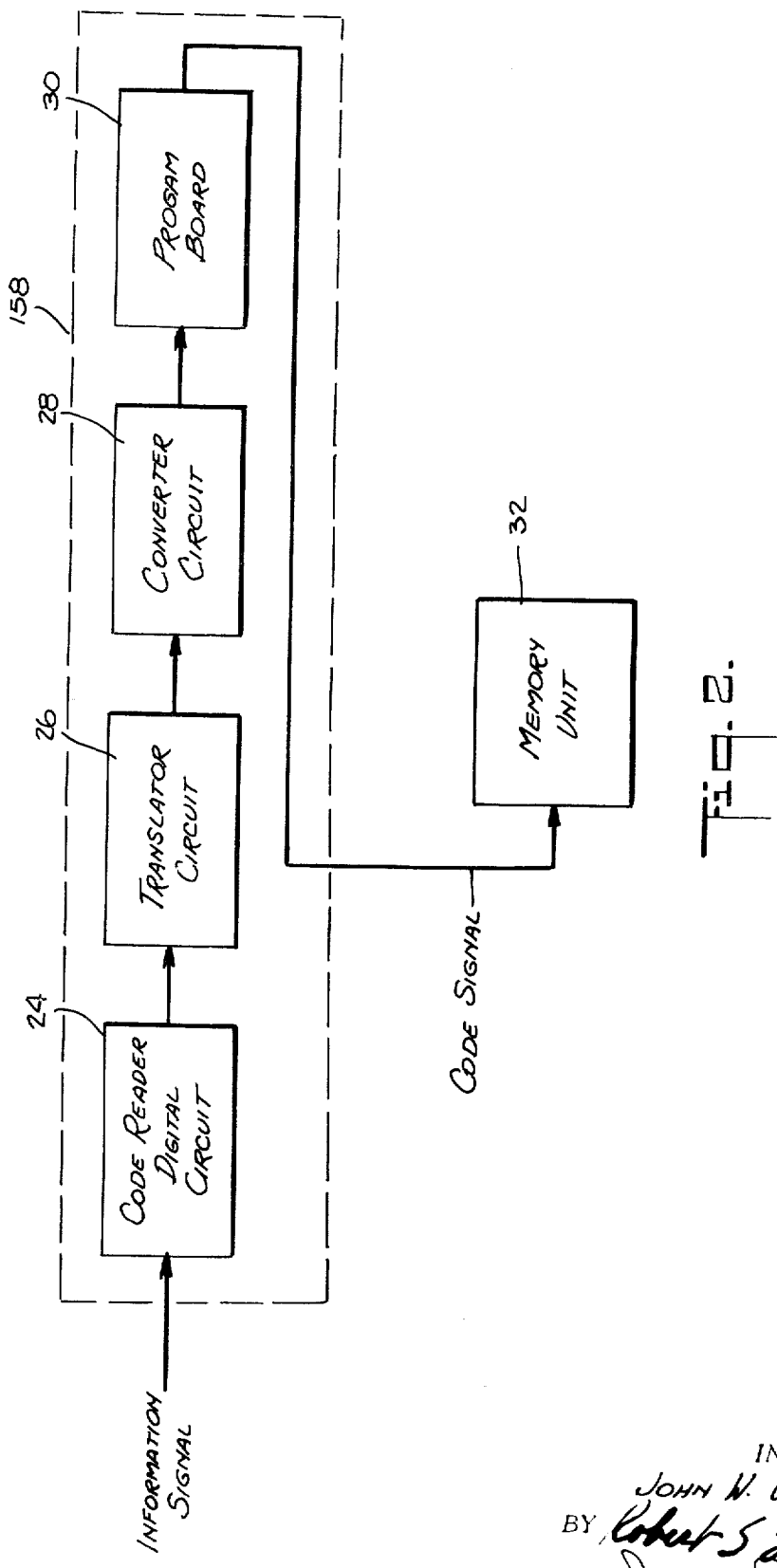
FIG. 2 is a block diagram of electrical circuitry employed in association with the FIG. 1 apparatus.

An embodiment of this invention as employed in a tire sorting apparatus has been illustrated in FIG. 1, and a block diagram of the electrical circuitry employed in association with the FIG. 1 apparatus has been illustrated in FIG. 2.

Turning first to FIG. 1, a tire sorting apparatus is shown therein which includes the following major mechanical components: an entry conveyor, designated generally at 10; a sensor means or sensor unit, shown generally at 11, including a code reader unit designated generally at 12; a main conveyor, designated generally at 14; a plurality of like diverter stations, the first diverter station being shown generally at 16; a plurality of like diverter means or diverter units, the diverter unit positioned at the first diverter station 16 being illustrated generally at 18; a plurality of like branch conveyors, the pair of branch conveyors connected to the first diverter station 16 being designated generally at 20; and a transfer means or transfer unit, shown generally at 22. In order to automatically control the operation of the apparatus, the various mechanical components thereof, as shown in FIG. 1, cooperate with the major electrical components shown in FIG. 2.

Referring now to FIG. 2, there are shown the following major electrical components: sensor circuit means, shown generally at 158, including a code reader digital circuit, designated generally at 24, a translator circuit, shown generally at 26, a converter circuit, illustrated generally at 28, and a program board, depicted generally at 30; and a memory means or memory unit, shown generally at 32.

Turning once again to FIG. 1, a tire 34 having a magnetic code disposed on the bead wire thereof enters the code reader unit 12 and the sensor unit 11 thereof identifies the selected one of the plurality of branch conveyors onto which the tire 34 is to be transferred. The tire thereupon exits the sensor unit 11 and code reader unit 12 and descends onto the main conveyor 14 at the first diverter station 16. (For example, tire 35 has descended from the code reader unit 12 onto the main conveyor 14 at the first diverter station 16.) Whereupon, the transfer unit 22 receives the tire, and, provided the tire is not to be transferred onto the branch conveyors 20 connected to the first diverter station 16, the tire is moved sequentially, in step-by-step increments, through intermediate diverter stations to the diverter station connected to the branch conveyor onto which the tire is to be transferred. The diverter unit located at such diverter station is then actuated, and, in response thereto, transfers the tire onto the selected branch conveyor. (For example, tire 37 at the sixth diverter station, designated generally at 39, is shown being transferred onto the upper level branch conveyor 41.) Hence, the apparatus is adapted to route a tire from the code reader unit 12 to the selected branch conveyor in accordance with the information present on the bead wire of the tire, the branch conveyor subsequently delivering the tire to the desired terminus.

With continued reference to FIG. 1, the tire sorting apparatus preferably includes ten additional diverter stations which are similar to the first diverter station 16, a diverter station being defined as a region on the main conveyor 14 from which a tire is transferred onto a branch conveyor. Each diverter station along the main conveyor has a pair of branch conveyors connected thereto. It is evident therefore that the apparatus has 22 branch conveyors, two branch conveyors being associated with each one of the 11 diverter stations. Thus, for example, the first diverter station 16 has an upper level branch conveyor 20a and a lower level branch conveyor 20b operatively associated therewith. In addition, each one of the 11 diverter stations has a diverter unit in association therewith for transferring the tire onto either the upper level or lower level branch conveyors connected thereto. Furthermore, a no-sort conveyor 15 receives the tires in the event that the selected branch conveyor has no available space thereon for the tire.

The branch conveyors utilized in the conveyor system of this invention preferably include a plurality of gravity rollers 13 which allow the tires carried thereon to move in the directions of the arrow 21 shown in FIG. 1. The code reader unit 12 and its sensor unit 11 are mounted on the entry conveyor 10 ahead of the main conveyor 14 at a point remote from the branch conveyors. The entry conveyor 10 is supported by a structural frame member 36. The entry conveyor 10 also preferably includes a plurality of rollers 17 which are driven by suitable driving means (not shown) for causing tires carried thereon to move in the direction of the arrow 40 shown in FIG. 1. The transfer unit 22 is mounted on the main conveyor 14. It alternately engages the various tires on the main conveyor in moving them from diverter station to diverter station and disengages from the tires while they are at the various diverter stations. The main conveyor 14 is constructed and arranged so as to permit the tires to descend onto their selected branch conveyors when their respective diverter units are actuated. Normally, unless a particular tire is to be transferred onto a given branch conveyor, the diverter unit associated with such branch conveyor remains deactuated and the tire is supported by the diverter unit. If a tire is to be transferred from the diverter station at which it is located onto either of the branch conveyors, the diverter unit is actuated so as to enable the tire to descend onto the selected branch conveyor. However, if the tire is not to be transferred at the diverter station at which it is located, the diverter unit is not actuated and the transfer unit 22 once again engages the tire so as to move it to the next successive diverter station.

The various mechanical components of the apparatus are controlled by the electrical circuitry shown schematically in FIG. 2. When a tire 34 having a magnetic code disposed on the beads thereof enters the code reader unit 12 (FIG. 1), the sensor unit 11 reads such magnetic code and develops a corresponding information signal therefrom. Referring to FIG. 2, this signal is fed to the code reader digital circuit 24 which develops a nine bit binary signal representing the magnetic code on the tire beads. The nine bit binary signal from the code reader digital circuit 24 excites the translator circuit 26. In response thereto the translator circuit 26 forms a set of three decimal signals, each of which may have a value of from 0 through 7, inclusive. Since each of the three signals developed by translator circuit 26 may have any one of eight different values (0–7), the translator is capable of developing at any given time any one of 512 different output signals (8 × 8 × 8). The translator circuit 26 includes three registers therein, each of which is provided with eight output lines. Accordingly, the 512 potentially different output signals of the translator are developed in various combinations on the 24 output lines of the registers. The 24 output lines of the translator circuit are connected to corresponding input lines of the converter circuit 28. The converter circuit 28 is provided with 512 output lines, each line of which corresponds to one of the 512 output signals capable of being formed by the translator circuit 26. The converter circuit processes the output signals of the translator circuit 26 and directs the same to the proper one of the 512 output lines connected thereto.

The 512 output lines of the converter circuit 28 are connected as separate inputs to the program board 30. Program board 30, in the present embodiment, utilizes 22 output lines. The 512 input lines, representing 512 different tire codes, can be manually patched to any of the output lines of the program board. The output of the program board will define the branch conveyor onto which a given tire is to be sorted. More than one tire can be programmed to a given branch conveyor at a given time. Inasmuch as there are only 22 branch conveyors, the 512 combination signals are reduced to 22 code signals and each one of the code signals developed by the program board 30 designates a distinct branch conveyor. It is evident that since there are only eleven diverter stations, each one having a pair of branch conveyors connected thereto, only 22 code signals are required in the embodiment of the invention depicted in FIG. 1. However, it should be noted that the electrical circuits of the apparatus are capable of developing as many as 512 distinct code signals which could be used to control up to 256 different diverter stations of the type disclosed herein with suitable modification of the apparatus.

The memory unit 32 controls the diverter units in accordance with the progression of the tire along the main conveyor 14 during the sort cycle. The code signal from the program board 30 is transmitted to one of eleven like logic units in the memory unit 32. Each of the logic units controls a diverter unit associated with one of the diverter stations. The logic units of the memory unit 32 receive one of two possible input code signals, i.e. a code signal designating either the upper level branch conveyor or the lower level branch conveyor as the selected one. The memory unit 32 stores the designated code signal until the tire arrives at the diverter station connected to the selected branch conveyor onto which the tire is to be transferred. At this time, the designated code signal is released from the memory unit 32 and actuates the diverter unit operatively associated with the diverter station at which the tire is located so as to enable the tire to descend onto the selected branch conveyor.

The apparatus shown in FIG. 1 operates in both an automatic mode and a manual mode. When in the automatic mode of operation, the apparatus of FIG. 1 is controlled by the electrical circuitry depicted in FIG. 2. In the automatic mode of operation, as shown in FIG. 1, a tire 34 enters the code reader unit 12 on the entry conveyor 10 where the sensor unit 11 automatically identifies it as to size and brand. Information identifying the tire 34 is in coded form and is sent to the electrical circuits of FIG. 2 where it is processed. The electrical circuits of FIG. 2 scan the code reader unit 12 every 5.7 seconds. It takes approximately 0.3 second to process the coded information and send a code signal to the memory unit 32 which, in turn, stores the code signal identifying the branch conveyor onto which the tire 34 is to be transferred.

Upon completion of scanning by the code reader unit 12, a signal is developed so as to enable the code reader unit 12 to start a new reader cycle. This signal will initiate the read cycle if the transfer unit 22 is in the proper position for receiving the tire 34 from the code reader unit 12. If the transfer unit 22 is in the wrong position, i.e. the transfer unit 22 and code reader unit 12 are out of cycle or synchronism, it will interfere with the tire 34 being discharged from the code reader unit 12. To eliminate this out of cycle condition it is necessary to interlock the transfer unit with the code reader unit cycle. Once in synchronism the code reader unit and transfer unit will operate therein as long as tires are awaiting identification. The only time an out of cycle condition may exist is when the flow of tires entering the code reader unit is sporadic. In the event that the tire is not identified at the code reader unit 12, the tire is discharged onto the no-sort conveyor 15. The no-sort conveyor 15 is preferably connected to the main conveyor after the branch conveyors.

After the code signal is sent to the memory unit 32, the tire is discharged from the code reader unit 12 and descends to the first diverter station 16. If the tire is to be shifted onto one of the branch conveyors 20 connected to the first diverter station 16, a code signal designating the selected branch conveyor, i.e. the upper level 20a or the lower level 20b, will be released from the memory unit 32 so as to actuate the diverter unit 18 for transferring the tire onto either of the selected branch conveyors. However, if the tire is to be transferred at one of the other diverter stations, the diverter unit 18 would not be actuated and the code signal would remain stored in the memory unit 32 until the tire reached the diverter station connected to the selected branch conveyor.

Sorting is accomplished in the system by moving the tires in sequence through successive intermediate diverter stations until the tires arrive at the diverter stations connected to the selected branch conveyor. It takes approximately 5 seconds to transfer the tire from one diverter station to the next successive diverter station. When the tire arrives at the diverter station at which it is to be transferred to a branch conveyor, the designated code signal is released from the memory unit 32. The code signal excites the diverter unit thereat for transferring the tire onto the selected branch conveyor. The shifting of the tire from the diverter station onto the selected branch conveyor takes approximately 2 seconds.

In the event the tire is to be shifted onto a branch conveyor having no space available thereon, a lane full signal is developed by the branch conveyor, thereby indicating that the branch conveyor is full. The lane full signal is sent to the memory unit 32, which, in turn, causes the tire to be transferred onto the no-sort branch conveyor.

Assuming that the branch conveyors have space thereon, it is possible for the apparatus of FIG. 1 to transfer simultaneously a plurality of tires from the main conveyor 14 to their respective branch conveyors. Theoretically, the apparatus is capable of transferring simultaneously as many tires from the main conveyor to their respective branch conveyors as there are diverter stations. As a practical matter, however, this does not usually happen.

Suitable manual circuitry (not shown) may be provided to allow for operation of the apparatus in the event of the occurrence of a breakdown or malfunction in the automatic mode of operation. The manual operation of the apparatus may be identical to the automatic operation heretofore described, with the exception that the operator visually identifies each tire and presses pushbuttons which initiate the various operating steps of the apparatus.

Code Reader Unit

The code reader unit 12 (FIG. 1) contains the sensor unit 11, which decodes the digital magnetic code disposed on the bead wires of the tire and develops the code signal defining the selected branch conveyor onto which the tire is to be sorted. This information is carried on the bead wires of the tires in the form of a plurality of magnetic spots or pulses, one of which is termed an indexing digit and the remainder of which are termed information digits. The code reader unit 12 includes the sensor unit 11 and the associated circuit means shown generally at 24 in FIG. 2. The code reader unit 12 and the code reader digital circuit 24 are described in greater detail in the application of Ugo and Tomsic for an Apparatus For Magnetically Coding and Decoding Pneumatic Tire Members, Ser. No. 481,181, filed Aug. 20, 1965, now U.S. Pat. No. 3,460,119, issued Aug. 5, 1969, which patent is assigned to the assignee of the present invention. However, for purposes of clarity and ease of understanding, a brief description of this component and the electrical circuitry associated therewith is included at this point.

Figure 3:
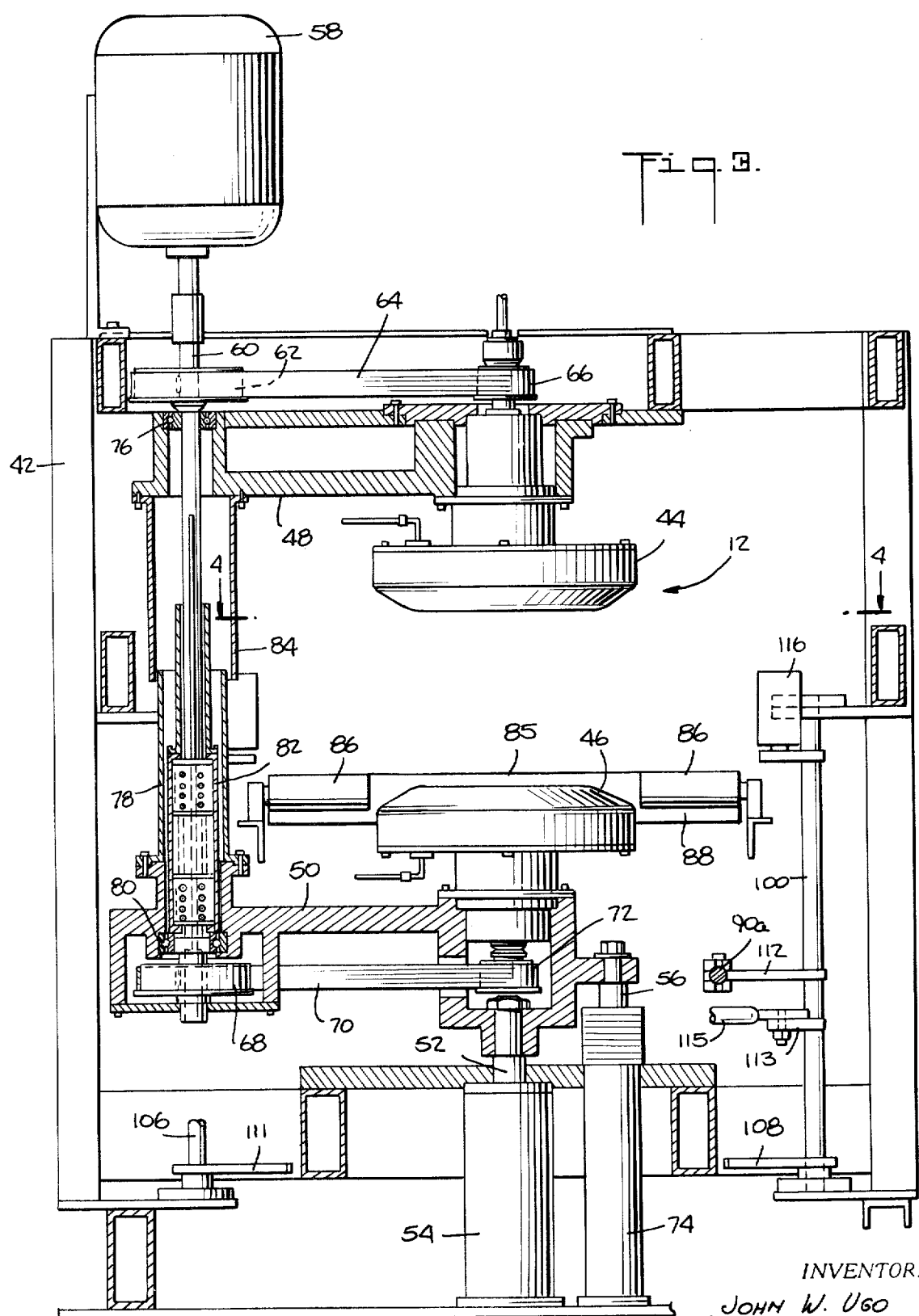
FIG. 3 is an elevational view, partly in section and with parts broken away, of a code reader unit for decoding digital magnetic code information carried on the bead wires of tires.

The code reader unit shown in FIG. 1, and the circuit means 158 shown in FIG. 2, have been illustrated in greater detail in FIGS. 3 through 21. Referring more particularly to FIG. 3, the code reader unit 12 has a frame support 42 for a pair of rotatable magnetic pick-up means mounted within housings 44 and 46. The housing 44 is bolted to a support member 48 of the frame 42. The housing 46 is bolted to a support member 50 mounted on piston rod 52 of piston-cylinder unit 54 which is adapted for vertical displacement to support or chuck a tire. Guide rod 56 in sleeve 74 provides horizontal stability for support member 50.

A synchronous motor 58 is mounted on the frame 42 for rotating the magnetic pick-up means disposed within the housings 44 and 46 by means of a splined shaft 60 in conjunction with pulley and belt drives 62, 64, 66 and 68, 70, 72. The splined shaft 60 is rotatably mounted in the frame 42 in a suitable bearing 76 and a suitable ball guide assembly 78. The pulley 68 and a bearing 80 are mounted in the outer sleeve of the ball guide assembly 78. The ball guide assembly 78 is seated around the shaft 60 and permits movement of the lower housing 46 and the associated support member 50. Ball guide assembly 78 also keys the pulley 68 to the shaft 60 which, in turn, drives the magnetic pick-up means in lower housing 46. Suitable telescoping covers 82 and 84 house the shaft 60.

Turning now to FIGS. 3 and 4, the code reader unit 12 includes suitable centering apparatus for positioning a tire on a table shown generally at 85, which includes a plurality of short and long conveyor rolls 86 and 88, respectively, mounted on the frame support 42. The centering apparatus is actuated by a pneumatic cylinder 90 which may be manually or automatically controlled. The centering apparatus includes four arms 92, 94, 96, 98 which are keyed to shafts 100, 102, 104, 106, respectively, and are rotated by such shafts upon actuation of cylinder 90. Sector gears 108, 109, 110, 111 are keyed to the shafts 100, 102, 104, 106, respectively, for transmitting rotary motion from one shaft to another, in conjunction with arms 112, 113, 114 and link 115 in order to displace the centering arms 92, 94, 96, 98 in equal amounts in response to actuation of cylinder 90. Suitable rollers 116, 117, 118, 119 are mounted on arms 92, 94, 96, 98, respectively, for engagement with the tread of the tire. The centering mechanism is illustrated in solid line construction in its open position, corresponding to the unactuated condition of cylinder 90, and the rollers are represented in broken-line construction in their positions corresponding to the actuated condition of cylinder 90.

When a tire 34 (FIG. 4) is positioned on the rollers 86 and 88 of table 85 a spring return solenoid valve SV-2 (FIG. 6) under the control of solenoid S-2 is actuated by a suitable electric circuit. The valve SV-2 is shown in FIG. 6 in its normally unactuated condition, and upon energization of the solenoid S-2, the valve shifts to the left from the position shown so as to place the air supply E-1 and exhausts E-2 in communication with the centering cylinder 90 in such a manner as to extend the piston 90a of the cylinder 90 and to rotate the centering arms 92, 94, 96, 98 into engagement with the tire so as to center the tire. The solenoid S-2 may then be deenergized, returning the centering arms to their retracted position.

Turning now to FIG. 5, after centering the tire, a spring-return solenoid valve SV-3, shown in its unactuated condition, may be actuated under the control of solenoid S-3 so as to place the air supply E-1 and exhausts E-2 in such communication with the unit 54 as to cause piston 52 in piston-cylinder unit 54 to move to its extended condition, thereby raising the tire into the position shown in FIG. 7. After completion of the decoding operation, the solenoid S-3 may be deenergized to lower the tire.

Referring to FIG. 7 of the drawings, the housing 44 has there been displaced vertically upwardly so as to chuck the tire 34 between the housings 44 and 46. The tire 34 has a carcass 34d and tread 34c with magnetized bead wires 34a and 34b therein. The pulley 66 is keyed to shaft 120 which is rotatably mounted with respect to the support member 48 and housing 44 by means of suitable bearings 121 and 122. A stationary inner air supply tube 124 for inflating the tire 34 is mounted in the housing 46 and extends through a rotatable collar 125 on shaft 120 to a suitable air supply. The collar 125 is attached to the outer rotatable race of a bearing 126 having a stationary inner race on the tube 124. A suitable nut 128 clamps bearing 126 in position. An air supply tube 129 is threaded in sleeve 128a welded to the tube 124.

The pulley 72 is keyed to shaft 130 which is rotatably mounted in suitable bearings 132 and 134 in support member 50. The shafts 120 and 130, drive respective synchronously rotatable magnetic pick-up means shown generally at 135 and 137, and respective pulse translating means, shown generally at 136 and 138. The pick-up means 135 and 137 are disposed on opposite sides of the tire 34 and are rotatable around the tire axis at a radial distance approximately equal to the radial distance of the magnetically coded beads 34a and 34b therefrom for developing electrical code pulses representative of the indexing digit and information digits carried on the beads.

The magnetic pick-up means 135 and 137 are preferably similar to each other. Accordingly, only one of them, pick-up means 137 disposed in housing 44 will be described. The magnetic pick-up means 137 (FIGS. 8 and 9) preferably includes a coil 142 of wire wound about a frame 144 having a magnetic shield 146 extending through the loop of the coil to isolate one portion of the coil from the magnetic field of the bead wires. The coil 142 is supported on a suitable nonmagnetic portion 137b of the rotatable pick-up means and the pick-up means is counterbalanced by a suitable counterbalance portion 137a (FIG. 7). Portions 137a and 137b of pick-up means 137 are mounted on the rotatable shaft 120. The magnetic pick-up means 135 and 137 preferably are disposed on opposite sides of the tire and are rotated synchronously.

The code reader unit 12 includes the aforementioned pulse translating means 136 and 138 which are coupled to the pick-up means 135 and 137, respectively, for translating electrical code pulses representative of the indexing digit and the information digits to electrical circuitry which is described in greater detail hereinafter. The pulse translating means 136 comprises a transformer having a rotatable primary winding 147 and a stationary secondary winding 148, and the pulse translating means 138 comprises a transformer having a rotatable primary winding 149 and a stationary secondary winding 150. The pick-up coil 142 of magnetic pick-up means 137 is connected by wires 152 to the rotatable primary winding 149 of the transformer 138. The corresponding pick-up coil 142a of magnetic pick-up means 135 is connected by wires 153 to the rotatable primary winding of transformer 136. The secondary windings 148 and 150 of the transformers are connected via respective output wires 154 and 155 and respective flexible cables 156 and 157 to the code reader digital circuit 24 (FIG. 2).

FIG. 9 is representative of the flux lines produced from a single magnetic code region S on a bead wire 34a, the region S representing an information digit. The return flux lines from the code region S induce secondary magnetic regions N1, N2 of opposite polarity and S1, S2 of the same polarity but greatly diminished in magnitude relative to the code region S. As the pick-up coil scans the bead wire, a generally sinusoidal signal is generated in the pick-up coil. The sinusoidal signal contains the information and index pulses and also contains secondary undesired pulses. The secondary pulses do not form part of the code and are eliminated in the code reader digital circuit 24 (FIG. 2).

Referring now to FIG. 2, the sensor unit includes sensor circuit means, designated generally at 158. The sensor circuit means 158 receives from the pulse translating means 136 and 138 the information signals containing the indexing digit and information digit signals generated by the rotatable magnetic pick-up means 135 and 137. It processes such information signals into code signals which correspond to the selected branch conveyors that are to receive the tires that are being sorted. The sensor circuit means 158 include the code reader digital circuit 24, the translator circuit 26, the converter circuit 28, and the program board 30.

The code reader digital circuit 24 is shown in greater detail in FIG. 10. The rotatable pick-up means 135 and 127 are shown as being connected to the rotary transformers 136 and 138 respectively. The secondary windings 148 and 150 of the rotary transformers are coupled to suitable pulse-translating apparatus 160 and 162, respectively, which represent the initial input components of the code reader digital circuit 24.

A detailed description of the operation of the code reader digital circuit is given in the aforementioned Ugo et al. Pat. No. 3,460,119 and need not be repeated here. It is believed to be sufficient at this time to point out that the Ugo et al patent describes a system in which a digital magnetic code including an indexing digit and up to nine information digits, is disposed in the form of magnetized regions at separate locations on the bead wires of a tire carcass. Since each of the nine separate regions may have or not have a magnetic pulse imposed thereon, as many as $(2)^9$ bits of information may be disposed on the tire bead wires so as to provide 512 potential magnetic code combinations. The code reader digital circuit 24, shown in FIG. 10 and also described in detail in the Ugo and Tomsic patent, develops binary signals corresponding to the information digits. Thus when there is information in one or more of the nine specified regions on the tire bead wires, one or more of the corresponding flip-flops of nine logic and memory units 186, 188, 190, 192, 194, 196, 198, 200 and 202 will generate a binary signal responsive thereto. For example, if a tire bead wire is magnetically coded to give a pulse only at the region of the first information digit, a binary signal designating the presence of the first information digit will appear at the output of the flip-flop 186. Similar considerations apply to flip-flop 188 and the second information digit, flip-flop 190 and the third information digit, etc. The binary signal designating the presence of an information digit appears at the output of each flip-flop as a −12 volt to ground signal on a first output wire of the flip-flop and as a zero volt to ground signal on a second output wire of the flip-flop. The absence of an information digit is indicated when the first output wire of the flip-flop has a zero volt to ground signal thereon, and the second output wire of the flip-flop has a −12 volt to ground signal thereon. Hence, the inputs to the translator circuit 26 are in the form of binary signals which signify the presence or absence of information digits on the bead wires of a tire.

cuit 24 indicates the absence of an information digit it is designated as a 0 thereon. Similarly, when the output signal indicates the presence of an information digit, it is designated as a 1 in Table 1. When the binary signals from the logic and memory unit 186, 188 and 190 are all 0, a signal defining the decimal number zero is generated. When the binary signal from logic and memory unit 186 is 1, Table 1

| Code Reader Digital Circuit 24 Output Corresponding Decimal Number in X-Register | Logic and Memory Unit 186 | Logic and Memory Unit 188 | Logic and Memory Unit 190 |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

The logic and memory units 186, 188, 190, 192, 194, 196, 198, 200 and 202 of the code reader digital circuit 24 generate respective output binary signals corresponding to the information digits 1 through 9, inclusive. These binary signals are also designated 1 to 9 in FIG. 10 and are separated into three groups of three, (i.e. (1, 2, 3), (4, 5, 6), and (7, 8, 9)). Each group corresponds to three binary signals which are later converted to decimal signals by the translator circuit 26, each one of the three groups of binary signals being converted into eight decimal signals (i.e., 0 through 7, inclusive). The binary signal designating the presence of an information digit appears at the output of each logic and memory unit flip-flop as a −12 volt to ground signal on a first or a output wire of the flip-flop and as a zero volt to ground signal on a second or b output wire of the flip-flop. The absence of an information digit is indicated when the a (first) output wire of the flip-flop has a zero volt to ground signal thereon and the b (second) output wire of the flip-flop has a −12 volt to ground signal thereon. Hence, the inputs to the translator circuit 26 are in the form of binary signals which signify the presence or absence of information digits on the bead wire of a tire.

The presence of an information digit at the output of a flip-flop has been designated by a 1 in Table 1 through 3, inclusive, below, and the absence of an information digit at such output has been designated by a 0 in Tables 1 through 3, inclusive, below. Thus, the code reader digital circuit 24 will generate a binary signal indicating the presence (i.e., a 1 binary signal) or absence (i.e., a 0 binary signal) of an information digit in a specified region on the bead wire of a tire. The translator circuit means 26 is adapted to develop signals defining decimal numbers from the three groups of binary signals developed by the code reader digital circuit means 24. The translator circuit 26 of FIG. 2 includes an X-register 204 (FIG. 11), a Y-register 206 (FIG. 12), and a Z-register 208 (FIG. 13). Table 1 shows the expansion of the group of binary signals 1, 2, 3 received from flip-flops of logic and memory units 186, 188 and 190 by the X-register 204 into signals corresponding to the decimal numbers 0 through 7, inclusive. As shown in Table 1, when the output signal from a logic and memory unit of the code reader digital cirand the binary signals from the logic and memory units 188 and 190 are 0, a signal defining the decimal number one is generated. The decimal signal defining the number 2 is generated when the logic and memory unit 188 generates a 1 binary signal and the binary signals from the logic and memory units 186 and 190 are 0. Similarly, the signal defining the decimal number 3 is generated when the logic and memory units 186 and 188 generate 1 binary signals, and the logic and memory unit 190 generates a 0 binary signal. If the logic and memory units 186 and 188 generate 0 binary signals and the logic and memory unit 190 develops a 1 binary signal, the signal defining the decimal number 4 is thereby produced. When the logic and memory units 186 and 190 provide 1 binary signals, and the logic and memory unit 188 produces a 0 binary signal, the signal defining the decimal number 5 is produced therefrom. When the logic and memory units 188 and 190 generate 1 binary signals, and the logic and memory unit 186 generates a 0 binary signal, the signal defining the decimal number 6 is developed. Finally, when all three logic and memory units 186, 188 and 190 develops 1 binary signals, the signal defining the decimal number 7 is produced.

The input signals to the X-register (FIG. 11) are the output binary signals from the flip-flops of the logic and memory units 186, 188 and 190. The a and b output wires of flip-flop 186 are connected to corresponding AND circuits of the X-register 204 by means of respective input wires 186a and 186b. Similarly, the a and b output wires of 188 and 190 are connected to corresponding ANd circuits of the X-register by respective input wires 188a and 188b and 190a and 190b.

The X-register 204 contains the logic units used to convert the group of binary signals 1, 2, 3 received from flip-flops 186, 188 and 190 into signals defining the decimal numbers 0 through 7, inclusive. When there is a 0 binary signal being transmitted by each of the flip-flops 186, 188 and 190, indicating that there is no information digit pulse appearing at any of the first three information digit positions on the tire bead, each of the input lines 186b, 188b and 190b is at −12 volts potential to ground and each of the input lines 186a, 188a and 191a is ground potential. Under this condition of operation AND circuit 210 is enabled due to the fact that its three input wires are each at −12 volts potential and it develops an output signal defining the decimal number 0. The remaining AND circuits 212, 214, 216, 218, 220, 222 and 224 remain disabled and provide no output signals at this time due to the fact that each has at least one of its three input wires at zero potential. When there is a 1 binary signal being transmitted by flip-flop 186 and 0 binary signals being transmitted by flip-flops 188 and 190, indicating that an information pulse appears only at the first one of the first three information digit positions on the tire bead wire, each of the input lines 186a, 188b and 190b is at −12

X-register 204 (FIG. 11) form one set of inputs to the converter circuit 28 (FIGS. 2 and 15).

Figure 12:
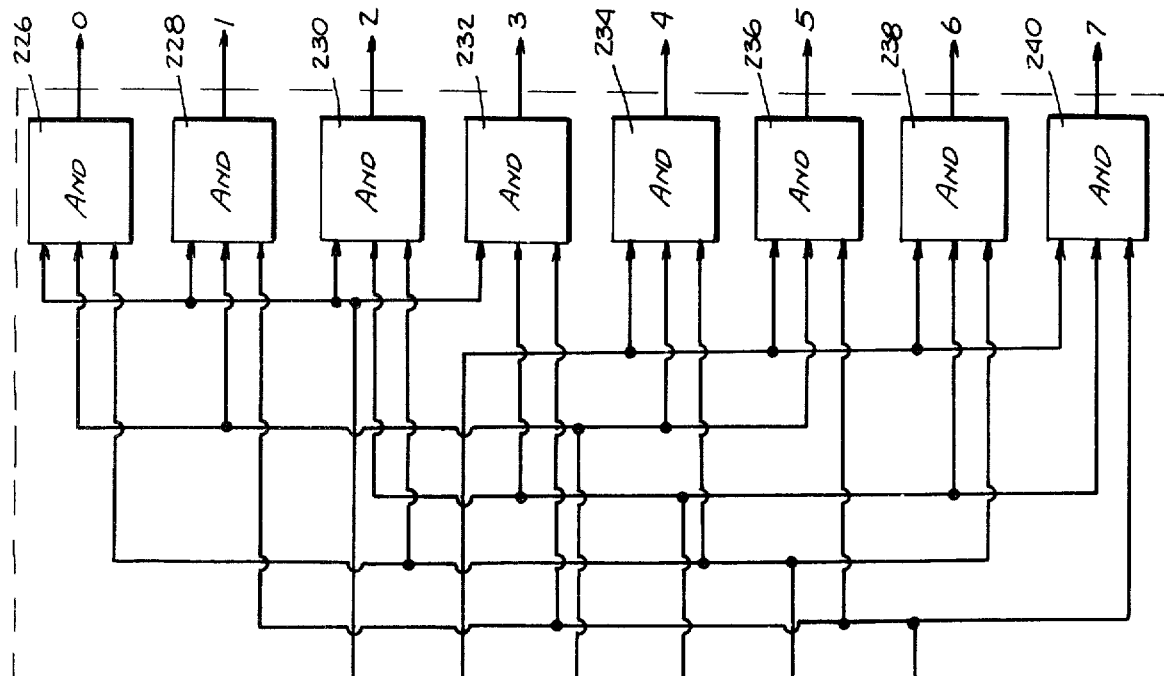
FIG. 12 is a schematic circuit diagram of an Y-register utilized in the translator circuit.

Turning now to FIG. 12, the Y-register 206 is depicted therein as including the AND circuits 226, 228, 230, 232, 234, 236, 238 and 240. The signals defining decimal numbers 0 through 7, inclusive developed by the Y-register 206 are a second set of inputs to the converter circuit 28 (FIGS. 2 and 15). Table 2 shows the expansion of the group of binary signals 4, 5 and 6 received from flip-flops 192, 194 and 196 by the Y-register into the signals corresponding to the decimal numbers 0 through 7, inclusive.

Table 2

| Code Reader Digital Circuit 24 Output<br><br>Corresponding Decimal Number in Y-Register | Logic and Memory Unit 192 | Logic and Memory Unit 194 | Logic and Memory Unit 196 |
| --- | --- | --- | --- |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 | volts potential to ground and each of the input lines 186b, 188a and 190a is at ground potential. Under this condition of operation, AND circuit 212 is enabled and develops an output signal defining the decimal number 1, while the remaining AND circuits 210, 214, 216, 218, 220, 222 and 224 of FIG. 11 remain disabled and provide no output signals.

Similar considerations apply with respect to the remaining permutations and combinations of binary signals from flip-flops 186, 188 and 190 and the remaining AND circuits 214, 216, 218, 220, 222 and 224 of the X-register. Thus, referring to Table 1 in conjunction with FIG. 11, when 0 binary signals are transmitted from the logic and memory units 186 and 190 together with 1 binary signal from the logic and memory unit 188, the AND circuit 214 is enabled and develops the signal defining the decimal number 2. When a 0 binary signal is transmitted from the logic and memory unit 190 together with 1 binary signals from the logic and memory units 186 and 188, AND circuit 216 is enabled and develops a signal defining the decimal number 3. Similarly, when 0 binary signals are transmitted from the logic and memory units 186 and 188 together with a 1 binary signal from the logic and memory unit 190, the AND circuit 218 is enabled and develops the signal corresponding to the decimal number 4.

The output signal from the AND circuit 220 defines the decimal number 5, and will be present when the proper combination of input signals is applied thereto, i.e. when the logic and memory unit 188 generates a 0 binary signal, and the logic and memory units 186 and 190 generate 1 binary signals. The AND circuit 222 generates a signal which defines the decimal numeral 6 when the logic and memory unit 186 generates a 0 binary signal and the logic and memory units 188 and 190 generate 1 1 signals. Finally, the AND circuit 224 is enabled so as to develop a signal for the decimal number 7 when the logic and memory units 186, 188 and 190, all generate 1 binary signals. The signals defining decimal numbers 0 through 7, inclusive, from the As shown in Table 2, when the output signal from logic and memory unit of the code reader digital circuit 24 indicates the absence of an information digit, it is designated as a 0 therein. Similarly, when the output signal indicates the presence of an information digit, it is designated as a 1 in Table 2. Thus, for example the signal defining decimal number 3 is developed by the Y-register 206 when logic and memory units 192 and 194 generate binary signals and logic and memory unit 196 develops a 0 binary signal. Similarly, as shown therein, the decimal signals defining the decimale numbers 0 through 7, inclusive, are developed by the appropriate combination of binary signals from the respective logic and memory units 192, 194 and 196.

The input signals to the Y-register (FIG. 12) are the output binary signals from the flip-flops of the logic and memory units 192, 194 and 196. The a and b output wires of flip-flops 192, 194 and 196 are connected to corresponding AND circuits of the Y-register 206 by means of input wires 192a and 192b, 194a and 194b, and 196a and 196b, respectively. The Y-register 206 contains the logic units used to convert the group of binary signals 4, 5, and 6 received from flip-flops 192, 194 and 196 (FIG. 10) into signals defining the decimal numbers 0 through 7, inclusive.

Figure 11:
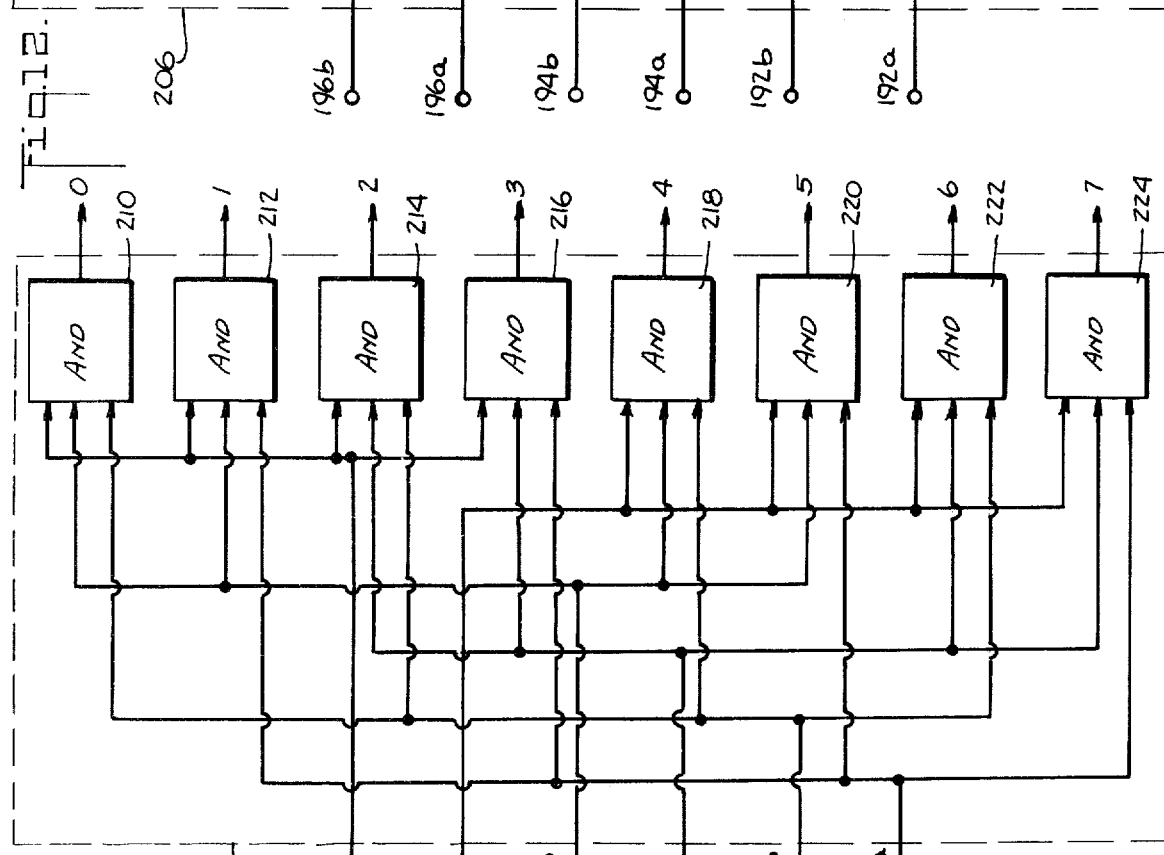
FIG. 11 is a block diagram of an X-register utilized in a translator circuit in the apparatus.

The AND circuits 226, 228, 230, 232, 234, 236, 238 and 240 of Y-register 206 develop the respective signals defining the decimal numbers 0 through 7 in the same manner as heretofore described in connection with the X-register 204 (FIG. 11). Thus, referring to Table 2 in conjunction with FIG. 12, the signal defining the decimal number 5 is developed by the AND circuit 236 when logic and memory units 192 and 196 provide a 1 binary signal while logic and memory unit 194 provides a 0 binary signal to the Y-register 206. When this combination of binary signals is present at the input of the AND circuit 236, indicating the presence of information digits at the fourth and sixth information digit positions on the tire bead wires, the AND circuit 236 is enabled and develops a signal which defines the decimal number 5. The reason for this is that each of input wires 192a, 194b and 196a carries a −12 volt signal to ground at this time; which signal is transmitted through AND circuit 236. Each of the remaining AND circuits 226, 228, 230, 232, 234, 238 and 240, on the other hand, remain disabled since each has at least one of its three input wires at zero potential. In a similar fashion, the remaining signals defining the decimal numbers 0 through 7, inclusive are developed by the AND circuits of the Y-register 206 when the designated Table 2 combination of input signals is present. Thus, it is evident that the Y-register 206 will convert the group of binary signals 4, 5 and 6 received from the logic and memory unit flip-flops 192, 194 and 198 into the equivalent signals defining the decimal numbers 0 through 7, inclusive.

Referring now to FIG. 13, the Z-register 208 is illustrated therein as including the AND circuits 242, 244, 246, 248, 250, 252, 254 and 256. The Z-register 208 develops a third set of signals defining the decimal numbers 0 through 7, inclusive, for the converter circuit means 28 (FIGS. 2 and 15). Table 3 depicts the expansion of the group of binary signals 7, 8 and 9 received from flip-flops 198, 200 and 202 by the Z-register into the signals corresponding to the decimal numbers 0 through 7, inclusive. As shown in Table 3, when the output signal from a logic and memory unit 198, 200, and 202 of code reader digital circuit 24 indicates the absence of an information digit, it is designated as a 0 therein. Similarly, when the output signal indicates the presence of an information digit, it is designated as a 1. Thus, for example the signal defining the decimal number 1 is developed by the Z-register 208 when the logic and memory units 200 and 202 generate 0 binary signals and the logic and memory unit 198 develops 1 1 binary signal. Similarly, as shown in Table 3, signals defining the decimal numbers 0 through 7, inclusive, mal numbers 0 through 7, inclusive, in the same manner as heretofore described in connection with the X-register 204 (FIG. 11) and the Y-register 206 (FIG. 12). Thus, referring to Table 3 in conjunction with FIG. 13, the signal defining the decimal number 4 is generated by the AND circuit 250 when logic and memory unit 202 provides a 1 binary signal while logic and memory units 198 and 200 provide binary signals to the Z-register 208. When this combination of binary signals is present at the input of the AND circuit 250, indicating the presence of an information digit at the ninth information digit position on the tire bead wire, the AND circuit 250 is enabled, thereby developing signal defining the decimal number 4. The reason for this is that each of the input wires 198b, 200b and 202a carries a −12 volt signal to ground at this time, which signal is transmitted through AND circuit 250. Each of the remaining AND circuits 242, 244, 246, 248, 252, 254, and 256, on the other hand, remain disabled since each has at least one of its three input wires at zero potential. In a similar manner, remaining signals defining the decimal numbers 0 through 7, inclusive, are generated by the AND circuits of the Z-register 208 when the appropriate Tabe 3 combination of binary signals are present at the inputs of the AND circuits 242, 244, 246, 248, 250, 254, or 256. Thus, it is evident that the Z-register 208 will convert the group of binary signals 7, 8 and 9 received from the logic and memory unit flip-flops 198, 200 and 202 into the equivalent signals defining the decimal nubers 0 through 7, inclusive.

Each signal defining a decimal number generated by one of the registers X, Y, Z of FIGS. 11 through 13, inclusive may be visualized conceptually as forming a translator plane, as shown in FIG. 14. Accordingly, each of the X, Y, and Z registers can be considered as forming eight planes, one for each of the decimal number signals 0 through 7, inclusive, generated by and the intersection of the eight planes formed by each of the Table 3

| Code Reader Digital Circuit 24 Output Corresponding Decimal Number in Z-Register | Logic and Memory Unit 198 | Logic and Memory Unit 200 | Logic and Memory Unit 202 |
| --- | --- | --- | --- |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 | are developed by the appropriate combination of binary signals from the respective logic and memory units 198, 200, and 202. The input signals to the Z-register (FIG. 13) are the output binary signals from the flip-flops of the logic and memory units 198, 200 and 202. The a and b output wires of flip-flops 198, 200 and 202 are connected to corresponding AND circuits of the Z-register 208 by means of input wires 198a and 198b, 200a and 200b, and 202a and 202b, respectively. The Z-register 208 contains the logic units used to convert the group of binary signals 7, 8 and 9 from flip-flops 198, 200 and 202 (FIG. 10) into signals defining the decimal numbers.

Referring once again to FIG. 13, the AND circuits 242, 244, 246, 248, 250, 252, 254 and 256 of Z-register 208, generate the respective signals defining the deci- X, Y and Z registers can be thought as defining 512 distinct translator intersection points in space. For example, if the output from the X-register is a signal corresponding to the decimal number 3, the output from the Y-register is a signal corresponding to the decimal number 7, and the output from the Z-register is a signal corresponding to the decimal number 4, the discrete translator intersection point (3, 7, 4) designated at 257 in FIG. 14 is defined. Any translator intersection point may be expressed by a set of x, y and z coordinates, in which x, y and z each may vary independently from 0 through 7, inclusive. Thus, although each of the X, Y and Z registers provides only one of 8 possible outputs, the 24 total outputs contain 512 possible variations (8 × 8 × 8). This conceptual scheme for visualizing the various possible combinations of outputs from the respective X, Y, and Z registers illustrated in FIG. 14, is employed by the converter circuit 28 (FIGS. 2, 15 and 16). In the converter circuit 28 there are provided 512 AND circuits, each of which is enabled by one, and only one, of the 512 sets of translator output signal combinations which can be generated by the translator circuit 26.

The converter circuit 28 mechanizes the conceptual scheme of FIG. 14 for combining the decimal number signals from the X-register 204, the Y-register 206, and the Z-register 208 so as to develop at any given time any one of 512 output signals corresponding to the 512 discrete translator intersection points. The different output signals generated by the converter circuit 28 each appear on a different corresponding output line of the converter circuit in the form of a −12 volt potential to ground on the output wire.

Referring to FIG. 16 in particular, the converter circuit 28 includes 512 AND circuits, three of which have been illustrated at 258, 260 and 262. The output signal from each AND circuit of converter circuit 28 is representative of one of the 512 possible combinations of decimal number signals that can be generated by the X, Y and Z registers of the translator circuit 26. Thus, there is one AND circuit in converter 28 for each of the 512 translator intersection points. The input circuitry of converter circuit 28 comprises a matrix in which each of the 24 output signal wires of the translator circuit 26 is interconnected to 64 of the 512 AND circuits of the converter circuit 28 to provide a different set of 3 inputs at each of the 512 AND circuits. Since there are 512 AND circuits having 3 inputs each in converter circuit 28, there are 1536 input connections employed in the converter circuit (512 × 3). These input connections are suitably interconnected to the 64 multiples of the 24 output wires of translator circuit 26 for a total of 1536 interconnections (64 × 24). Thus, for example, the outputs of AND circuits 210 (FIG. 11), 226 (FIG. 12) and 242 (FIG. 13), which provide the signals designating the decimal numbers 0, 0 and 0 from the X-register, Y-register and Z-register, respectively, are all connected to the input of AND circuit 258 (FIG. 16) so that when the translator intersection point (0,0,0) is generated by the translator circuit 26, the three input wire to AND circuit 258 each have a −12 volt to ground signal thereon. Accordingly, the AND signal 258 is enabled and a −12 volt to ground signal appears on its output wires. The arrangement is such that when the translator intersection point (0,0,0) is transmitted by the translator circuit 26, AND circuit 258 is the only one of the 512 AND circuits to be enabled since it is the only one to have all three of its input wires carrying a −12 volt signal to ground at the time.

The translator intersection point (3,7,4) has heretofore been designated generally at 257 in FIG. 14. The transmission by translator circuit 26 of this combination of signal is responded to in the converter circuit 28 by the enabling of the AND circuit 260. The signal defining the decimal number 3 from the output of AND circuit 216 of the X-register 204 (FIG. 11), the signal defining the decimal number 7 from the output of AND circuit 240 of the Y-register 206 (FIG. 12), and the signal defining the decimal number 4 from the output of AND circuit 250 of the Z-register 208 (FIG. 13) are all present at the same time as input signals to AND circuit 260 of converter 28 (FIG. 16). No other AND circuit of the converter 28 has all three of these signals present at its input at this time. Accordingly, no AND circuit other than AND circuit 260 is enabled and produces a −12 volt signal to ground on its output when translator circuit 26 transmits to converter 28 a signal representing intersection point (3,7,4). Similarly, the transmission by translator circuit 26 of the translator intersection point (7,7,7) to converter circuit 28 is responded to in the converter circuit by the enabling of the AND circuit 262. In this case the signal defining the decimal number 7 from the output of AND circuit 224 of the X-register 204 (FIG. 11), the signal defining the decimal number 7 from the output of the AND circuit 240 of the Y-register 206 (FIG. 12), and the signal defining the decimal number 7 from the output of AND circuit 256 of the Z-register 208 (FIG. 13) are all present at the same time as input signals to AND circuit 262 of converter 28 (FIG. 16). Accordingly, AND circuit 262 is enabled and produces a −12 volt signal to ground on its output wire. In the foregoing manner the converter circuit can at any given time produce a −12 volt output signal to ground on that one of its 512 output wires which corresponds to the particular translator intersection point signal which it receives from the translator circuit 26.

The 512 output wires of the converter circuit 28 are suitably interconnected with 512 corresponding input wires of the program board 30 (FIG. 17), the program board input wires being designated generally at 267.

Figure 18:
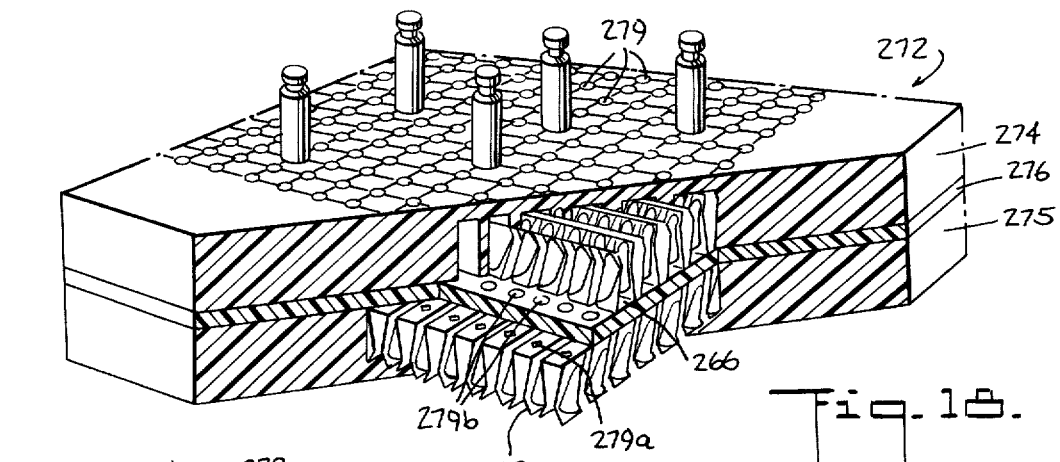
FIG. 18 is a fragmentary, sectional, perspective view of one of the FIG. 17 program boards.
Figure 19:
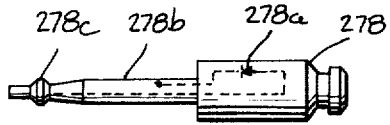
FIG. 19 is an elevational view of a shorting pin used with the FIG. 18 program board.

Referring to FIGS. 2 and 17 through 21, inclusive, at this time, the program board 30 receives each −12 volt to ground signal transmitted by the converter circuit 28 and passes such signal along as a code signal to the memory unit 32 (FIG. 2) through a predetermined one of 22 output lines 269 (FIG. 17). The particular output wire 269 employed depends on the interconnections made between the 512 input wires and the 22 output wires of the program board via a plurality of manually inserted shorting pins or patch plugs 278 (FIGS. 17 and 18). Each of the 22 output wires 269 corresponds to one of the 22 branch conveyors 20 (FIG. 1).

Referring to FIG. 17, the program board 30 comprises a plurality (in this case 42) of like boards 272 mounted side by side in an upper group of 21 boards, shown generally at 264, and in a lower group of 21 boards, shown generally at 270, the upper and lower groups of boards being stacked relative to one another. Each of the boards 272 is provided with 25 rows of generally vertically disposed input electrical conducting strips 266 and with 15 rows of generally horizontally disposed output electrical conducting strips 268, the various strips being insulated from one another.

The input rows 266 of the upper group of boards 264 are connected to the corresponding input rows 266 of the lower group of boards 270, while the output rows 268 of each board 272 in the upper and lower group of boards 264 and 270 are connected to the corresponding output rows 268 of the remaining boards in their respective upper and lower groups. Accordingly, sufficient multiples of horizontal and vertical boards are formed to result in the composite program board 30 having at least 512 rows of input strips and at least 22 rows of output strips, it being understood that the extra rows of input and output strips need not be utilized. Only 22 of the rows of output strips 268 are provided with output leads 269 interconnecting them with the input of memory unit 32 (FIG. 2).

Figure 20:
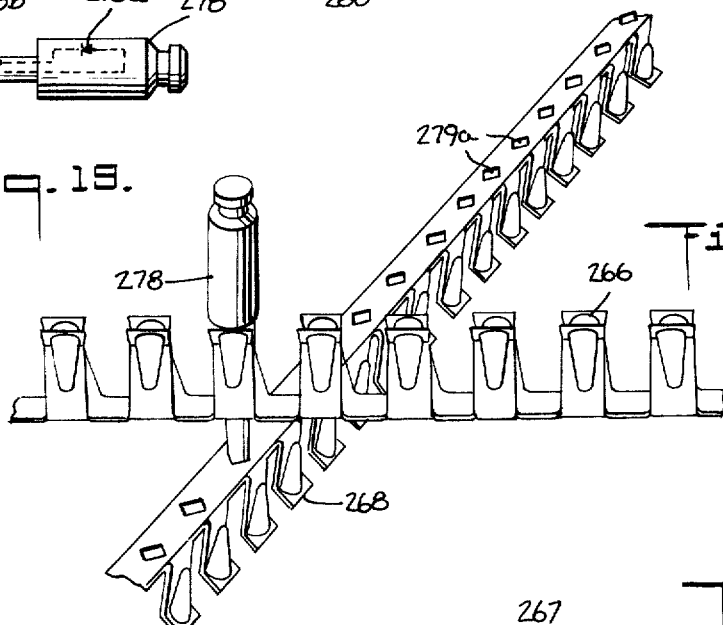
FIG. 20 is a fragmentary, sectional, perspective view showing the relationship of an input electrical conductor to an output electrical conductor of the FIG. 18 program board.

To further illustrate the program board 30, a standard commercially available board 272, for example a A-MP Matrix Pinboard, made by AMP Incorporated of Harrisburg, Pennsylvania, is shown in FIG. 18. The board 272 is of a sandwich type of construction, being made from two honeycombed phenolic blocks 274 and 275. The continuous electrical conducting input and output strips 266 and 268, respectively, are arranged in rows preferably transverse to one another. An electrical insulating board 276 is interposed between the input rows of conducting strips 266 and the output rows of conducting strips 268 so as to prevent inadvertent electrical shorting of the input to the output. The input rows 266 and output rows 268 of electrical conducting strips are connected to one another by inserting a shorting pin or patch plug 278 into the holes 279 in the phenolic block 274. Corresponding holes are provided in registry with the hole 279 in the input rows 266, the output rows 268 and in the insulating board 276, the holes in the latter two elements being shown at 279a and 279b, respectively. As shown more clearly in FIG. 19, the shorting pin 278 is provided with a diode 278a connected between its input terminal 278b and its output terminal 278c to prevent reverse current flow therethrough. Shorting pin 278 makes contact inside the board 272 (FIG. 20) with both an input row 266, and an output row 268 of conducting strips. Any two such rows can be electrically joined by inserting a pin 278 where the rows of input and output conducting strips cross. The exact relationship of one pin 278, one input conducting strip 266 and one output conducting strip 268 is shown in FIG. 20 with the surrounding insulating material removed therefrom.

The input rows 266 and output rows 268 of conducting strips comprise two layers of bus-type continuous conducting springs separated by a perforated insulating board 276. The shorting pin receiving contacts of the conducting strips are preferably bifurcated springs, providing multiple areas of contact between the conducting strips 266 and 268 and the shorting pins 278. The conducting strips are preferably nickel plated strips or gold over nickel plated strips and the mouth of each pair of spring contacts is funnel shaped for aligning the pins 278 with the spring contacts and with the opening in the upper and lower strips.

Figure 21:
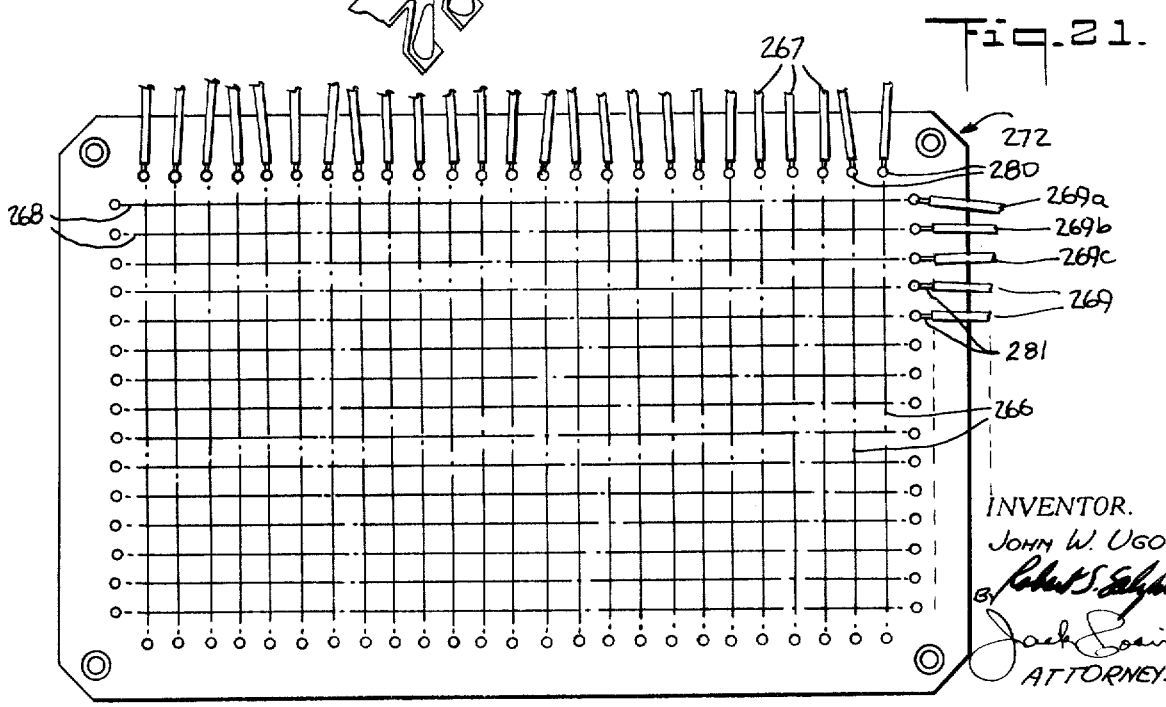
FIG. 21 is an elevational view of the FIG. 18 program board shown having a plurality of input and output lead wires connected thereto.

All connections to the input rows 266 and output rows 268, of conducting strips of the program board 272 are made via suitable terminal posts 280 and 281, respectively, as shown in FIG. 21. Thus, the input lead wires 267 are connected to the various input rows 266 of electrical conducting strips via the terminal posts 280 and the output lead wires 269 are connected to selected ones of the various output rows 268 via the terminal posts 281.

Referring to FIG. 17, it will be seen that each board 272 in the upper group of boards 264 is in vertical alignment with a corresponding board 272 in the lower group of boards 272. Accordingly, each vertically aligned pair of boards may be considered to be a double board, there being 21 such double boards in the present embodiment, which double boards shall hereinafter be referred to as double boards No. 1 through 21, double board No. 1 being considered to be the double board at the left side of FIG. 17.

Table 4 summarizes a sample patching arrangement for program board 30 which is usable with the tire sorting apparatus described herein. In this patching arrangement the 512 separate translator intersection point inputs to the program board 30 are broken into 21 groups of 24 inputs each, comprising a total of 504 inputs (i.e. 21 × 24) and 1 group of 8 inputs which, added to the previous 504 inputs accounts for the 512 translator intersection point inputs to the program board 30. The shorting pins or patch plugs 278 are suitably inserted in each double board 272 to arrive at the desired allocation of 512 inputs to 22 outputs. Thus, considering the 512 inputs to the program board 30 to be numbered 1 through 512, inclusive, and the 22 outputs from the program board 30 to be numbered 1 through 22, inclusive, reference to Table 4 will show that inputs No. 1 through 24, inclusive of double board No. 1 are all patched together (via 24 patching plugs 278) to a single output wire of the program board, output wire 269a (FIG. 21) for example. This output constitutes output No. 1 of the program board 30. Input No. 25 of double board No. 1 is patched to a second output wire of the program board, output wire 269b (FIG. 21) for example. Output wire 269b constitutes output No. 2 of the program board 30 and has connected to it, in addition to input No. 25 from double board No. 1, inputs No. 26 through 48, inclusive which are patched to it at double board No. 2. Inputs No. 49 and 50 of double board No. 2 are patched to a third output wire of the program board, output wire 269c (FIG. 21) for example. Output wire 269c constitutes output No. 3 of the program board and has connected to it, in addition to its inputs No. 49 and 50 from double board No. 2, inputs No. 51 through 72, inclusive, which are patched to it at double board No. 3. The foregoing procedure is continued in accordance with Table 4 so as to provide the requisite 22 outputs at the program board. It is apparent that output No. 21 has patched to it inputs No. 481 through 500, inclusive, from double board No. 20, as well as inputs No. 501 through 504, inclusive, from double board No. 21. Output No. 22, of course, has only 8 inputs patched to it, the inputs numbered 505 through 512, inclusive.

Accordingly, in the manner illustrated in Table 4, the 512 translator intersection point signals from the converter 28 are reduced to 22 code signals, used in actuating the memory unit 32, by shorting the input rows of conducting strips 266 to the output rows of conducting strips 268 as indicated therein. It is evident that program changes may be simply made by merely selectively rearranging the shorting pins 278 so as to patch together different input and output conductor strips.

TABLE 4

| Double Board Number | Translator Intersection Point Signal, from Converter Circuit 28 | Code Signal Output to Memory Unit 32 |
| --- | --- | --- |
| 1 | 1–24 | 1 |
|   | 25 | 2 |
| 2 | 26–48 | 2 |
|   | 49–50 | 3 |
| 3 | 51–72 | 3 |
|   | 73–75 | 4 |
| 4 | 76–96 | 4 |
|   | 97–100 | 5 |
| 5 | 101–120 | 5 |
|   | 121–125 | 6 |
| 6 | 126–144 | 6 |
|   | 145–150 | 7 |
| 7 | 151–168 | 7 |
|   | 160–175 | 8 |
| 8 | 176–192 | 8 |
|   | 193–200 | 9 |

TABLE 4-Continued

| Double Board Number | Translator Intersection Point Signal, from Converter Circuit 28 | Code Signal Output to Memory Unit 32 |
|---|---|---|
| 9 | 201-216 | 9 |
|  | 217-225 | 10 |
| 10 | 226-240 | 10 |
|  | 241-250 | 11 |
| 11 | 251-264 | 11 |
|  | 265-275 | 12 |
| 12 | 276-288 | 12 |
|  | 289-300 | 13 |
| 13 | 301-312 | 13 |
|  | 313-325 | 14 |
| 14 | 326-336 | 14 |
|  | 337-350 | 15 |
| 15 | 351-360 | 15 |
|  | 361-375 | 16 |
| 16 | 376-384 | 16 |
|  | 385-400 | 17 |
| 17 | 401-408 | 17 |
|  | 409-425 | 18 |
| 18 | 426-432 | 18 |
|  | 433-450 | 19 |
| 19 | 451-456 | 19 |
|  | 457-475 | 20 |
| 20 | 476-480 | 20 |
|  | 481-500 | 21 |
| 21 | 501-504 | 21 |
|  | 505-512 | 22 |

Thus, in the present embodiment of this invention the sensor unit 11 (FIG. 1), which is remote from the branch conveyors 20 and is responsive to the magnetic code disposed on the bead wire of tires, develops a plurality of code signals for actuating the memory unit 32. In order to provide these code signals, the magnetic pick-up means 135 and 137 (FIG. 7) develop information and timing signals which are directed to the sensor circuit means 158 (FIG. 2) of the sensor unit 11. In response thereto, the sensor circuit means 158 processes the information and timing signals as heretofore described so as to develop the code signals which define the selected ones of the plurality of branch conveyors onto which the tires are to be transferred.

It will, of course, be understood that while described herein the connection with developing 22 code signals for 22 branch conveyors, the present invention is not necessarily so limited. For example, since as many as 512 code signals may be developed by the sensor unit heretofore described, it is theoretically possible, using the hereindescribed magnetic coding system, for the sensor unit of this invention to sort suitably magnetically coded articles with respect to as many as 512 different branch conveyors.

MEMORY UNIT

The memory means or memory unit 32 has been shown generally in FIG. 2 and in greater detail in FIGS. 22, 22a, 23, and 23a. As indicated earlier, each tire is identified by the magnetic code impressed on its bead rings, and this code is read by the sensor circuit means 158 (FIG. 2) which develops a code signal defining the selected branch conveyor onto which the tire is to be transferred from amongst the twenty-two branch conveyors shown generally by arrow 20 in FIG. 1. The memory unit 32 stores the code signals developed by the sensor unit 11 (FIG. 1) and releases them selectively therefrom at the proper times for actuating the diverter units 18 that shift the articles onto the selected branch conveyors. The memory unit 32 is adapted to also receive at predetermined times signals developed by the relay and timing circuitry of the tracker unit (FIG. 31), which unit will be described in greater detail hereinafter, it being sufficient at this time to point out that the input signals to the memory unit 32 from the tracker unit are, referring to FIGS. 22, 22A, 23, 23A and 31, a " reset signal" appearing on conductor L-8, a "sort transfer signal" appearing on conductor L-9, a "sort cycle start signal" appearing on conductor L-10, a "reader cycle start +2 signal" appearing on conductor L-12, and a "reader cycle start +3 signal" appearing on conductor L-11. As will be hereinafter described, the aforementioned signals excite the memory unit 32 at predetermined times to release selectively the code signals stored therein for actuating the diverter units 18 (FIG. 1) at the designated diverter stations 16 at the proper times.

The memory unit 32 shown in split FIGS. 22, 22a, 23 and 23a includes a plurality of (in this case, eleven) rows or channels 285a-285k of essentially similar logic means or logic units, which are indicated generally at 285. The logic units 285 of the memory unit 32, with the exception of the units in channels 285a, 285b and 285c, each include a "temporary storage" circuit 288, an "initial transfer storage control" circuit 290, at least one "additional transfer storage control" circuit 291, a "lane full" circuit 292, an "output control" circuit 294, and a "no-sort" circuit shown generally as 296. Channel 285c includes circuits corresponding to the aforementioned circuits except for the additional transfer storage control circuit 291. Channel 285b includes circuits corresponding to the aforementioned circuits except for the transfer and additional storage control circuits 290 and 291, while channel 285a includes only a "storage and lane full" circuit 298 and an "output control" circuit 300. Channel 285d has only one additional transfer storage control circuit 291, while channel 285e has two such circuits, channel 285f has three such circuits, and so forth, channel 285k having eight such circuits 291.

The logic units 285 are employed in sorting the tires disposed on the main conveyor 14 (FIG. 1) to various ones of the twenty-two branch conveyors 20. Each row 285a-285k of logic units is employed in controlling the operation of a diverter unit 18 associated with a specified one of the eleven diverter stations 16 (hereinafter individually referred to as diverter station Nos. 1,2,3,...etc.) the rows 285a-285k of logic units being employed in controlling the operation of the diverter units 18 at the respective first through eleventh diverter stations 16.

The 22 signal output wires (Nos. 1-22, Table 4) of the program board 30 are interconnected with "pairs" of input wires in the memory unit 32 (output wires numbers 269a through 269v of FIG. 17 correspond, respectively, to signal output wires numbers 1-22 of Table 4). Thus, program board 30 output wires No. 1 (269a) and 2 (269b) are interconnected with the input wires marked code signal 1a and code signal 1b, respectively, in FIGS. 22 and 23, and when signals appear on these wires they are employed in actuating the diverter unit 18 at diverter station No. 1 to transfer tires from the main conveyor 14 to the upper branch conveyor 20a or to the lower branch conveyor 20b. Similarly, program board 30 output wires No. 3 (269c) and 4 (269d) are interconnected with the input wires marked code signal 2a and code signal 2b, respectively, in FIGS. 22 and 23. Any signals appearing on these lines are employed in actuating the diverter unit 18 at the diverter station No. 2. The program board 30 output wires No. 5 (269e) and 6 (269f) are likewise interconnected with the input wires marked code signal 3a and code signal 3b, respectively, in FIGS. 22 and 23. Any signals appearing on these lines are employed in actuating the diverter unit 18 at diverter station No. 3. The foregoing arrangement is followed with respect to the remaining program board output wires and memory unit input wires. The final two program board 30 output wires No. 21 (269u) and 22 (269v) being interconnected with the memory unit 32 input wires marked code signal 11a and code signal 11b, respectively, in FIG. 22 for controlling actuation of the diverter unit 18 at diverter station No. 11.

Assume that a magnetically coded tire enters the code reader 12 and the identified code is programmed to sort this tire to the upper level branch conveyor 20a connected to diverter station No. 1 (sort station 1a). The combined choice of tire coding and equipment control programming will cause the sensor means 158 (FIG. 2) to provide an output code signal from program board 30. This code signal thus appears on the input wire marked code signal 1a (FIGS. 22 and 23) as an input to the storage and lane full circuit 298 of memory unit 32. Assuming there is room for the tire on the designated branch conveyor, the output control circuit 300 causes the diverter unit 18 at diverter station No. 1 to be actuated just prior to the tire arriving at that station. The tire is thus sorted to upper level branch conveyor 20a.

If there is insufficient room on the upper level branch conveyor 20a at diverter station No. 1 to receive the tire, a "lane full" signal is developed at the branch conveyor by suitable means (not shown), for example, by a photocell or by a limit switch actuated by a pair of spaced, raised rollers on the branch conveyor. This signal is introduced to the memory unit 32 by the input line marked "lane full signal 1a" in FIGS. 22 and 23. The presence of a lane full signal on the lane full signal 1a line blocks actuation of the diverter unit 18 at diverter station No. 1, if it has not been previously deactuated, or resets the diverter unit 18 to the deactuated condition, if it has been previously actuated. This prevents the tire which was scheduled for the upper branch conveyor 20a at diverter station No. 1 from being sorted to that branch conveyor. As will appear hereinafter, this tire indexes through all of the diverter stations 16 and is eventually deposited on the no sort conveyor 15 for either recycling through the sorting apparatus or for manual sorting.

A lane full sensing means (not shown) is provided near the upstream end of each of the twenty-two branch conveyors 20a and 20b. The 11 pairs of sensing means involved are connected to the corresponding 11 pairs of lane full signal input lines of the memory unit 32. Thus, for example, the lane full sensing means of the branch conveyors 20a and 20b at diverter stations No. 1 are connected to the lane full signal lines 1a and 1b, respectively, in FIGS. 22 and 23. The lane full sensing means of the branch conveyors 20a and 20b at diverter station No. 4 are connected to the lane full signal lines 4a and 4b, respectively, in FIGS. 22 and 23; and, the lane full sensing means of the branch conveyors 20a and 20b at diverter station No. 11 are connected to the lane full signal lines 11a and 11b, respectively in FIG. 22. Similar interconnections are employed with respect to the lane full sensing means of the remaining branch conveyors and their corresponding lane full signal lines in memory unit 32.

Figure 23:
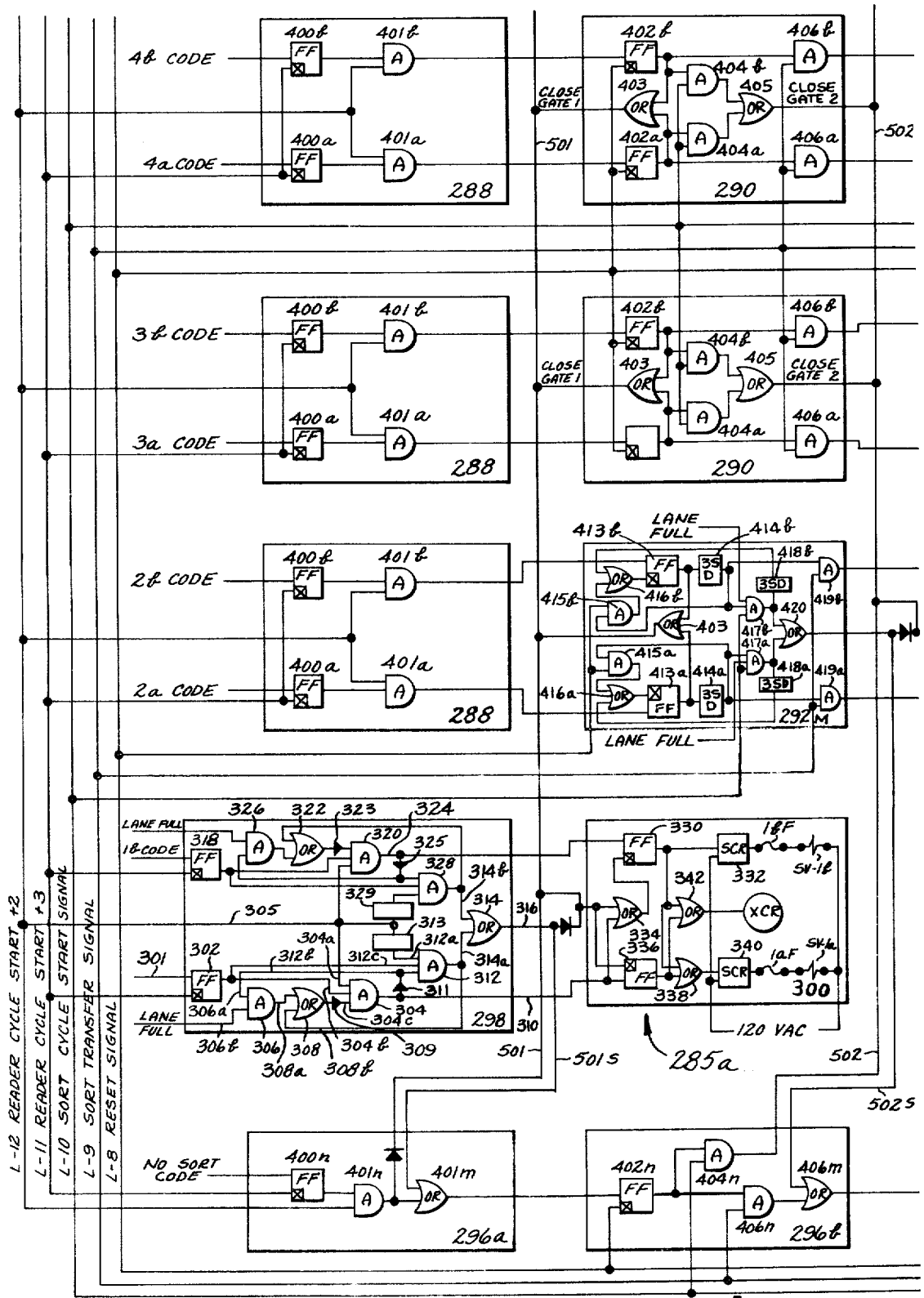
FIGS. 23 and 23a together form a schematic circuit diagram for the first four diverter stations, and the associated no-sort circuitry as depicted in the block diagram of FIG. 22.
Figure 23A:
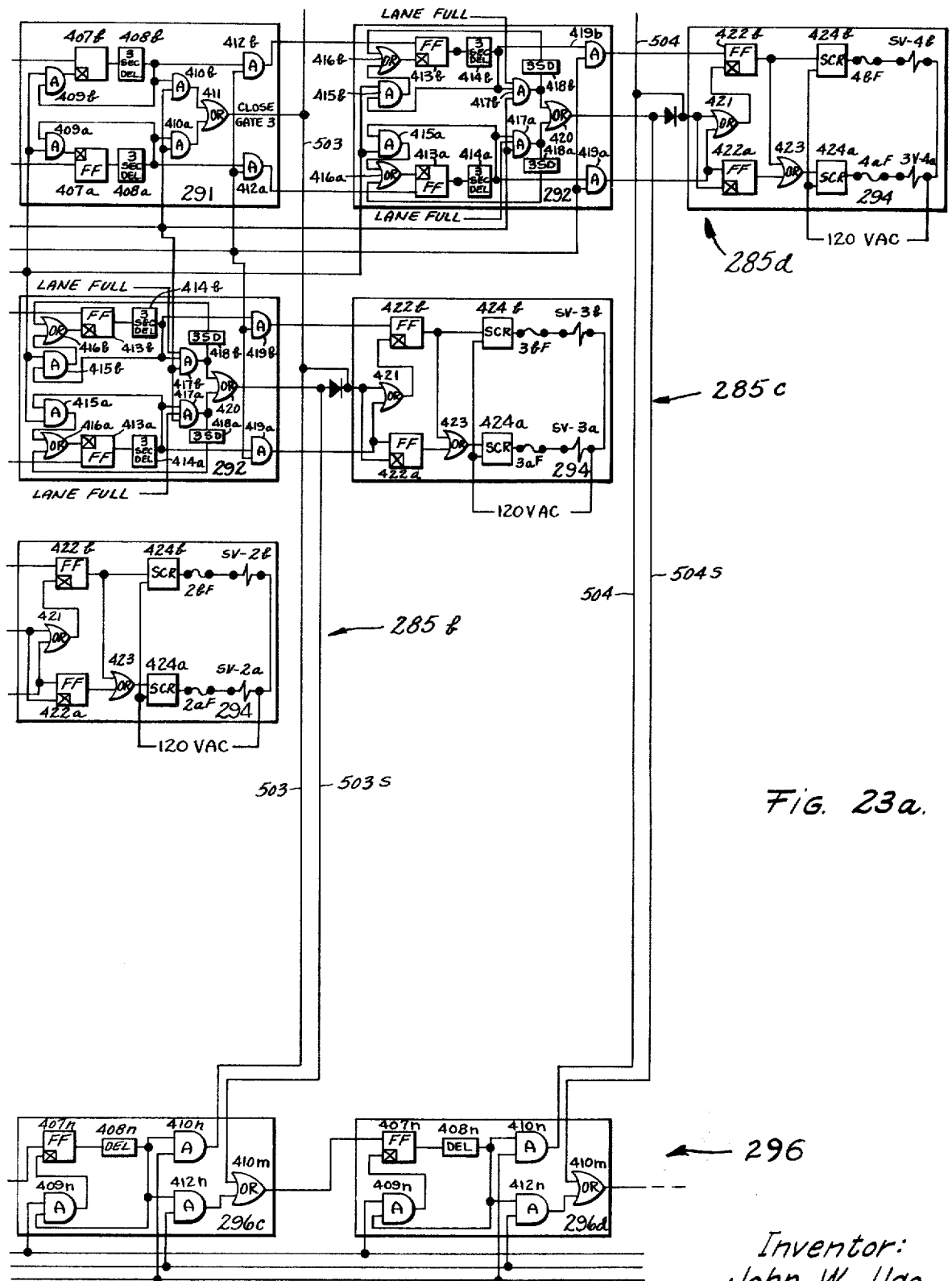

Turning now to FIG. 23, the sorting of a tire onto the upper level branch conveyor 20a connected to diverter station No. 1 will now be described with greater particularity. When a tire scheduled for this branch conveyor is identified by the code reader unit 12 (FIG. 1), the sensor circuit means 158 (FIG. 2) develops a code signal which is introduced to the memory unit 32. In FIG. 23, input wire 301 is for code signal 1a. This signal causes bistable multivibrator or flip-flop 302 of the storage and lane full circuitry 298 to change its state from a reset condition to a triggered on condition. A fundamental characteristic of a flip-flop is that at any given time it can be in only one of two possible states and that it will remain in that state until commanded to change states.

The sequence of reading a code signal on a tire and transferring this code signal to the memory unit 32 is as follows, with reference to the diverter station No. 1:

1. The tire enters the reader to initiate a reading cycle which is approximately 6 seconds in duration.

2. At reader cycle start +2 seconds, a transfer pulse is generated which initiates the transfer of information from temporary storage and lane full circuits 298 to output control circuit 300, when there is information at the temporary storage and lane full circuit 298 to be transferred. Assuming the tire which had previously been in the reader was not scheduled to be deposited on the branch conveyors at diverter station No. 1, there is no information in circuit 298 to be transferred to circuit 300 at this time.

3. At reader cycle start +3 seconds, a reset pulse is initiated to reset the temporary storage and lane full circuit 298 in preparation for accepting a new code signal. (New code signals are acceptable at approximately reader cycle start +5 seconds).

4. At the end of the first reader cycle, the code signal identifying the tire in code reader unit 12 which is destined for upper level branch conveyor 20a is transmitted to memory circuit 32 (FIG. 2). This code signal appears on input line 301 for code signal 1a and triggers flip-flop 302 which qualifies input 304b of "AND" circuit 304. It also qualifies input 312c of "AND" circuit 312. No further function will result until a subsequent tire is read.

When the next tire comes into the code reader unit, it ejects the previously read tire and starts a second reader cycle. The information stored in temporary storage and lane full circuit 298 from the previous tire will be transferred to flip-flop 336 of circuit 300 via line 310 when the reader cycle start +2 pulse is initiated during this second reader cycle. The reader cycle start +2 signal is fed to memory unit 32 via conductor L-12 (FIGS. 22, 23 and 31) and via input wire 305 (FIG. 23) so as to qualify input 304a of "AND" circuit 304.

In the absence of a lane full signal from the upper level branch conveyor 20a of diverter station No. 1 at the time that the inputs 304a and 304b become qualified, the input 304c is also qualified. The reason for this is that input 306b of AND circuit 306 does not have a lane full signal on it, and this AND circuit is, thus, disabled. Accordingly, there is no signal on input 308a of "OR" circuit 308. Also, as will be described in greater detail below, there is no signal on input 308b of "OR" circuit 308 at this time and there is, thus, no input to inverter 309. Inverter 309 serves to provide a +24 volt to ground signal output when there is a zero volt to ground input to it, and to provide a zero volt to ground output when there is a +24 volt input to it. Accordingly, at this time, inverter 309 is providing a +24 volt to ground output signal to the input 304c of AND circuit 304, qualifying this input. Since all three inputs 304a–304c of AND circuit 304 are qualified, this circuit is enabled, passing the +24 volt to ground signal to its output line 310 and to the input of inverter 311.

With a +24 volt to ground signal present at the input to inverter 311, the output of this inverter has zero volts to ground on it and, thus, no signal is present at input 312b to AND circuit 312. Accordingly, AND circuit 312 remains disabled during the time that AND circuit 304 is enabled. A delay circuit 313 is interposed between the reader cycle start +2 signal input line 305 and the input 312a to AND circuit 312 to briefly delay application of the reader cycle start +2 signal to input 312a of AND circuit 312. This is to insure that, in the simultaneous absence of a lane full signal and presence of a code signal 1a and a reader cycle start +2 signal, AND circuit 304 will be enabled and, through inverter 311, block AND circuit 312 from enabling. Since AND circuit 312 is disabled, its zero volt to ground output is connected to the input 341a of "OR" circuit 314 and to the input 308b of "OR" circuit 308.

Recalling that the output of inverter 311 is at zero volts to ground at this time, it will be seen that the input 306a of AND circuit 306 will also be at zero volts to ground, preventing AND circuit 306 from thereafter enabling and qualifying input 308a of "OR" circuit 308 due to the subsequent appearance of any lane full signal on input line 306b during this cycle. Also, since AND circuit 312 is disabled and the input 308b of "OR" circuit 308 is at zero volts to ground, the output of "OR" circuit 308 must remain at 0 volts to ground during the time that AND circuit 304 remains enabled. Thus, when the AND circuit 304 enables, an irrevocable decision is made committing the tire in the code reader unit 12 to be sorted to the upper level branch conveyor 20a of diverter station No. 1 when that tire reaches such station.

Should the upper branch conveyor 20a at diverter station No. 1 be full prior to and at the time that the reader cycle start +2 signal and code signal 1a reach the storage and lane full circuit 298, a different sequence of events occur. In this case prior to the arrival of the reader cycle start +2 signal on input line 305 and the code signal 1a on input line 301, a +24 volt to ground lane full signal 1a will have appeared on input 306b of AND circuit 306. Since the reader cycle start +2 signal and the code signal 1a have not arrived yet, inputs 304a and 304b of AND circuit 304 are not qualified. Accordingly, there is a zero volt to ground input to inverter 311 and a +24 volt to ground inverter 311 output is present at the input 306a of AND CIRCUIT 306, qualifying this input. Thus, when the +24 volt to ground lane full signal 1a appears at input 306b, the AND circuit 306 is enabled, passing the +24 volt to ground signal to the input 308a of "OR" circuit 308. The "OR" circuit 308 passes the +24 volt to ground signal on to the input of inverter 309 and the output of the inverter, thus, goes from +24 volts to ground. This causes input 304c of AND circuit 304 to be disqualified and prevents this AND circuit from subsequently becoming enabled. Since the AND circuit 304 is disabled, its output, and the input of inverter 311, are at ground. The output of inverter 311, thus, remains at +24 volts to ground, locking input 312b of AND circuit 312 and input 306a of AND circuit 306 in the qualified condition. Accordingly, when the code signal 1a arrives on input 301, causing flip-flop 302 to qualify input 312c, and when the delayed reader cycle start +2 signal arrives to qualify input 312a, AND circuit 312 is enabled, passing a +24 volt to ground lane full signal to the input 314a of "OR" circuit 314. Circuit 314 in turn, passes the +24 volt lane full signal via output line 316 to the output control circuit 300 and via output line 501s to the no sort circuit 296a.

The upper portion of the storage and lane full circuit 298 of FIG. 23 is essentially a mirror image of the lower portion thereof except that the "OR" circuit 314 and reader cycle start +2 signal input line 305 serve both portions of circuit 298. The upper portion of circuit 298 is utilized in connection with the operation and control of the diverter unit 18 to sort tires at diverter station No. 1 to the lower lever branch conveyor 20b at that station. Flip-flop 318 corresponds to flip-flop 302, AND circuits 320, 326, and 328 correspond to AND circuits 304, 306 and 312, respectively, "OR" circuit 322 corresponds to "OR" circuit 308, inverters 323 and 325 correspond to inverters 309 and 311, respectively, and delay 329 corresponds to delay 313. A +24 volt to ground output signal on output line 324 of AND circuit 320 signifies that the tire being read in the code reader unit 12 has been irrevocably committed to being sorted to the lower level branch conveyor 20b at diverter station No. 1. On the other hand, a +24 volt to ground output signal from AND circuit 328, which passes via input 314b and "OR" circuit 314 to outputs 316 and 501s signifies that the lower level branch conveyor 20b in question is full, and that the tire in the code reader unit is not to be sorted to that branch conveyor.

Referring now to output control circuitry 300 for the first diverter station 16 (FIG. 1). Fuses 1aF and 1bF are employed to protect against overloading the control circuits in the event of a malfunction or short circuit. The +24 volt output signal on output line 310 triggers flip-flop 336, which, in turn, enables "OR" circuit 338 actuating a suitable silicon controlled rectifier circuit, designated generally at 340. The silicon controlled rectifier circuit 340 regulates the operation of solenoid valve SV-1a of the diverter unit 18 (FIG. 1) energizing the same at this time for shifting the tire onto the upper level branch conveyor 20a. Also, output signal 310 (FIG. 23) qualifies "OR" circuit 334 so as to reset flip-flop 330, if it has been previously actuated. The resetting of flip-flop 330, in turn, causes deactuation of a silicon controlled rectifier circuit, designated generally at 332. The silicon controlled rectifier circuit 332 controls the operation of solenoid valve SV-1b of diverter unit 18. Deenergizing the same at this time causing the diverter to shift from the lower level to the upper level branch conveyor 20a. The output signal from flip-flop 336 also qualifies "OR" circuit 342 which actuates control relay XCR so as to prevent the transfer unit 22 (FIG. 1) from operating when a tire is to be transferred onto one of the branch conveyors 20 at diverter station No. 1.

The XCR relay is used to lock out the shuttle from cycling when sorting tires to Station 1. When the shuttle is prevented from operating, the sort cycle start signal is never initiated, since the XCR relay disables the tracking unit electrical circuitry from operating. Subsequently, there can be no transfer signal and reset signal, and the registers remain in status quo while a tire is sorted to Station 1. In other words, when sorting to Station 1, the controls to the other registers are inhibited and they remain as previously selected. The relay is automatically reset when a new tire is scheduled to some station other than Station 1. When flip-flops 330 or 336 are qualified, the relay is turned on. When these flip-flops are disabled, the XCR is turned off, qualifying the tracking unit electrical circuitry to operate if required.

In the event that the upper portion of the storage and lane full circuit 298 of FIG. 23 generates a +24 volt to ground output signal on line 324, flip-flop 330 changes state to actuate the silicon controlled rectifier circuit 340. In response thereto, silicon controlled rectifier circuits 340 and 332, respectively, actuate solenoids SV-1a and SV-1b to cause the diverter unit 18 to transfer the incoming tire onto the lower level branch conveyor 20b. The output signal from flip-flop 330 will also qualify "OR" circuit 342, which once again actuates control relay XCR so as to inhibit the transfer unit 22 from operating.

In the event that the lower level branch conveyor 20b is full at the time that a tire at diverter station No. 1 is to be transferred thereto, a +24 volt to ground lane full output signal is developed on lines 316 and 501s by the storage and lane full circuit 298 (FIG. 23) in the manner described earlier. The output signal on line 316 resets flip-flop 336 and qualifies "OR" circuit 334 which resets flip-flop 330. The output signals from flip-flops 330 and 336 deactivate the silicon controlled rectifier circuits 332 and 340 which, in turn, denergize solenoid valves SV-1b and SV-1a, thereby deactivating the diverter unit 18 at diverter station No. 1 from transferring the tire onto any of the branch conveyors 20 at that station.

The lane full output signal generated by the storage and lane full circuit 298 also actuates the no-sort circuit 296a via line 501s as shown in detail in FIG. 23. The no-sort circuit 296a prevents the tire, which is scheduled for but cannot be accepted by one of the branch conveyors 20 at diverter station No. 1, from being transferred onto any of the other branch conveyors except the no-sort conveyor 15 (FIG. 1) at the end of transfer unit 22. No-sort circuit 296a operates in the manner described below when a +24 volt to ground lane full output signal appears on line 501s.

The signal on 501s is sent to no-sort circuit 296a, where it qualifies the input to "OR" circuit 401m. "OR" circuit 401m in turn enables flip-flop 402n of circuit 296b, which qualifies one of the inputs of AND circuit 404n. When a sort cycle start signal L-10 is received at the other input and AND circuit 404n, a +24 volt to ground signal is sent along line 502 deactivating the control circuit 294 in row 285b of the logic units in similar fashion to the control circuit 294 of row 285d, as will hereinafter be described in more detail. The output control circuitry 294 controls the operation of the diverter unit 18 at diverter station No. 2. The deactivation of circuit 294 in row 285b prevents the diverter unit 18 associated therewith from opening to either branch conveyor at diverter station No. 2.

Flip-flop 402n also qualifies one of the inputs to AND circuit 406n of no-sort circuit 296b. When a sort transfer signal L-9 is received at the other input to AND circuit 406n, an output signal qualifies "OR" circuit 406m. A signal is then passed on to flip-flop 407n of the next no-sort circuit 296c.

The no-sort circuitry of 296a, 296b, and 296c, corresponds to the single lane circuitry of 288, 290 and 291 of rows 285d, with the exception that the "OR" circuits 403, 405 and 411 associated with the double lane 4a and 4b circuits are absent.

Single lane circuitry does not require these "OR" circuits. It does, however, have other "OR" circuitry which accepts no-sort signals either directly through the no-sort train, or from the station circuits, i.e. "OR" circuits 401m, 406m, 410m, etc.

When a tire is read in reader unit 12, and cannot be sorted to any of the branch conveyors, a no-sort code signal is sent out from the reader, which appears as an input to flip-flop 400n of circuit 296a. Flip-flop 400n sends an output signal to one of the inputs of AND circuit 401n. When a reader cycle start +2 signal, L-12, is received at the other input to AND circuit 401m a qualifying signal is sent to "OR" circuit 401m. When the "OR" circuit 401m is qualified an output signal is sent to the next no-sort circuit 296b, said output signal appearing at the input to flip-flop 402n.

Also, when AND circuit 401n sends an output signal, the signal travels along line 501 to control circuit 300 of Station No. 1, deactivating this circuit and closing the gate. This type of signal transfer is repeated from station to station, and throughout the remaining no-sort circuits 296b–296k, i.e., each no-sort circuit actuating the next successive no-sort circuit, which in turn, deactivates the diverter unit 18 associated therewith so as to insure that the tire in question is eventually moved to the no-sort conveyor 15.

It is to be noted that after no-sort circuit 296b, all the other no-sort circuits 296(–296k have the same circuitry as circuit 296c. Circuits 296(–296k operate similarly to the single lane of circuit 291 of row 285d as will be described in more detail hereinafter.

The sequence of operations heretofore described applies for shifting a tire onto the branch conveyor for Station 1. However, in order to more fully describe the operation of the memory unit, the manner in which a tire is transferred onto the lower level branch conveyor 21b (FIG. 1) associated with the fourth diverter station 25 (FIG. 1) will now be set forth in detail.

Referring once again to FIGS. 22, 22a, 23 and 23a code signal 4b is transmitted to the temporary storage circuit 288. When the reader cycle start +2 signal is received by the temporary storage circuit 288, an output signal is generated therefrom which activates the transfer storage control circuit 290 indicating the tire is at Station 1. When the tire is transferred from Station 1 to Station 2, an output signal from the transfer storage control circuit 290 actuates storage circuit 291 indicating the tire is at Station 2. When the tire is transferred to Station 3, an output signal from 291 actuates lane full circuit 292. When the tire is transferred to Station 4 the lane full circuit 292 will qualify circuit 294, which in turn will operate the selector gate for Station 4. If the branch conveyor 21b connected to the diverter station 25 (FIG. 1) has space available thereon, an output signal is developed by lane full circuit 292 as aforementioned, which excites circuit 294 so as to actuate the diverter unit 23 (FIG. 1), thereby shifting the tire onto the selected branch conveyor 21b.

Referring now to FIG. 23, the sequence of operation will be explained in greater detail for sorting a tire to Station 4b:

a. Input code signal 4b will qualify flip-flop 400b of circuit 288. When a signal L-12 is received, AND circuit 401b is enabled qualifying flip-flop 402b of circuit 290. The tire at this time is leaving the reader and approaching Station 1 of the sorting unit (FIG. 1). Also, the output of flip-flop 402 will qualify "OR" circuit 403 of circuit 290 which in turn will send a closed gate signal 501 to station 1 output control circuit 300, causing the gates to close if open.

b. When L-11 signal is received the flip-flop 400b of circuit 288 will be reset.

c. When the tire reaches Station 1 there will be a dwell, and then signal L-10 will be initiated; the Sort cycle will now commence (hereinafter described). Signal L-10 will qualify AND circuit 404b which in turn qualifies "OR" circuit 405 producing a signal 502. This signal indicates that the tire in Station 1 must pass on to Station 2, which requires the closing of Station 2 gates if open. Signal 502 accomplishes this by deactivating Station 2 circuit 294. Signal L-10 will also qualify one input to AND circuit 410b of circuit 291 and the AND circuit 417b of circuit 292. These circuits will not be qualified unless a tire is at the station represented by circuit 291 and the circuit representing circuitry 292 in conjunction with a full lane signal.

d. The next signal received will be L-9 indicating that the tire is now being transferred to Station 2. This signal qualifies AND circuit 406b of circuit 290 qualifying flip-flop 407b of circuit 291. This in turn qualifies "ON" delay circuit 408b. The L-9 signal also qualifies the input to AND circuit 412b and the AND circuit 419b of circuits 291 and 292, respectively. Circuits 412b and 419b will only be qualified if information is stored in the associated flip-flop registers 407b and 413b, respectively, from the previous sort cycle.

e. Approximately 1.5 seconds after Signal L-9 is initiated a reset signal L-8 will be initiated. This signal is used to reset the previous station registers when the tire is transferred from station to station. This signal will reset flip-flop 402b of circuit 290, and also qualify one input to AND circuit 409b and the AND circuit 415b of circuits 291 and 292, respectively. The AND circuit 409b will not be qualified because "ON" delay 408b which is set for about 3 seconds will not be timed out at the time this signal is received. Circuit 415b does not qualify if circuit 414b is not timed out, but if circuit 414b is timed out, 415b will qualify "OR" circuit 416b, resetting flip-flop 413b.

For the sake of clarity, signals L-10, L-9, and L-8 will be hereinafter discussed with respect to the circuit during a particular sort cycle. Also, previous circuitry that was theretofore discussed will no longer be mentioned, but it is to be understood that said circuitry will continue to operate as aforementioned.

f. At the start of the next sort cycle, the first event will be a sort cycle start signal L-10. At this point the tire is being transferred from Station 2 to Station 3. This signal will qualify one input to AND circuit 410b along with the output from circuit 408b of circuit 291 which is already qualified. The output from circuit 410b will qualify "OR" circuit 411 signalling output control circuit 294 for Station 3 to close via line 503. This indicates the tire must pass over Station 3.

g. The next event will be the transfer signal L-9. This signal will qualify one input to AND circuit 412b of circuit 291. The other input is already qualified from time delay circuit 408b which is now timed out. The output of AND circuit 412 will qualify flip-flop 413b which in turn qualifies time delay circuit 414b of circuit 292.

h. The next signal received will be L-8. Signal L-8 will qualify one input to AND circuit 409b, the second input has been already qualified from time delay circuit 408b being timed out. The output from AND circuit 409b will reset flip-flop 407b of circuit 291.

i. The final sort cycle encompassing the retransmission of signals L-10, L-9 and L-8, corresponds to the movement of the tire from Station 3 to Station 4. Signal L-10 will qualify one input of AND circuit 417b of circuit 292. The second input from delay circuit 414b will already be qualified. It will be noted that the third input to 417b is the lane full signal. If the lane full signal is present, the following events will occur:

1. Output of AND circuit 417b will qualify "OR" circuit 420 of circuit 292. The output of circuit 420 qualifies the "NO SORT" circuit 296d via line 504s.
2. The output of 420 also qualifies "OR" circuit 294 which in turn resets circuit 422b turning off SCR circuits 424b and 424a. This causes the Station 4 gate to close, if it happens to be open.
3. The output of AND circuit 417b qualifies "ON" delay circuit 418b of circuit 292. After 20 20 milliseconds, an output signal from 418b will qualify "OR" circuit 416b. The output from 416b will reset flip-flop 413b, thereby nullifying the sort signal for Station 4.

If the lane full signal is not present, however, the following events will occur instead:

1. None of the by-pass circuitry will be qualified. This includes previously mentioned circuits 417b, 418b, 416b, and 420. No further action will take place until the next signal L-9 is received.

j. L-9 will now be the next signal event qualifying one input to AND circuit 419b of circuit 292. The second input will already be qualified from delay circuit 414b being now timed out. The output of AND circuit 419b will qualify flip-flop 422b of circuit 423 and SCR circuit 424b. The output from "OR" circuit 423 will qualify SCR circuit 424a. These SCR circuits will activate solenoid values SV-4a and SV-4b which will operate the cylinders to open Station 4 gate. The tire will start to discharge as soon as the carrier pin is retracted as hereinafter will be discussed.

k. The final event is the receipt of signal L-8 which qualifies one input to 415b of circuit 292. The second input to AND circuit 415b is already qualified from delay output circuit 414b which is now timed out. The output from AND circuit 415b qualifies "OR" circuit 416b which in turn resets flip-flop 413b readying this register for receipt of new information.

As previously mentioned for Station 1 operation, the duality of operation for code signal 4a is consistant with that of 4b, as was the operation of code signal 1a with that of 1b. In other words the circuits designated with a suffix a operate in the same manner as those circuits with a b suffix, and operate as previously described above.

Figure 22:
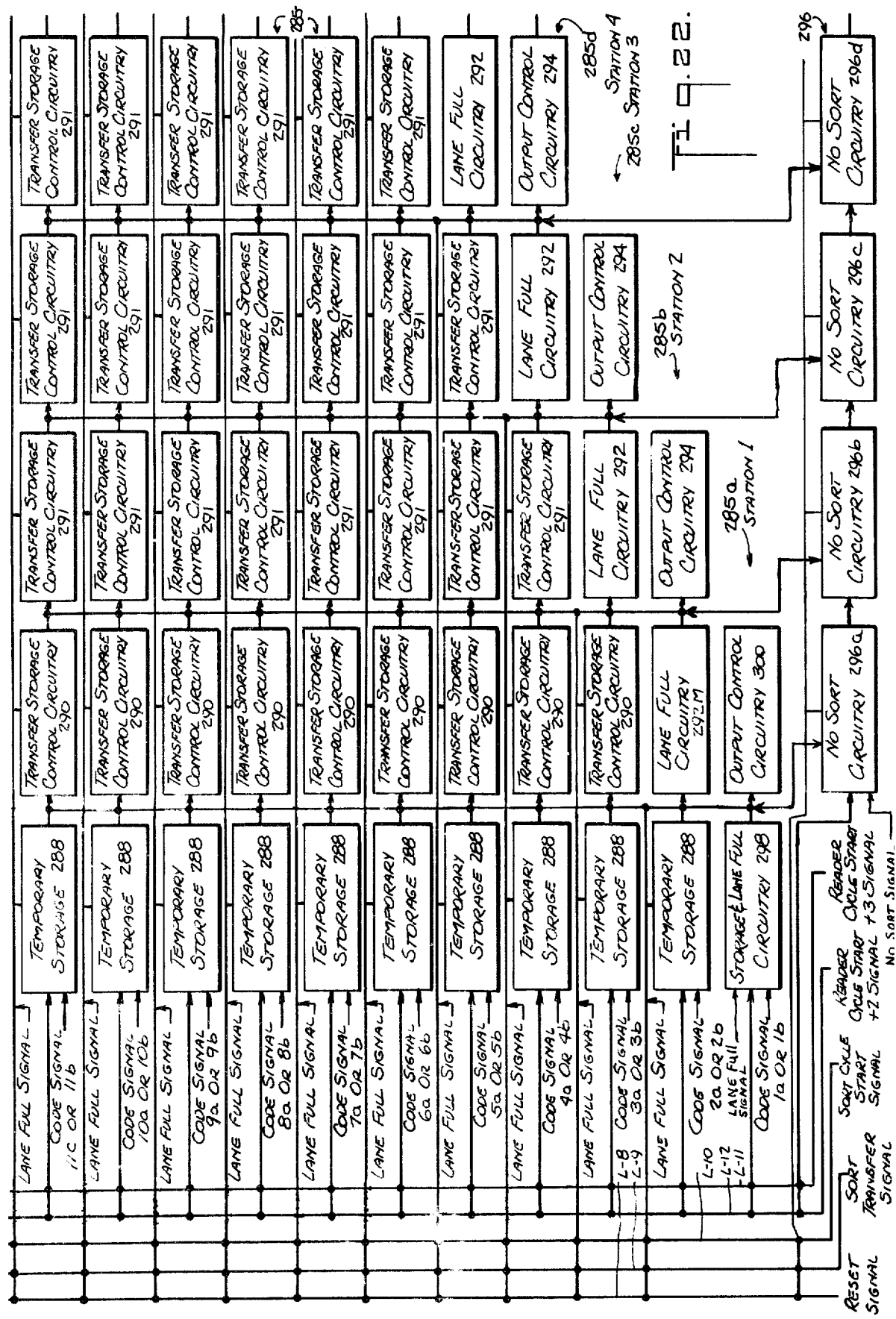

For station 5 and all subsequent stations, additional storage circuits 291 are employed as shown in FIGS. 22, and 22A. These additional circuits provide storage for a respective tire for the downstream stations so this particular tire will be sorted at its proper station.

Station 3, on the other hand, contains no circuit 291 so that all the signals from 290 pass directly to circuit 292.

Station 2 contains no circuits 290 and 291. It does contain a modified 292M circuit and similar 288 and 294 circuits. The modification of circuit 292 is the addition of "OR" circuit 403 of circuit 290 as shown for Station 4. This "OR" circuit will provide signal 501 as soon as flip-flop 413b or 413a are qualified. This signal will disable Station 1 output control circuit 300, closing the Station 1 gate. All other operations as previously described for circuit 292 remain the same.

Thus, the code signals are transmitted sequentially through a series of logic units in response to the progression of the tire along the main conveyor. As hereinbefore set forth, the code signals are selectively released so as to actuate the appropriate diverter units as the tires arrive at the diverter stations connected to the selected branch conveyors, provided there is space available thereon for the tires.

Transfer Unit

The transfer means or transfer unit 22 is shown generally in FIG. 1 and in greater detail in FIGS. 24 through 27. It serves to move sequentially the articles, i.e. tires, through the series of diverter stations along the main conveyor 14.

Referring more particularly to FIGS. 24 through 27, transfer unit 22 includes transfer tubes 464 and 466 and transfer fingers 446 slidably mounted thereon. The transfer fingers 446 are initially retracted when the tire descends from the code reader unit 12 (FIG. 1) onto the main conveyor 14 at the first diverter station 16. Thereupon the transfer fingers 446 advance so as to engage the tire. When the transfer fingers 446 are fully extended they translate in a direction parallel to the main conveyor so as to advance the tire from the initial diverter station to the next successive diverter station. The transfer fingers 446 are then retracted so as to disengage from the tires.

Turning now to FIG. 24, the transfer fingers, shown generally at 446, include preferably a cyclindrical pin 448 having a free end portion 450 thereof extending through a slot 452 in the vertical portion 454 of the main conveyor 14. The mid-portion 453 of the pin 448 is slidably mounted in a housing 458. The housing 458 is a generally tubular member having an opening 460 therein extending along the longitudinal axis thereof. The pin 448 is adapted to be slidably mounted in the opening 460 of the housing 458. The other end portion 456 of the pin 448 extends through the opening 460 beyond the housing 458. As shown more clearly in FIG. 26, the other end portion 456 of the pin 448 is slidably mounted to the transfer slide 444 by means of a suitable C-shaped clamp 462 adapted to slidably mount on the transfer slide 444 and having an opening therein so as to permit a suitable fastener to engage the pin 448 and secure it thereto. The housing 458 has fastened thereto a pair of hollow tubes 464 and 466 (FIG. 25) extending in a direction substantially parallel to the vertical portion 454 of the main conveyor 14. One of the hollow tubes 464 is fastened to the upper portion of the housing 458. The other of the hollow tubes 466 is fastened to the lower portion of the housing 458. The tubes 464 and 466 are adapted to slidably engage a plurality of wheels, designated generally at 468 and 470, which are rotatably mounted on the frame 472 of the main conveyor 14. The wheels 468 and 470 also preferably extend substantially in a longitudinal direction in a plane preferably substantially parallel to the vertical portion 454 of the main conveyor 14. The wheels 468 and 470 are formed from pairs of truncated conical members 468a and 468b and 470a and 470b, respectively, fastened to each other along their respective minor diameters (FIG. 24). A plurality of the wheels 468 and 470 are adapted to be used to form an upper and lower track for engagement with the tubes 464 and 466. The upper track, formed by the upper wheels 468, is adapted to guide the upper tube 464 in a longitudinal direction preferably substantially parallel to the vertical portion 454 of the main conveyor 14. Similarly, the lower track, formed by the lower wheels 470, is adapted to guide the lower tube 466 in a longitudinal direction also preferably substantially parallel to the vertical portion 454 of main conveyor 14. Hence, the upper and lower tubes 464 and 466 mounted on the housing 458 are adapted to cooperate with the tracks formed by the wheels 468 and 470 so as to support the transfer finger assembly in a predetermined vertical position relative to the vertical portion 454 of the main conveyor 14 i.e. within the slot 452 thereof.

Turning now to FIG. 26, the transfer slide 444 is pivotably mounted to the frame 472 of the main conveyor by means of crank arms 478, 480 and 484. One end portion 478a and 480a, respectively, of the crank arms 478 and 480 is pivotably secured to the frame 472 of the main conveyor 14. The other end portions 478b and 480b thereof are pivotably fastened to the transfer slide 444 at opposite ends thereof. Thus, the crank arms are adapted to be pivoted with respect to the frame 472 of the main conveyor 14. When the crank arms pivot, they cause the transfer slide 444 to translate in a direction substantially normal to the plane formed by the vertical portion of the main conveyor. The transfer slide will translate approximately 8 inches. Therefore, when the transfer slide is in a position of closest approach to the vertical portion of the main conveyor, the transfer fingers are extended therefrom and engage the tires. Similarly, when the transfer slide is in the furthest position from the vertical portion of the main conveyor, the transfer fingers are retracted therefrom and disengage from the tires. Furthermore, inasmuch as the transfer fingers are slidable mounted on the transfer slide, the transfer fingers are adapted to move with respect to the transfer slide in a direction parallel to the vertical portion of the main conveyor. Hence, the transfer fingers may advance from one diverter station to the next successive diverter station when the transfer slide is furthest from or closest to the vertical portion of the main conveyor. It is therefore apparent that pivoting the crank arms will cause the transfer fingers to extend or retract, whereas sliding the transfer fingers relative to the transfer slide will cause the transfer fingers to advance from one diverter station to the next successive diverter station. When a transfer finger is disengaged from a tire, the tire may be shifted onto the selected branch conveyor.

Referring once again to FIG. 26, the transfer slide is pivoted by a suitable hydraulic power unit 482 (FIG. 27) connected to the transfer slide via a drive arm, shown generally at 486 (FIG. 26). The drive arm is pivotably mounted at one end portion 484a thereof, to the mid-portion of the transfer slide 444 by a suitable bracket member 485. The drive bar 484 is pivotably mounted at the other end portion 484b thereof to the frame of the main conveyor by another bracket member 487. Thus, the drive arm is suitably pinned to the transfer slide and frame so as to pivot the transfer slide relative to the frame. When the cylinder rod 486a is in its extended position, the transfer slide is closest to the vertical portion of the main conveyor and the transfer fingers are extended. Similarly, when the cylinder rod 486a is retracted, the transfer slide is furthest from the vertical portion of the main conveyor and the transfer fingers are retracted.

The transfer fingers are advanced from one diverter station to the next successive diverter station by the hydraulic power unit 482 (FIG. 27) connected to a piston-cylinder unit, designated generally at 488. The piston rod 488a of the piston-cylinder unit 488 is fastened at one end thereof to the lower tube 466 secured to the housings of the transfer fingers. The cylinder 488b of the piston-cylinder unit 488 is pivotably mounted at one end thereof on the frame 472 of the main conveyor. When the piston rod 488a is retracted, the transfer fingers are at the initial diverter stations. Whereas, when the piston rod 488a is extended, the transfer fingers are at the next successive adjacent diverter stations. The piston stroke is approximately 46 inches, i.e. the distance between adjacent diverter stations. When the piston Rod 488a is retracted, the transfer fingers are moved in the opposite direction, so as to return to their initial diverter stations.

Thus, it is evident that when the piston rod 486a of the piston-cylinder unit 486 is extended, the transfer fingers are similarly extended and in engagement with their respective tires. Extending the piston rod 488a of the piston-cylinder unit 488 advances the transfer fingers so as to move the tires along the main conveyor from their initial diverter stations to the next successive diverter stations. Both piston-cylinder units 486 and 488 are part of a hydraulic system which utilizes a suitable pressurized fluid, i.e. oil to drive the respective pistons.

The hydraulic controls employed in moving the various components of the tire sorting apparatus are shown in FIG. 27. This figure portrays diagrammatically all the major components of the hydraulic system. The hydraulic system used to control both the transfer bar and the transfer fingers includes a hydraulic power unit 482 and a pair of four way, three position spring offset solenoid valves, SV-20 and SV-21. The solenoid valve SV-20 controls the flow of high pressure oil to piston cylinder unit 486. This valve is provided with a first solenoid S-20a which, when energized, causes piston rod 486a to be extended from cylinder 486b, resulting in the transfer fingers being extended from the vertical portion of the main conveyor so as to engage the tires disposed thereon. Valve SV-20 is also provided with a second solenoid S-20b which, when energized, causes piston rod 486a to be withdrawn into cylinder 486b thereby resulting in the transfer fingers being retracted so as to cause the transfer fingers to disengage from the tires disposed on the main conveyor. When valve solenoid S-20a is energized and valve solenoid S-20b is deenergized, conduit 496 is placed in communication with conduit 498, thereby permitting high pressure oil to flow from the hydraulic power unit 482 to the underside of piston 486b so as to extend the piston. Simultaneously therewith, conduit 494 is exhausted to the tank so as to permit oil in the cylinder 486 on the upper side of the piston rod 486a to escape therefrom. Furthermore, when solenoid S-20a is deenergized and solenoid S-20b is energized, conduit 494 is placed in communication with conduit 498 so as to permit high pressure oil to flow from the hydraulic power unit 482 to the upper side of piston rod 486a so as to retract the piston. Simultaneously therewith, conduit 496 is exhausted to the tank, thereby permitting oil in the cylinder 486b on the underside of the piston rod 486a to escape therefrom. If neither solenoid S-20a or S-20b are energized, the valve SV-20 remains in the neutral position shown in FIG. 27 in which both conduits 494 and 496 are blocked from the pressure or return hydraulic supply lines.

The translation of the transfer fingers to and from successive diverter stations is under the control of solenoid valve SV-21. When solenoid S-21a of this valve is energized, the transfer fingers are advanced from their home or initial diverter stations to the next successive diverter stations. Similarly, when solenoid S-21b of this valve is energized, the transfer fingers are returned to their home or initial diverter stations. When solenoid S-21a is energized and solenoid S-21b is deenergized, conduit 492 is placed in communication with conduit 498, thereby enabling high pressure oil to flow from the hydraulic power unit 482 to the underside of piston rod 488b so as to extend the piston. Simultaneously therewith, conduit 490 is exhausted to the hydraulic pump reservoir so as to permit oil in the cylinder 488 on the upperside of the piston rod 488a to escape therefrom. Furthermore, when solenoid S-21a is deenergized and solenoid S-21b is energized, conduit 490 is placed in communication with conduit 498 so as to permit high pressure oil to flow from the hydraulic power unit 482 to the upperside of piston rod 488a, thereby reacting the piston. Simultaneously therewith, conduit 492 is exhausted to the hydraulic pump reservoir so as to permit oil in the cylinder 488b on the underside of the piston cylinder 488 to escape therefrom. If both valve solenoids S-21a and S-21b are deenergized, the valve SV-21 remains in the neutral position shown in FIG. 27, in which, both conduits 490 and 492 are blocked from the pressure and return hydraulic supply lines.

A typical hydraulic unit 482 suitable for driving both the piston-cylinder units 486 and 488 preferably includes a reservoir, a motor, such as, for example, preferably a 15 hp, 1200 rpm motor, a pump riser, a pump, filters, a gauge isolator and a pressure gage, such as for example a pressure gauge preferably capable of measuring from 0 to 1000 psi. A typical valve suitable for both SV-20 and SV-21 preferably would be a four way, three position spring offset valve having a closed center preferably rated at 30 gallons/minute.

The solenoid valves SV-20 and SV-21 are actuated by the signals from the relay and timing circuitry illustrated in FIG. 31, in response to the progression of the tires along the main conveyor. These signals serve to energize solenoid S-20a so as to extend the transfer fingers for engaging the tires. Thereupon, solenoid S-21a is energized so as to advance the transfer fingers and the tires in engagement therewith to the next successive diverter station. When the tires are at the next diverter station solenoid S-20a is deenergized and solenoid S-20b is energized, thereby retracting the transfer fingers so as to enable the tires to remain at the new diverter stations. Upon the transfer fingers being fully retracted, solenoid S-21a is deenergized and solenoid S-21b is energized for returning the transfer fingers to the home or initial positions. Having observed the details of the operation of the transfer unit, it follows that both the transfer slide and transfer fingers undergo cyclic motion, whereby the tires are moved along the main conveyor through the series of diverter stations thereon to the selected ones of the plurality of branch conveyors.

Diverter Unit

The diverter means or diverter unit associated with the first diverter station has been indicated generally at 18 in FIG. 1 and is shown in greater detail in FIGS. 28 through 30. A plurality of like diverter units serve to transfer the tires from the main conveyor onto the branch conveyors. Each diverter unit cooperates with the main conveyor and the selected branch conveyor so as to become a chute inclined downwardly connecting the main conveyor with the selected branch conveyor for shifting the tire thereto. The tires descend from the main conveyor to the selected branch conveyors under the force of gravity when the transfer fingers are disengaged from the tires, i.e., are retracted. The diverter units are positioned along the main conveyor and one diverter unit is operatively associated with each diverter station.

Referring now to FIG. 28, the diverter unit 18 associated with the first diverter station is illustrated therein. The diverter unit 18 includes a gate member shown generally at 500 which is pivotably mounted to the frame 472 of the main conveyor 14. As shown more clearly in FIG. 26, the gate member 500 includes preferably a substantially rectangular frame 502. The gate frame 502 (FIG. 28), at one end portion 504 thereof, is pivotable fastened to suitable brackets at the corresponding end portion 506 of the main conveyor frame 472 by a suitable pin assembly 508, thereby forming a support for the tire when the gate member has been pivoted to the closed position, indicated in solid lines in FIG. 28. The gate member 500 is of the gravity rollerway type and has a plurality of rollers, designated generally at 510, rotatably mounted upon the gate frame 502. In the operative positions the gate member 500 is inclined downwardly with the free end 512 thereof aligned with the corresponding free end of the branch conveyors 20a or 20b so as to form the chutes indicated in phantom lines in FIG. 28, the surface planes of which lie obliquely with respect to the vertical portion of the main conveyor. This arrangement insures that when the gate member 500 has been pivoted to a first position in which the free end portion 512 is juxtaposed with the free end of the upper branch conveyor 20a, the tire will smoothly descend into branch conveyor 20a from the diverter station on the main conveyor.

Provision is made for a pair of piston-cylinder units, (FIGS. 29 and 30) shown generally at 514 and 516, to pivot the gate member under the control of the memory unit. Piston-cylinder unit 514 is controlled by solenoid valve SV-2 which, in turn, is energized by the code signal from the memory unit, as hereinbefore described with reference to FIGS. 22, 22a, 23 and 23a. Similarly, piston-cylinder unit 516 is controlled by solenoid SV-1, which, in turn, is also energized by the designated code signal from the memory unit (FIGS. 22, 22a, 23, and 23a). The piston rod 516a of the piston-cylinder unit 516 is pivotably connected to a suitable bracket 528 at the mid-portion of the underside of the gate frame 502. The piston rod 514a of the piston-cylinder unit 514 is pivotably connected at its lower end to a suitable bracket 520 mounted on the base 518 of the frame of the main conveyor. The piston rod 514a of the piston-cylinder unit 514 is pivotably connected to the cylinder 516b of the piston-cylinder unit 516, via a suitable bracket 532 secured preferably at about the mid-point of the cylinder 516b. In the closed position, both piston rods 514a and 516a are fully extended, thereby maintaining the gate member 500 in a substantially horizontal plane so as to form a support preferable normal to the vertical portion of the main conveyor for carrying a tire thereon. When the piston rod 516a is retracted, the gate member is pivoted downwardly to a first position (indicated in phantom in FIG. 28) in which the free end there of is substantially aligned with the free end of the upper level branch conveyor 20a. Thus, it is evident that when the transfer finger is retracted, the tire disposed on the main conveyor at the first diverter station will move down the gate member onto the upper level branch conveyor 20a. When the piston rods 514a and 516a are both retracted, the gate member is pivoted to a second position, indicated in phantom in FIG. 28, in which the free end thereof is aligned with the free end of the lower level branch conveyor 20b. The second position is at greater downward inclination than the first position. Thus, once again when the transfer finger is retracted, the force of gravity will cause the tire to move down the gate member onto the lower level branch conveyor 20b. Hence, as heretofore described the gate member is pivoted in response to a designated code signal from the memory unit to any of three positions, i.e. closed, a first position having the free end thereof aligned with the free end of the upper level branch conveyor, or a second position having the free end thereof aligned with the free end of the lower level branch conveyor.

Having observed the details of operation of the gate member, attention may now be given to the spring return valves SV-1 and SV-2. When both the piston rods of the piston-cylinder units 514 and 516 are in their extended conditions, the gate member is in its closed position. When the gate member is in the closed position, the tire will remain on the main conveyor at the diverter station and cannot be transferred onto either the upper or lower level branch conveyor connected thereto. Turning now to FIG. 30 a spring return solenoid valve SV-1 is diagrammatically depicted therein. The solenoid valve SV-1 is adapted to be energized under the control of solenoid S-1. In the normal position, when solenoid S-1 is deenergized the conduit 524 is placed in communication with a supply of pressurized fluid, such as for example pressurized air, so as to introduce the pressurized air into the cylinder 516 at the underside of the piston, thereby extending the piston rod 516a. Simultaneously therewith, the conduit 526 is exhausted to the atmosphere so as to permit air to escape from the cylinder 516 at the upperside of the piston. The valve SV-1 as shown in FIG. 30 in its energized condition will cause the piston rod 516a to be retracted.

The spring return valve SV-2, as shown in FIG. 29, is adapted to be actuated under the control of solenoid S-2 so as to displace the piston rod 514a of the pistoncylinder unit 514 to its retracted condition for lowering the gate member from the first position to the second position having the free end thereof aligned with the free end of the lower level branch conveyor 20b (indicated in phantom in FIG. 28). To this end, the spring return solenoid valve SV-2 is utilized to place the supply of pressurized air in communication with the rod end of the piston-cylinder unit 514 under the control of solenoid S-2. When the solenoid S-2 is energized, for example by being connected to a suitable electrical source through a manual switch or control relay contacts, not shown, the valve SV-2 shifts position, thereby placing the air supply in communication with the piston-cylinder unit 514 via conduit 522 at the upper side of the piston rod 514a so as to retract the piston rod 514a. Simultaneously therewith, conduit 530 is vented to the atmosphere so as to enable air in the cylinder 514b on the underside of the piston rod 514a to escape therefrom. When the solenoid is deenergized, the solenoid valve returns to the condition illustrated in the drawing.

Thus, it is evident that when the solenoid S-1 is energized, the gate member is pivoted from its closed position to its first position, and similarly when the solenoid S-2 is energized, the gate member is pivoted from the first position to the second position. The gate member cooperating with the force of gravity shifts the tire, at the diverter station, along the main conveyor onto the selected branch conveyor. As hereinbefore set forth, the gate member is controlled by a pair of spring return valves SV-1 and SV-2, responsive to the code signals stored by the memory unit. The relay and timing circuitry (FIG. 31) of the tracker unit develop signals defining the progression of the tire along the main conveyor through the series of diverter stations. In response thereto, the memory unit releases the code signals when the tires reach the diverter stations connected to the selected branch conveyors. The code signals actuate the appropriate spring return valves which, in turn, cause the gate members to be pivoted so as to align the free ends thereof with the free ends of the selected branch conveyors. Thereupon, when the transfer fingers are retracted, the tires move down the chutes formed by the gate members onto the selected branch conveyors.

Tracker Unit

The tracker means or tracker unit develops output signals that control the movements of the transfer shuttle or slide 444 and carrier pins 448 and also signals indicative of the progression of the tire along the main conveyor. In addition, the tracker unit is interlocked with the code reader to prevent damage in the event that the sorter unit fails to operate in a normal manner. The tracker unit includes an electrical system having a plurality of control relays, timing devices and limit switches. Table 5 serves as a "master list" of many of the electrical components used in the tracker unit to control the operation of the apparatus. It sets forth the functions of the various limit switch contacts, control relay contacts, and valve solenoids (in that order) that are utilized in the tracker unit and serves as a reference which may be referred to during the description of the electrical drawing (FIG. 31).

Table 5

| Electrical Component | Control Function or Effect |
| --- | --- |
| 1. 1 PSCR | Qualifies when a tire is in the first diverter station. |
| 2. 2 LS | Two contacts actuate when transfer fingers are in the return home position. |
| 3. 3 LS | Closed when transfer fingers are fully extended. |
| 4. 4 LS | Closed when tires are midway between original and new diverter stations. |
| 5. 5 LS | Two contacts actuate when tires are at the new diverter stations. |
| 6. 6 LS | Two contacts actuate when transfer fingers are fully retracted. |
| 7. 1 TD | Two timed contacts actuate 2 seconds after start of reader cycle. |
| 8. 2 TD | Three time contacts actuate at 2.5 seconds after start of reader cycle. |
| 9. 3 TD | Opens at 3 seconds after start of reader cycle. |
| 10. YTD | Two time contacts actuate at .5 seconds after tire is in first diverter station. |
| 11. RCR | Closed at the start of the read cycle. |
| 12. XCR | Opens when tire is to be sorted at Station 1. |
| 13. S-20a | Extends the transfer fingers. |
| 14. S-20b | Retracts transfer fingers. |
| 15. S-21a | Advances the transfer fingers from original to new diverter stations. |
| 16. S-21b | Returns transfer fingers from new to original diverter stations or home position. |

The electrical system of the tracker unit which automatically controls the tire sorting apparatus is schematically illustrated in FIG. 31. Referring now to FIG. 31, a line numbering system has been employed to facilitate the description of the electrical system. The line numbers have been listed on the left side of FIG. 31 and run consecutively from line number 1000 through line number 1058.

A three phase supply voltage of, for example 440 volts AC is delivered to the electrical control system by means of conductors L-1, L-2, and L-3 (line 1000) through a disconnect switch (line 1002). Fuses 1FU, 2FU, and 3FU (line 1004) are employed to protect against overloading the electrical circuits in the event of a malfunction or short circuit. With disconnect switch (line 1002) closed, three phase 440 AC is available to the apparatus.

A step down transformer T-1 (line 1012) is used to reduce the 440 volt supply voltage to a suitable lower voltage, for example 120 volts, for use in the control circuits. The primary circuit (line 1010) of the transformer T-1 is connected to the pair of conductors L-1 and L-2 through suitable fuses 1FU and 2FU respectively. The conductors L-1, L-2 and L-3 are also connected to suitable three phase 440 volt AC motors, not shown, for driving the hydraulic pump. The secondary circuit (line 1014) of the transformer T-1 is connected to conductors L-4 and L-5, respectively. Conductors L-4 and L-5 are connected to a second step down transformer T-2 (line 1046) so as to further reduce the 120 volt control circuit voltage to a suitable lower voltage, for example 24 volts, for use in developing the required signals to actuate the memory unit. Conductors L-4 and L-5 are connected to the primary circuit (line (045) of the stepdown transformer T-2. Fuse 4FU (line 1016) provides overload protection for the control elements. Fuse 5FU (line 1045) provides overload protection for transformer T-2. The secondary circuit (line 1047) of the transformer is connected to a full wave rectifier (line 1048) so as to convert the following signals: A.C. voltage to D.C. voltage for supplying reset signal (L-8), sort transfer signal (L-9), sort cycle start signal (L-10), reader cycle start +3 signal (L-11), and the reader cycle start +2 signal (L-12).

Sequence of Operation

Figure 32:
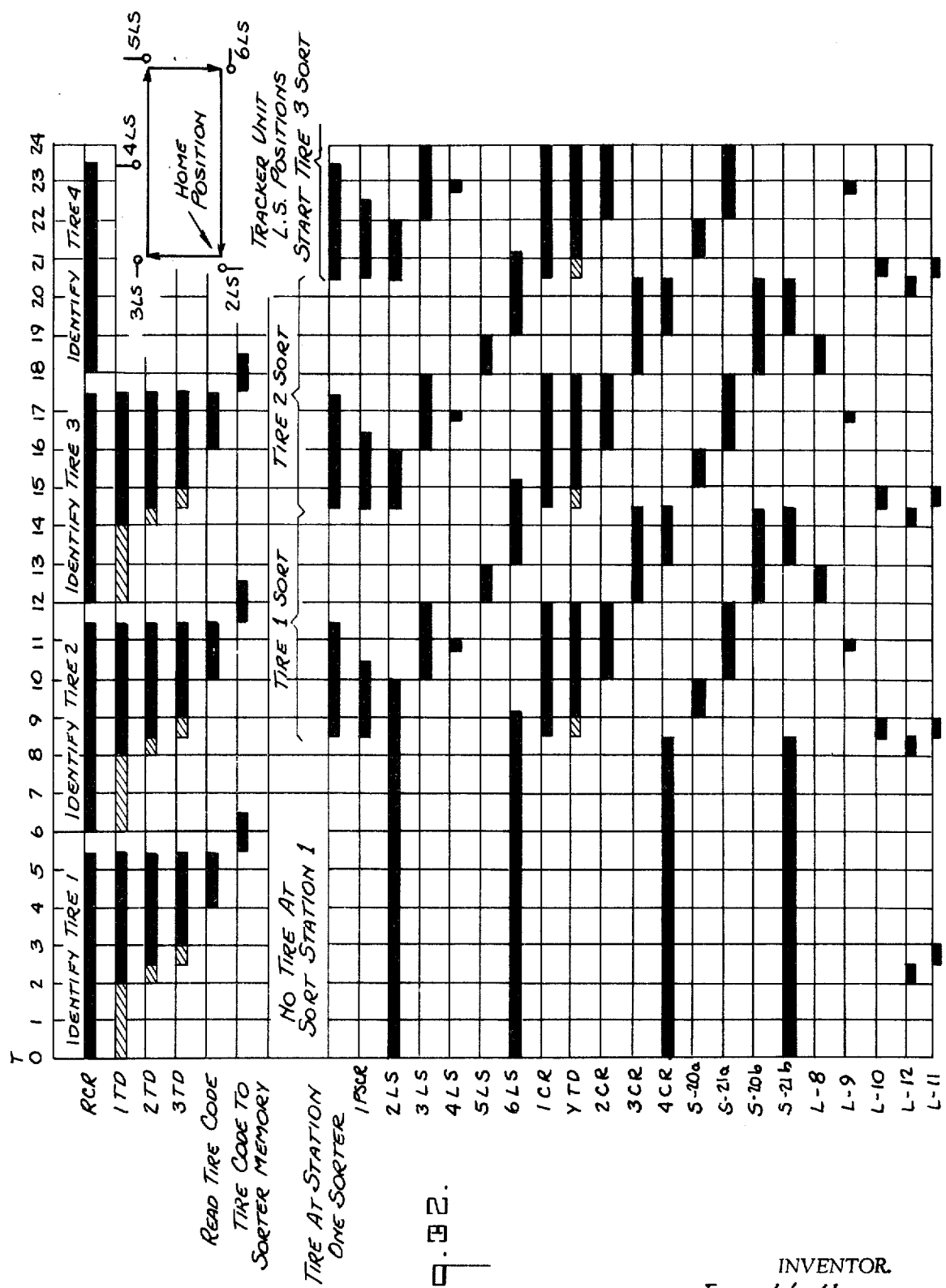
FIG. 32 is an electrical sequential action drawing or chart showing the state of actuation or energization at any given time of the various electrical components employed in the relay and timing circuitry of FIG. 31.

Referring to FIGS. 31 and 32, the initial conditions for the control elements with the tracking unit in the home position with no tire at the code reader are as follows:

a. Photo Cell
  1PSCR - line 1020 - Contact Open
b. Limit Switches
  2LS -
    1. line 1020 - Contact closed
    2. line 1029 - Contact open
  3LS - line 1024 - Contact open
  4LS LS line 1056 - Contact open
  5LS -
    1. line 1028 - Contact open
    2. line 1058 - Contact open
  6LS -
    1. line 1020 - Contact closed
    2. line 1032 - Contact closed
c. Time Delay Relays - All relays deenergized
  YTD
    1. line 1022 - Contact normally open timed closed
    2. line 1054 - Contact normally closed timed open
  1TD
    1. line 1042 - Contact normally open timed closed
    2. line 1050 - Contact normally open timed closed
  2TD
    1. line 1044 - Contact normally open timed closed
    2. line 1050 - Contact normally closed timed open
    3. line 1052 - Contact normally open timed closed
  3TD - line 1052 - Normally closed timed open
d. Relays
  1CR - Deenergized
    1. line 1021 - contact normally open
    2. line 1022 - contact normally open
    3. line 1024 - contact normally open
    4. line 1028 - contact normally open
    5. line 1030 - contact normally closed
    6. line 1032 - contact normally closed
    7. line 1054 - contact normally open
  2CR - Deenergized
    1. line 1026 - contact normally open
  3CR - Deenergized
    1. line 1021 - contact normally closed
    2. line 1029 - contact normally open
    3. line 1030 - contact normally open
  4CR - Energized
    1. line 1034 - contact closed
  XCR - Deenergized
    1. line 1020 - contact normally closed (the coil for this relay is located in circuit 300, FIG. 23)

RCR - Deenergized
    1. line 1040 - Contact open (this relay is located in the code reader control panel [not shown])
e. Solenoids
  S-20a - line 1022 - Deenergized
  S-21a - line 1026 - Deenergized
  S-20b - line 1030 - Deenergized
  S-21b - line 1034 - Energized Referring to FIGS. 31 and 32, the control relay RCR located in the reader control system (line 1040) is adapted to be energized when a tire enters the code reader unit 12 so as to activate time delay relay ITD in response thereto. Two seconds after the tire has entered the code reader unit 12, contact 1TD (line 1042) of time delay relay ITD closes, thereby activating time delay relay 2TD (line 1042). Also contact 1TD (line 1050) closes initiating the reader cycle start +2 signal on conductor L-12. This signal in conjunction with the code signal activates the memory unit. 2.5 seconds after the tire has entered the code reader unit 12 contact 2TD (line 1050) of time delay relay 2TD opens so as to terminate the reader cycle start +2 signal. Thus, it is evident that the reader cycle start +2 signal is about a 0.5 second duration pulse. Also, contact 2TD (line 1052) of time delay relay 2TD closes initiating the reader cycle start +3 signal on conductor L-11. Simultaneously therewith, contact 2TD (line 1044) of time delay relay 2TD closes, thereby activating time delay relay 3TD (line 1044). 3 seconds after the tire has entered the code reader (line 1052) time delay relay 3TD opens, so as to terminate the reader cycle start +3 signal. These signals are used to transfer the code signal in the memory unit from the temporary storage unit 288 to the station one storage unit 290 (FIGS. 22 and 23). At this time in the reader cycle the tire is raised to the read position in the code reader unit 12 (FIG. 1). Thereupon a code signal is developed by the sensor circuit means 158 (FIG. 2) which activates the memory unit, preferably, about five seconds after the tire has entered the code reader unit 12. The tire is thereupon lowered from the read position in the code reader unit 12 and control relay RCR is deenergized. Deenergizing RCR opens contact RCR line 1040 deenergizing 1TD. Contact 1TD line 1042 opens and deenergizes 2TD. Also, 1TD contact line 1050 opens. 2TD contact line 1044 opens deenergizing 3TD. 2TD contact line 1050 closes and 2TD contact line 1052 opens. 3TD contact line 1052 closes when 3TD relay is deenergized. The next successive tire is then admitted into the code reader unit 12. Control relay RCR is once again energized and the same sequence of relay operation as aforementioned takes place, as the second tire pushes the initial tire out of the code reader unit 12 onto the main conveyor 14 (FIG. 1). The initial tire is then conveyed to the first diverter station 16 (FIG. 1). Assuming that the initial tire is not to be diverted onto either branch conveyor 20a or 20b, relay XCR will remain closed (line 1020). When the tire enters the first diverter station 16, the transfer fingers are in their initial or home position and are retracted. Limit switches 2LS and 6LS (line 1020) are closed. The tire, upon entering the first diverter station 16, trips photo cell 1 PSCR (line 1020). In response to tripping photo cell 1 PSCR relay 1CR and YTD are energized and the following events occur:

1. Relay 1CR is energized, resulting in the following:
   a. 1CR contact line 1021 closes sealing 1CR and YTD.
   b. 1CR contact line 1022 readies circuit for operating S-20a.
   c. 1CR contact line 1024 readies circuit for energizing 2CR.
   d. 1CR contact line 1028 readies circuit for energizing 3CR.
   e. 1CR contact line 1030 opens locking out the the possibility of energizing S-20b, while S-20a is energized
   f. 1CR contact line 1032 opens deenergizing 4CR which deenergizes S-21b line 1034.
   g. 1CR contact line 1054 closes initiating a sort cycle start signal L-10.
2. Relay YTD is energized and after a 0.5 second duration YTD times out, resulting in the following:
   2. YTD contact line 1054 opens thereby terminating the sort cycle start signal L-10.
   b. YTD contact line 1022 closes energizing solenoid S-20a of solenoid valve SV-20. This causes the piston rod 486a pistoncylinder unit 486 to advance (FIG. 27), thereby extending the transfer fingers into the tire opening. When the transfer fingers start to move forward limit switch 6LS will deactivate causing contacts on lines 1020 and 1032, respectively, to open.

When the transfer fingers are fully extended, limit switch 3LS activates 2CR (line 1024) which in turn closes contact 2CR line 1026 energizing solenoid S-21a (line 1026) thereby causing the piston rod 488a of piston-cylinder unit 488 (FIG. 27) to extend so as to move the transfer fingers to the next successive diverter stations. When the transfer fingers start to move toward the next successive diverter stations limit switch 2LS is actuated. The following events result:
   a. 2LS contact line 1020 opens,
   b. 2LS contact line 1029 closes.

When the tires are midway between the home diverter stations and the next successive diverter stations limit switch 4LS (line 1056) is tripped. Limit switch 4LS opens as soon as the tire passes thereover so as to generate the sort transfer signal L-9 which in turn, cuases the transfer control circuit 290, 291 and 292 (FIGS. 22 and 23) to develop output signals, as hereinbefore described. When the transfer fingers reach the next successive diverter stations, limit switch 5LS (line 1028) is tripped. Tripping limit switch 5LS energizes 3CR which results in the following:
   a. 3CR contact line 1029 seals 3CR relay on
   b. 3CR contact line 1021 opens deenergizing 1CR and YTD. Contacts 1CR and YTD then revert back to their initial positions as aforementioned for the the home position.
   c. Also, solenoids S-20a and S-21a are deenergized (lines 1022 and 1026). 3CR contact line 1030 closes energizing solenoid S-20b of solenoid valve SV-20. As a result thereof, the piston rod 486a of piston-cylinder unit 486 is caused to retract, thereby retracting the transfer fingers so as to release the tires in engagement therewith.

The tripping of limit switch 5LS (line 1058) initiates the reset signal L-8 as previously described. It is evident that if the gate member is pivoted so as to have its free end aligned with either the upper level or lower level branch conveyors, the tire will descend thereto. If the tire is not to be transferred onto either of the branch conveyors, the gate member will be in the closed position so as to support the tire at the diverter station on the main conveyor when the transfer fingers are retracted.

When the transfer fingers are fully retracted limit switch 6LS (line 1032) is tripped. Tripping limit switch 6LS energizes 4CR which in turn activates solenoid S-21b through 4CR contact closing line 1034. Thereby the piston rod 488a of piston-cylinder unit 488 is retracted so as to return the transfer bar to its initial or home position. When the transfer bar starts to return to its home position, limit switch 5LS resets to its open position terminating the reset signal L-8 line 1058. After the transfer bar reaches its home position, limit switch 2LS once again closes so as to be ready for the next sort cycle.

The tire remains at the second diverter station until the next tire exits the code reader unit 12 and enters the first diverter station, whereupon the aforementioned sequence of events is repeated and the first tire is moved to the third diverter station and the second tire is moved to the second diverter station. This cycle of events occurs to each tire until reaching the diverter station connected to the selected branch conveyor onto which the tire is to be transferred. Just prior to the arrival of the tire at the diverter station connected to the selected branch conveyor, the gate member associated therewith is pivoted for aligning the free end thereof with the selected branch conveyor so as to shift the tire thereto.

Thus, it is evident that each tire is moved sequentially through intermediate diverter stations until arriving at the diverter station connected to the selected branch conveyor onto which the tire is to be transferred for delivery to the desired terminus. Furthermore, as hereinbefore set forth, the relay and timing circuitry of the tracker unit develops output signals defining the progression of the tire along the main conveyor. As a consequence thereof, the code signals move sequentially through successive logic units in the memory unit. In this way the memory unit releases the code signal at the proper time so as to actuate designated diverter units for shifting the tires onto the selected branch conveyors.

In conjunction with the foregoing an electrical sequential action chart, FIG. 32 has been employed to further facilitate the description of the apparatus. The operation of the tracker unit in cooperation with the memory unit and the associated transfer unit may be more clearly understood upon reference to FIG. 32 which illustrates the sequence of operations for transferring the tire onto the selected branch conveyor. The sequential action chart employs guide grids comprising a plurality of relatively light, horizontal "component" lines and a plurality of relatively light, vertical "time" lines. The electrical component represented by each horizontal component line is listed at the left edge of the chart, the component list forming a vertical column at the left edge thereof. Similarly, the time represented by each vertical time line is listed across the top of the chart.

When a given light component becomes heavy, for example component line 2CR becomes heavy at time T-10, it indicates that the electrical component involved becomes energized at that time or that a given set of switch contacts becomes closed at that time, as the case may be. When the heavy component line changes back to a light component line, for example, component line 2CR becomes light at T-12, it indicates that the electrical component involved becomes deenergized at that time or that the given set of switch contacts opens at that time.

Time delay features of time delay relays are represented on the sequential action chart by means of broken heavy component lines and solid black areas. When a component line becomes a broken heavy component line, it indicates that a time delay relay has become energized but that the time delay contacts thereof have not yet followed the movement of the relay. When such contacts finish their timing period and change condition, this action is represented by the changing of the broken heavy component line into a solid black area. An example of this may be seen in the case of the time delay relay 2TD which energizes at time T-2. Although this relay becomes energized at that time, its time delay contacts do not shift position until after the expiration of the time delay period at time T-.5, as indicated by the change of the broken heavy component line into a solid black area.

As previously indicated, the light, vertical time lines of the sequential action chart, shown in FIG. 32 represent the passage of time. The passage of time is treated on a relative basis rather than on an absolute basis. At any given time, as represented by a time line, the condition of any one of the electrical components of the apparatus may be determined relative to the conditions of the remaining electrical components of the apparatus. This facilitates analysis of the system electrical circuitry shown in FIG. 31.

For the purpose of setting forth the initial conditions existing at time T-O in FIG. 32, it will be assumed that the transfer fingers are in their initial or home position and therefore limit switch 2LS (line 1020) is closed. Furthermore, it is assumed that the transfer fingers are retracted closing limit switch 6LS (line 1032). As a consequence of limit switch 6LS being closed, relay CR is energized thereby energizing S-21b (line 1034) so as to maintain the transfer fingers in their home position. All of the other electrical components are in their deenergized or deactivated condition, except 2LS which is actuated as shown in FIG. 32 at time T-O.

Turning now to FIG. 31, to initiate automatic sorting of tires, the code reader unit admits a tire therein, which energizes control relay RCR (line 1040), as shown at time T-O. As a result of this, time delay relay 1TD (line 1040) becomes energized.

It will be appreciated that the tracker unit regulates the progression of the tire along the main conveyor, as well as the progression of the code signal through successive logic units in the memory unit. In this manner the code signal is released from the memory unit simultaneously with the tire arriving at the diverter station connected to the selected branch conveyor. Hence, when the tire arrives at the diverter station of the selected branch conveyor, the gate member has been pivoted downwardly so as to have the free end thereof juxtaposed with the free end of the selected branch conveyor. The tire thereupon descends from the main conveyor onto the selected branch conveyor.

Thus, the illustrative apparatus is adapted to identify the selected branch conveyors of the articles to be sorted and to develop a code signal in response thereto. The code signals are stored in the memory unit and are released selectively therefrom for shifting the articles into the selected branch conveyor. Pursuant to the provisions of this invention, the tires at the diverter stations are engaged for translation to the next diverter stations by having the transfer fingers extend into the center thereof. Thereupon, the transfer fingers advance so the tires move to the next successive diverter stations. If the tires were to be sorted at the next successive diverter stations, the memory unit would release the code signals in response to tracker unit signals. The released code signals pivot the gate members into alignment with the selected branch conveyors when the tires are midway between successive diverter stations. This permits the tires to descend onto the selected branch conveyors when the transfer fingers are retracted therefrom. If the gate members of the next successive branch conveyor were in an open position, and the tires were not to be transferred onto these branch conveyors, the memory unit would close the gate members just prior to the tires entering these diverter stations. The tire is thereby prevented from being transferred onto these branch conveyors. Thus, sorting is accomplished by code signals from the memory unit which pivot the respective gate members into alignment with the appropriate branch conveyors when the tires are in motion and halfway between successive diverter stations. The actual release of the tires occur when the transfer fingers are retracted. Several tires may be sorted simultaneously at different branch conveyors. In the event a tire is to be diverted to a branch conveyor having no space available thereon, a lane full signal is sent to the memory unit, whereupon the tire is moved along the main conveyor to the no-sort conveyor.

It is clear from the foregoing description that the herein described apparatus achieves the objectives of the present invention. As hereinbefore set forth, the sorting apparatus automatically transfers a plurality of articles, i.e. tires, from a main conveyor onto the selected ones of the plurality of branch conveyors for delivery to desired termini. In particular, a plurality of articles are in transit simultaneously on the main conveyor for delivery to the selected branch conveyors thereof. After a code signal designating the selected branch conveyor is developed by a code reader unit remote from the branch conveyors, the articles enter the main conveyor and pass through intermediate diverter stations until reaching the diverter stations connected to the selected branch conveyors. The apparatus is adapted to move sequentially a plurality of articles along the main conveyor. Each one of the articles follows the preceding article from one diverter station to the next successive diverter stations until reaching the diverter stations connected to the selected branch conveyors. Simultaneously therewith, the code signals corresponding to the selected branch conveyors move progressively through the memory unit. Thus, the code signals are stored in the memory unit until released selectively at the proper time for actuating the diverter units of the diverter stations connected to the selected branch conveyors.

In the present form of the invention the memory unit and the conveyor system include a plurality of like modular components. Preferably, the memory unit includes a plurality of like logic units, sufficient logic units being provided to store the maximum number of code signals required to define all of the branch conveyors. The conveyor system includes a plurality of like branch conveyors connected to the diverter stations on the main conveyor. Furthermore, the diverter stations of the conveyor system each have a diverter unit, all the diverter units being identical to one another. Hence, if it were desirable to expand the system, additional branch conveyors, diverter units and logic units could be added to the system. It is contemplated that the apparatus of this invention may be readily expanded to any desired size by the mere addition of the necessary modular components. Incidentally, it will be appreciated that the use of modular components greatly facilitates ease of repair and enables the invention to be simply maintained in use thereof.

Thus it is apparent that there has been provided, in accordance with the invention a sorting apparatus that fully satisfied the objects, aims, and advantages previously set forth. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

Having thus described my invention what I and desire to protect by Letters Patent is:

1. An apparatus for sequentially moving articles in step by step increments through a series of diverter stations onto selected ones of a plurality of branch conveyors in association with the diverter stations, comprising:

sensor means for developing code signals defining the selected ones of the plurality of branch conveyors onto which the articles are to be transferred, said sensor means being located remotely from the branch conveyors so as to permit a plurality of the articles to be in transit simultaneously therefrom to the selected branch conveyors thereof, after said sensor means develops the code signals therefor; and memory means for storing the code signals developed by such sensor means, said memory means including a plurality of serially connected logic circuit means releasing selectively the code signals stored therein so as to transfer designated articles from the diverter stations onto the selected branch conveyors adjacent thereto, said code signals moving through said serially connected logic circuit means in step by step increments which are in time relationship with the step by step incremental movement of said articles from diverter station to diverter station.

2. The apparatus recited in claim 1, further comprising transfer means for sequentially moving the articles in said step by step increments from said sensor means through immediate diverter stations to the diverter station adjacent to the selected one of the plurality of branch conveyors for transfer thereto.

3. The apparatus recited in claim 1, further comprising diverter means operatively associated with the diverter stations for transferring the articles disposed at the diverter stations onto the selected branch conveyors in response to the code signals released from said serially connected logic circuit means.

4. The apparatus recited in claim 1, further comprising tracker means responsive to the articles being at the various diverter stations along their paths of travel, for developing tracking signals defining the progression of the articles from said sensor means, through the series of diverter stations.

5. The apparatus recited in claim 4, in which said plurality of logic circuit means stores simultaneously a plurality of the code signals developed by said sensor means, said logic circuit means releasing selectively the code signals stored therein in response to the tracking signals developed by said tracker means.

6. The apparatus recited in claim 1, for moving articles having a magnetic code identifying the selected branch conveyors onto which said articles are to be transferred in which said sensor means comprises magnetic pick-up means responsive to the magnetic code for developing electrical output signals, and circuit means for separating the electrical output signals into information signals and for translating said information signals into the code signals stored by said memory means.

7. In an improved sorting apparatus of the type having an entry conveyor, a main conveyor contiguous with the entry conveyor including a series of diverter stations mounted thereon, and a plurality of branch conveyors adjacent to the diverter stations, for sequentially routing articles moving in step by step increments from the entry conveyor to desired termini, the combination comprising:

sensor means mounted on the entry conveyor ahead of the main conveyor for developing code signals defining selected ones of the plurality of branch conveyors onto which the articles are to be transferred, said sensor means located remotely from the branch conveyors so as to permit a plurality of the articles to be in transit simultaneously therefrom to the selected branch conveyors thereof, after said sensor means develops the code signals therefor; and memory means including a plurality of serially connected logic circuit means for storing simultaneously a plurality of the code signals developed by said sensor means, said logic circuit means releasing selectively the code signals stored therein so as to transfer designated articles from the diverter station onto the branch conveyors adjacent thereto, said code signals moving through said serially connected logic circuit means in step by step increments which are in time relationship with the step by step incremental movement of said articles from diverter station to diverter station.

8. The apparatus recited in claim 7, further comprising transfer means mounted on the main conveyor for sequentially moving the articles disposed thereon in said step by step increments from said sensor means through the intermediate diverter stations to the diverter station adjacent to the selected branch conveyor for transfer thereto.

9. The apparatus recited in claim 8, in which said transfer means comprises:

a transfer bar slidably mounted on the main conveyor;

a plurality of transfer fingers movably mounted on said transfer bar, each one of said transfer fingers extending therefrom for engagement with a corresponding one of the articles disposed on the main conveyor and being spaced from one another a distance substantially the same as the distance between adjacent diverter stations;

means for translating said transfer bar to move each of said plurality of transfer fingers from a corresponding one of the diverter stations to the next successive diverter station thereby to advance each of the corresponding articles in engagement therewith from one of the diverter stations to the next successive diverter station; and means for retracting said transfer fingers so as to disengage each of said transfer fingers from the corresponding articles disposed on the main conveyor.

10. The apparatus recited in claim 7, further comprising diverter means operatively associated with the diverter stations for transferring the articles disposed at the diverter stations onto the selected branch conveyors adjacent thereto in response to the code signals released from said logic circuit means.

11. The apparatus recited in claim 10, in which said diverter means comprise:
  a plurality of gate members, each one of said gate members having one end portion thereof pivotably mounted on the main conveyor at each one of the diverter stations; and
  means for pivoting each one of said gate members from a closed position to an open position so as to permit the articles located at the diverter stations to descend onto the branch conveyors in association therewith.

12. The apparatus recited in claim 7, further comprising tracker means responsive to the articles being at the various diverter stations along the main conveyor for developing tracking signals defining the progression of the articles from said sensor means through the series of diverter stations.

13. The apparatus recited in claim 12, in which said logic circuit means of said memory means comprises:
  temporary storage circuit responsive to the code signals from said sensor means and the tracking signals from said tracker means, said temporary storage circuitry storing the code signals in response to the tracking signals from said tracker means;
  transfer storage control circuitry responsive to the code signals from said temporary storage circuitry and the tracking signals from said tracker means, said transfer storage control circuitry storing the code signals transmitted from said temporary storage circuitry and releasing the code signals in response to the tracking signals from said tracker means;
  lane full circuitry reponsive to the code signals from said transfer storage control circuitry and branch conveyor signals indicating that the selected branch conveyors have space available thereon for receiving the articles designated to be transferred thereto, said lane full circuitry storing the code signals from said transfer storage control circuitry and releasing the code signals in response to the branch conveyor signals developed by the selected branch conveyors; and
  output control circuitry actuated by the code signals transmitted from said lane full circuitry for controlling the transfer of the articles at the diverter stations onto the selected branch conveyors connected thereto.

14. The apparatus recited in claim 13, in which said logic circuit means of said memory means further comprises no-sort circuitry responsive to the lane full signals from said lane full circuitry, said lane full circuitry developing lane full signals in response to branch conveyor signals indicating that the selected branch conveyors have no space available thereon for receiving the articles designated to be transferred thereto, said no-sort circuitry developing no-sort signals in response to the lane full signals for actuating said output control circuitry so as to prevent articles at the diverter stations adjacent to branch conveyors having no available space thereon from being transferred onto any of the branch conveyors.

15. The apparatus recited in claim 7 for moving articles having a magnetic code identifying the selected branch conveyors thereof, in which said sensor means comprises magnetic pick-up means responsive to the magnetic code for developing electrical output signals, and circuit means for separating the electrical output signals into information signals and for translating the information signals into the code signals stored by said memory means.

16. The apparatus recited in claim 15, in which said circuit means of said sensor means comprises:
  digital means excited by the electrical output signals from said magnet pick-up means for developing binary signals therefrom;
  translator means including a plurality of register means, each one of the plurality of like register means being adapted to develop decimal signals in response to a discrete set of binary signals from said digital means;
  converter means responsive to the decimal signals from said translator means, said converter means combining the decimal signals so as to form combination signal including at least one decimal signal from each one of the plurality of register means of said translator means; and
  a program board including input electrical conductor means for receiving the combination signals from said converter means.

17. In a method of sequentially moving articles in step by step increments through a series of diverter stations onto selected ones of a plurality of branch conveyors in association with the diverter stations, comprising the following steps:
  a. developing code signals, in a location remote from the branch conveyors, for defining the selected ones of the plurality of branch conveyors onto which the articles are to be transferred;
  b. storing the code signals in a memory unit including a plurality of serially connected logic circuit means so as to permit a plurality of the articles to be in transmit simultaneously to the selected branch conveyor onto which they are to be transferred, after developing the aforementioned code signal therefor; and
  moving said code signals through said serially connected logic circuit means in step by step increments which are in time relationship with the step by step incremental movement of said articles from diverter station to diverter station.

18. The method recited in claim 17, further comprising the step of:
  c. sequentially moving the articles in step by step increments through intermediate diverter stations to the selected one of the plurality of branch conveyors for transfer thereto.

19. The method recited in claim 18, further comprising the steps of:

d. releasing the code signals stored in the memory unit in response to the articles arriving at the diverter stations adjacent to the selected branch conveyors;

e. applying the code signals to the inputs of diverter units operatively associated with the diverter stations and operative to transfer the articles onto the selected branch conveyors; and f. transferring the articles onto the selected ones of the plurality of branch conveyors.

20. The method recited in claim 17, further comprising the steps of:

c. developing tracking signals by a tracker unit responsive to the articles being at various diverter stations along their path of travel, so as to define the progression of the articles through the diverter stations; and d. applying the tracking signals to the memory unit so as to release the code signals stored in said logic circuit means when the articles arrive at the diverter stations in association with the selected branch conveyors thereof.

21. The method recited in claim 17, further comprising the step of:

c. sensing, in a location remote from the branch conveyors, the selected ones of the plurality of branch conveyors onto which the articles are to be transferred.

22. A memory means including a plurality of logic units for storing a series of code signals, which comprise:

temporary storage means responsive to the code signals for storing the code signals therein until actuated by a first external electrical signal for releasing the code signals therefrom from in response thereto;

transfer storage control means responsive to the code signals from said temporary storage means so as to store the code signals therein until actuated by a second external electrical signal for releasing the code signals therefrom in response thereto;

lane full means responsive to the code signals from said transfer storage control means for storing the code signals therein until actuated by a third external electrical signal so as to release the code signals therefrom in response thereto; and output control means responsive to the code signals from said lane full means, said output control means converting the code signals into mechanical responses representative of the individual code signals stored by said memory means.

23. The memory means recited in claim 22, further comprising no-sort means to store the code signals from said lane full means in response to a fourth external electrical signal so as to prevent the code signals from actuating said output control means.

24. A transfer means for moving sequentially a plurality of articles along a main conveyor from one diverter station to a next successive diverter station of a sorting apparatus comprising:

a transfer bar retractably mounted on the main conveyor;

a plurality of transfer fingers slidably mounted on said transfer bar and extending therefrom so as to be in engagement with the articles disposed on the main conveyor;

means for sliding said transfer fingers relative to said transfer bar so as to advance articles in engagement therewith from their respective diverter stations to their next successive diverter stations; and means for retracting said transfer bar so as to disengage said transfer fingers from the articles disposed on the main conveyor.

25. The transfer means recited in claim 24, in which said sliding means comprises a fluid pressure-operated piston and cylinder unit operatively associated with said transfer fingers.

26. The transfer means recited in claim 24, in which said retracting means comprises a fluid pressure-operated piston and cylinder unit operatively associated with said transfer bar.

27. A tracker means for indicating the location of articles, disposed on a main conveyor of a sorting apparatus, comprising:

a plurality of limit switches mounted on the main conveyor so as to be tripped as the articles disposed thereon reach designated positions along the main conveyor;

a plurality of control relays operatively interconnected with said limit switches for developing tracking signals for designating the location of the articles disposed on the main conveyor; and a plurality of time delay relays operatively interconnected with said limit switches and said control relays so as to develop electrical signals regulating the sorting apparatus.

28. An apparatus for sequentially moving articles in step by step increments through a series of diverter stations onto selected ones of a plurality of branch conveyors in association with the diverter stations, comprising:

sensor means for developing code signals defining the selected ones of the plurality of branch conveyors onto which the articles are to be transferred, said sensor means being located remotely from the branch conveyors so as to permit a plurality of the articles to be in transit simultaneously therefrom to the selected branch conveyors thereof, after said sensor means develops the code signals therefor;

memory means for storing the code signals developed by said sensor means, said memory means releasing selectively the code signals stored therein so as to transfer designated articles from the diverter stations onto the selected branch conveyors adjacent thereto;

reciprocating transfer means for sequentially moving the articles in said step by step increments from said sensor means through intermediate diverter stations to the diverter station adjacent to the selected one of the plurality of branch conveyors for transfer thereto, said code signals being selectively released from said memory means in response to, and in time relation with, the reciprocal cycling of said transfer means as it moves said articles in step by step increments through said intermediate diverter stations.

* * * * *

UNITED STATES PATENT AND TRADEMARK OFFICE
CERTIFICATE OF CORRECTION

PATENT NO. : 3,895,716
DATED : July 22, 1975
INVENTOR(S) : John W. Ugo

It is certified that error appears in the above-identified patent and that said Letters Patent are hereby corrected as shown below:

On the Title and Abstract page: Assignee hereby disclaims the portion of the term of the patent subsequent to July 22, 1991.

Column 1, line 50, "or", first occurrence, should read --on--.

Claim 13, line 3, "circuit" should read --circuitry--.

Claim 16, line 14, "signal" should read --signals--.

Claim 17, line 1, "In a" should read --A--.

Claim 22, line 7, delete "from".

Signed and Sealed this first Day of June 1976

[SEAL]

Attest:

RUTH C. MASON
Attesting Officer

C. MARSHALL DANN
Commissioner of Patents and Trademarks